Sept. 9, 1958             F. ANDERSON            2,851,080
APPARATUS FOR FORMING SHEETS INTO COMPOUND
CURVES BY DRAWING OVER FORMING ELEMENTS IN
A SUCCESSION OF FORMING STAGES Filed Feb. 8, 1955            35 Sheets-Sheet 1

Fig. 1.

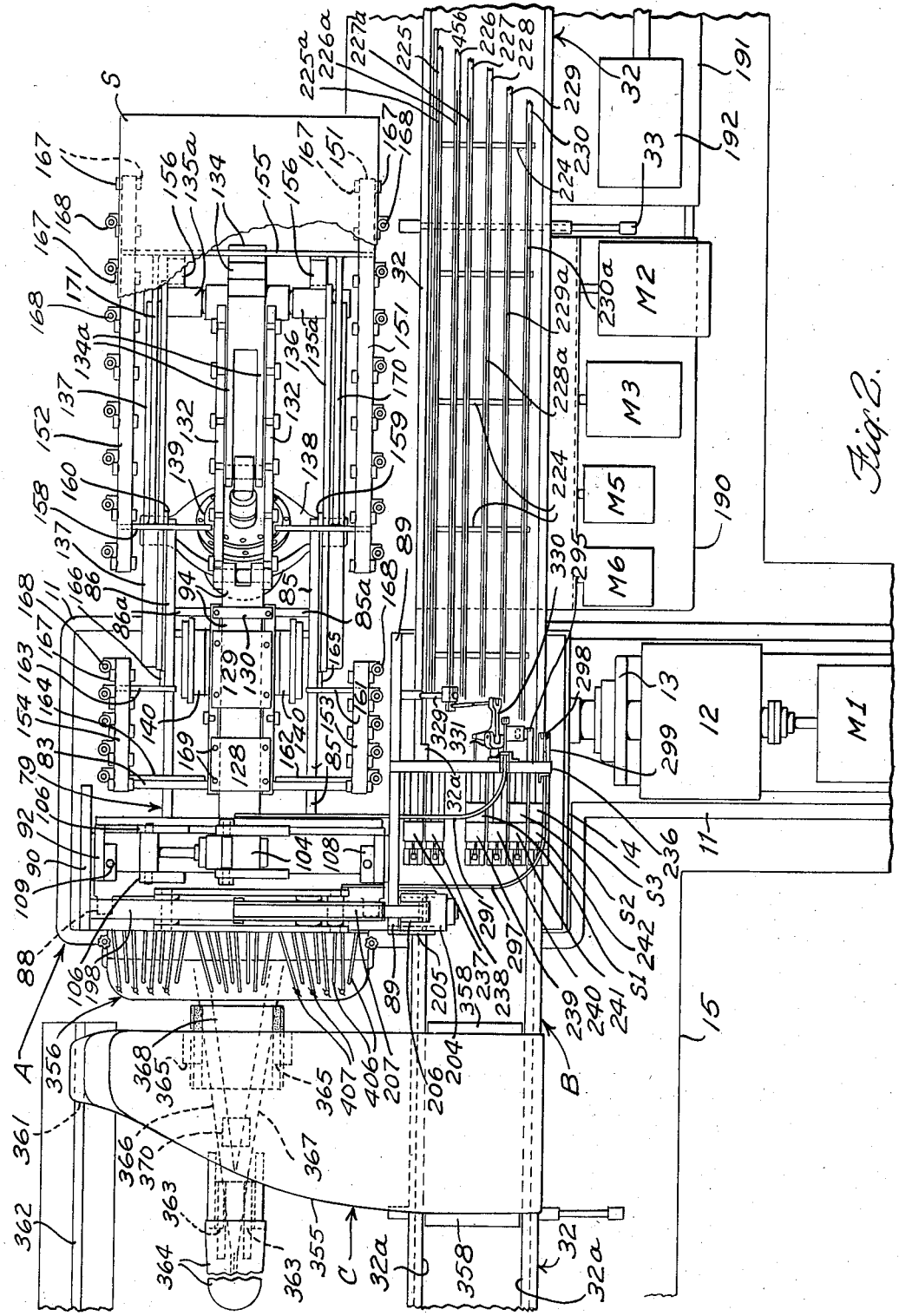

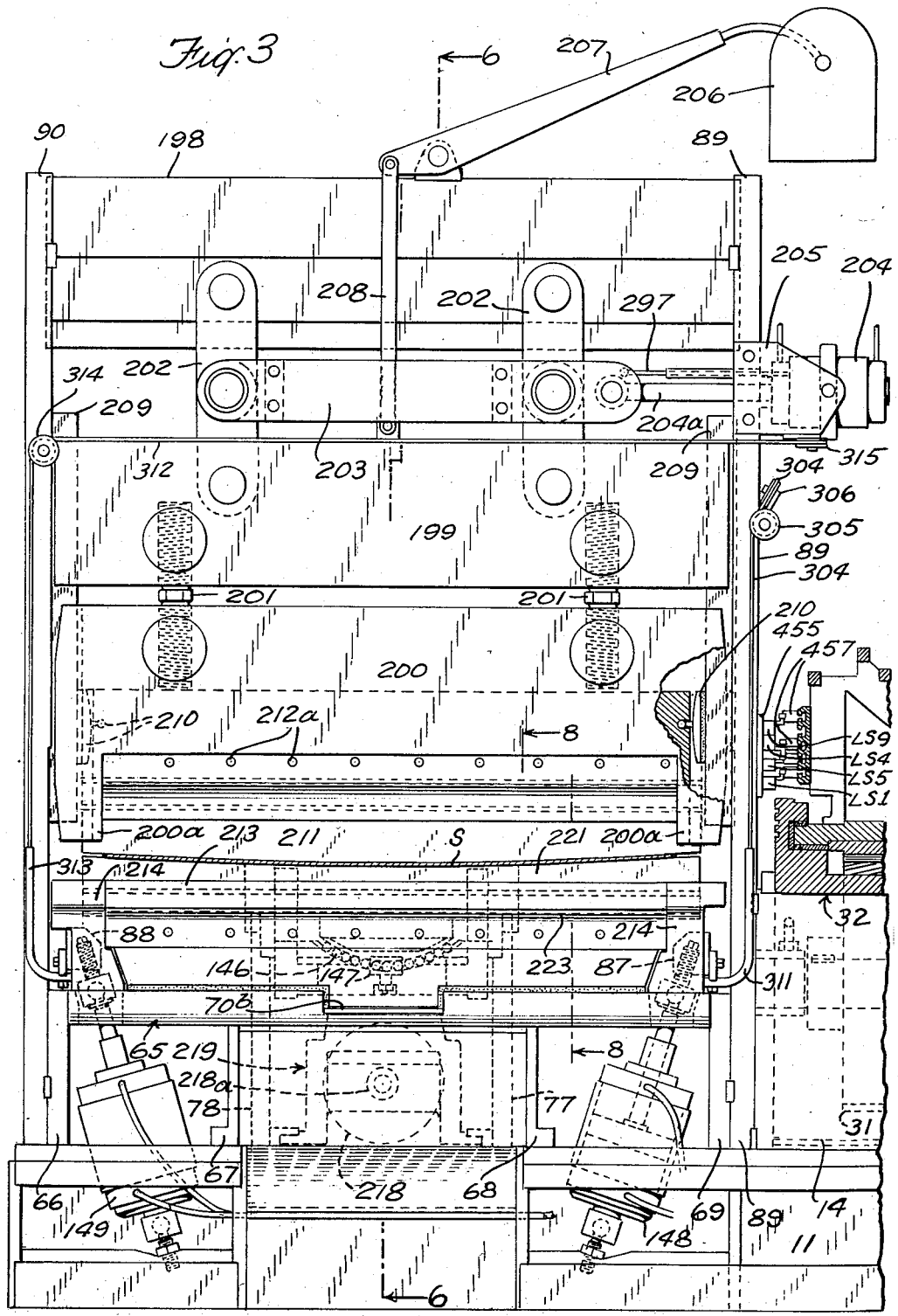

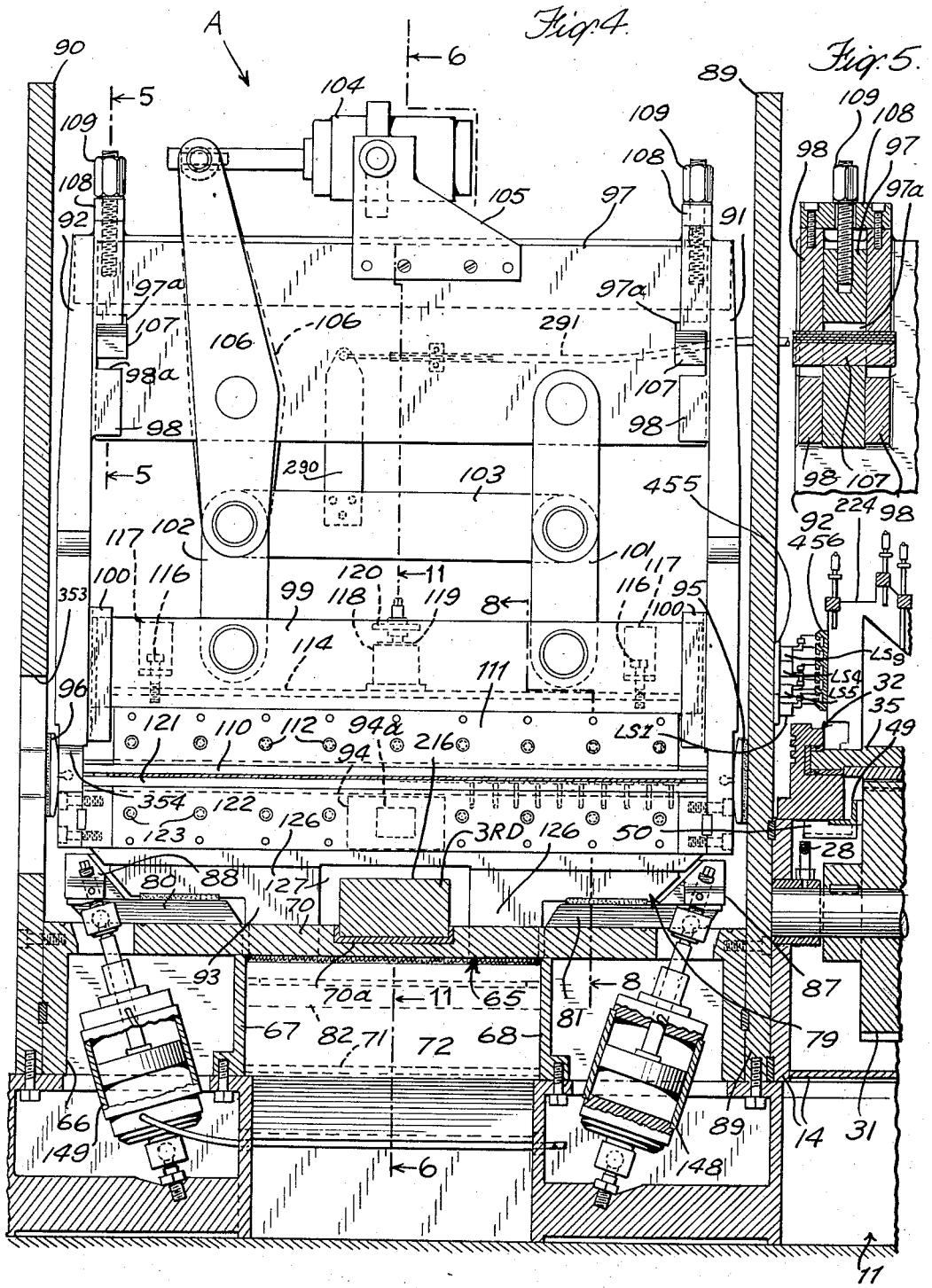

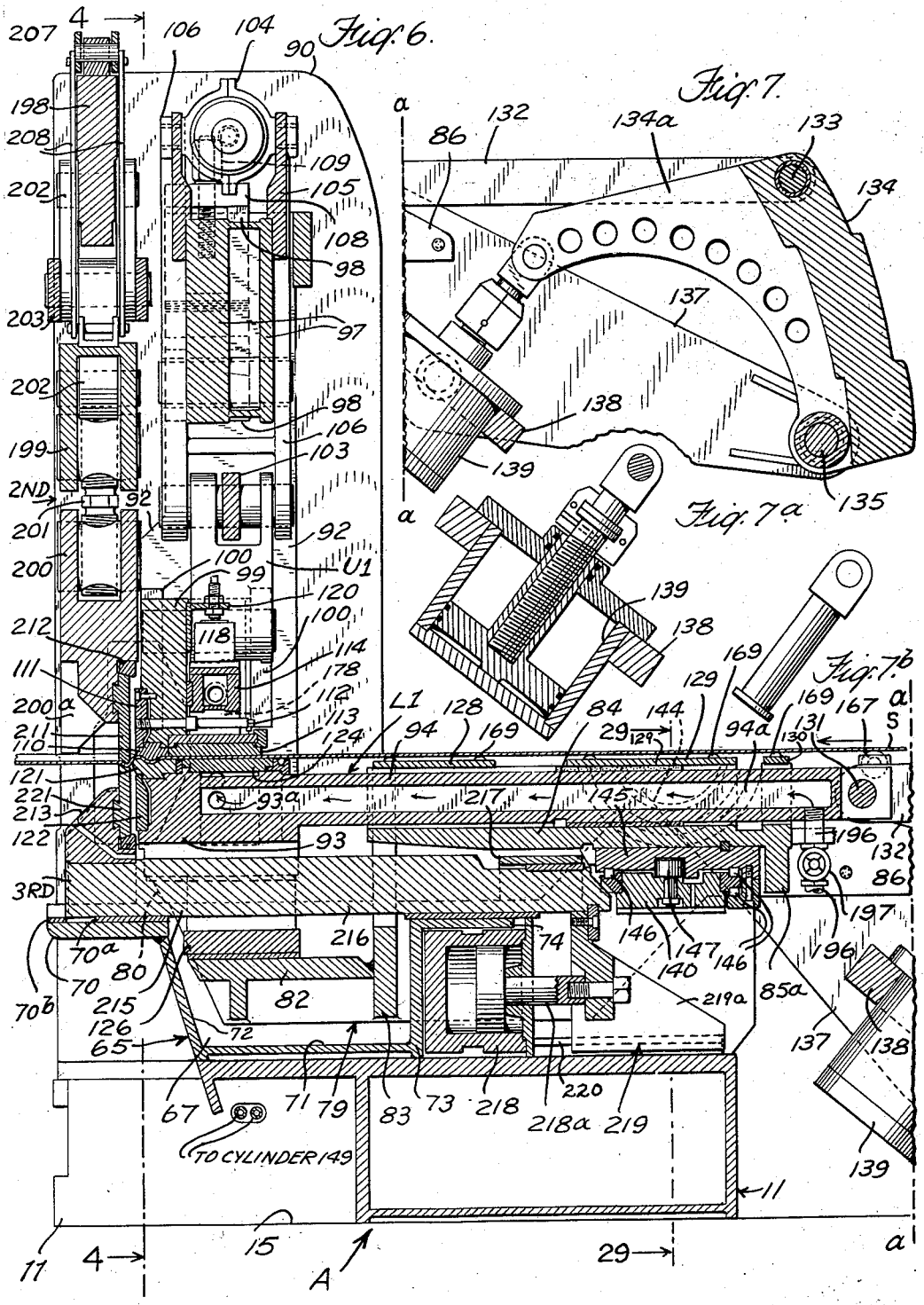

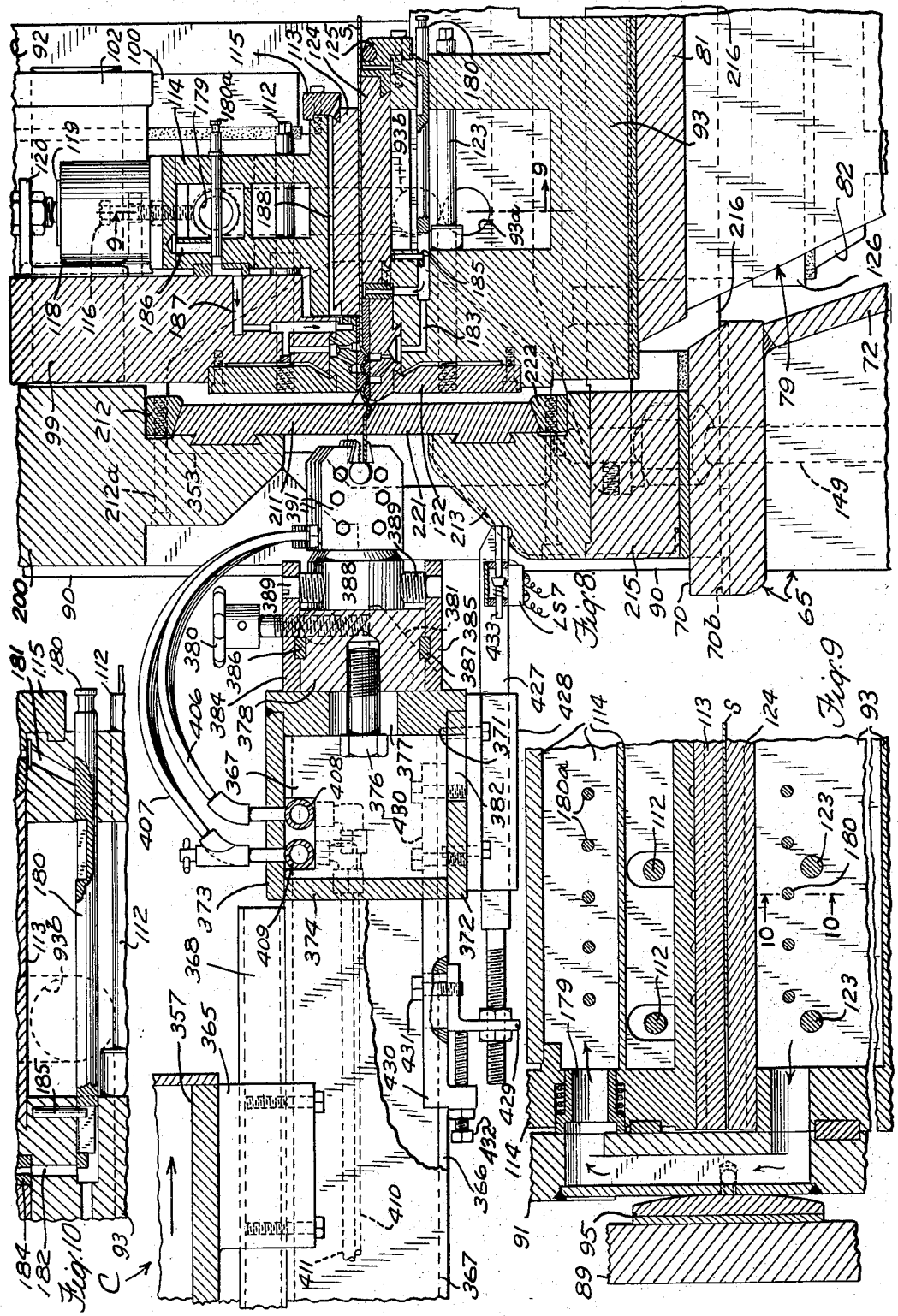

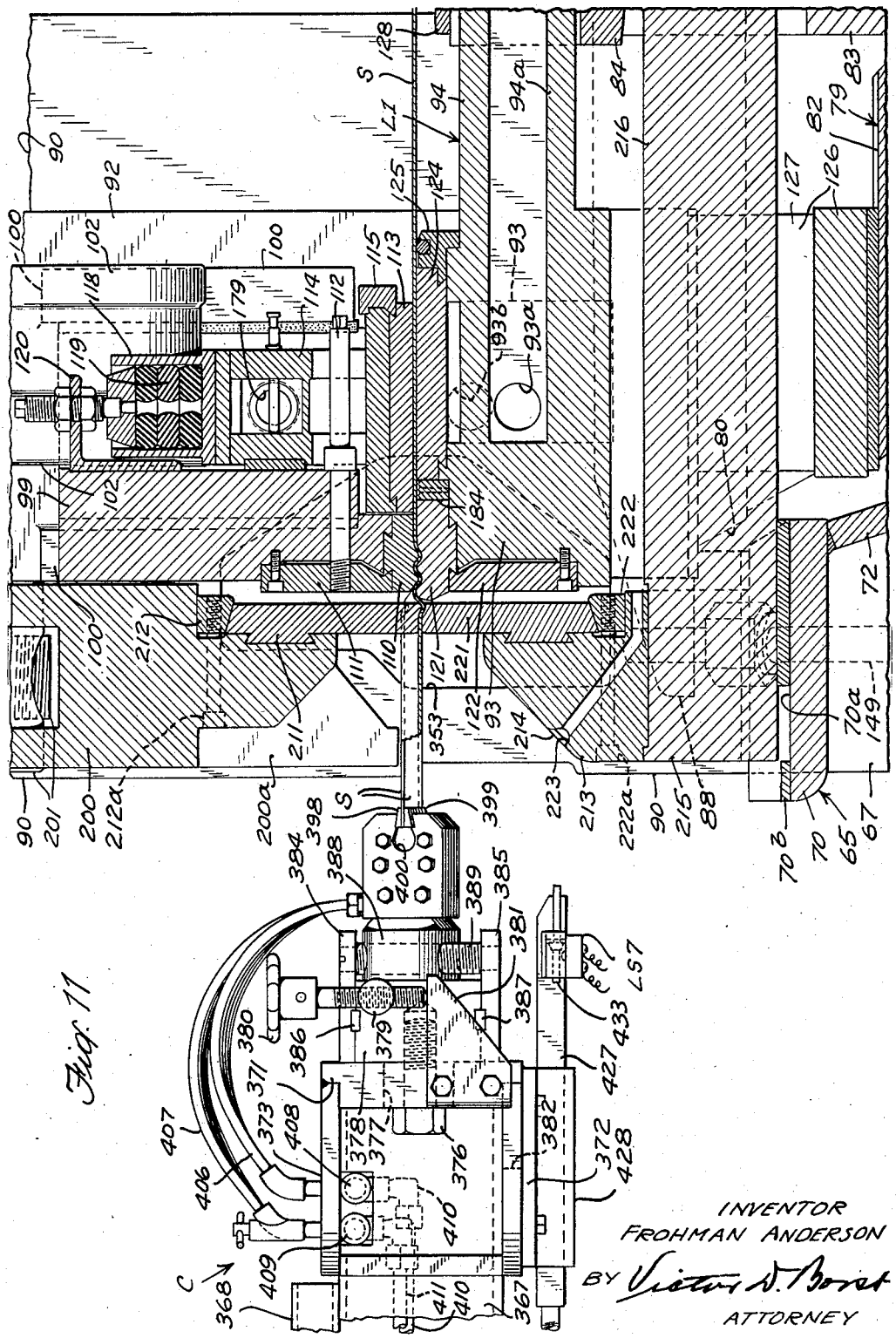

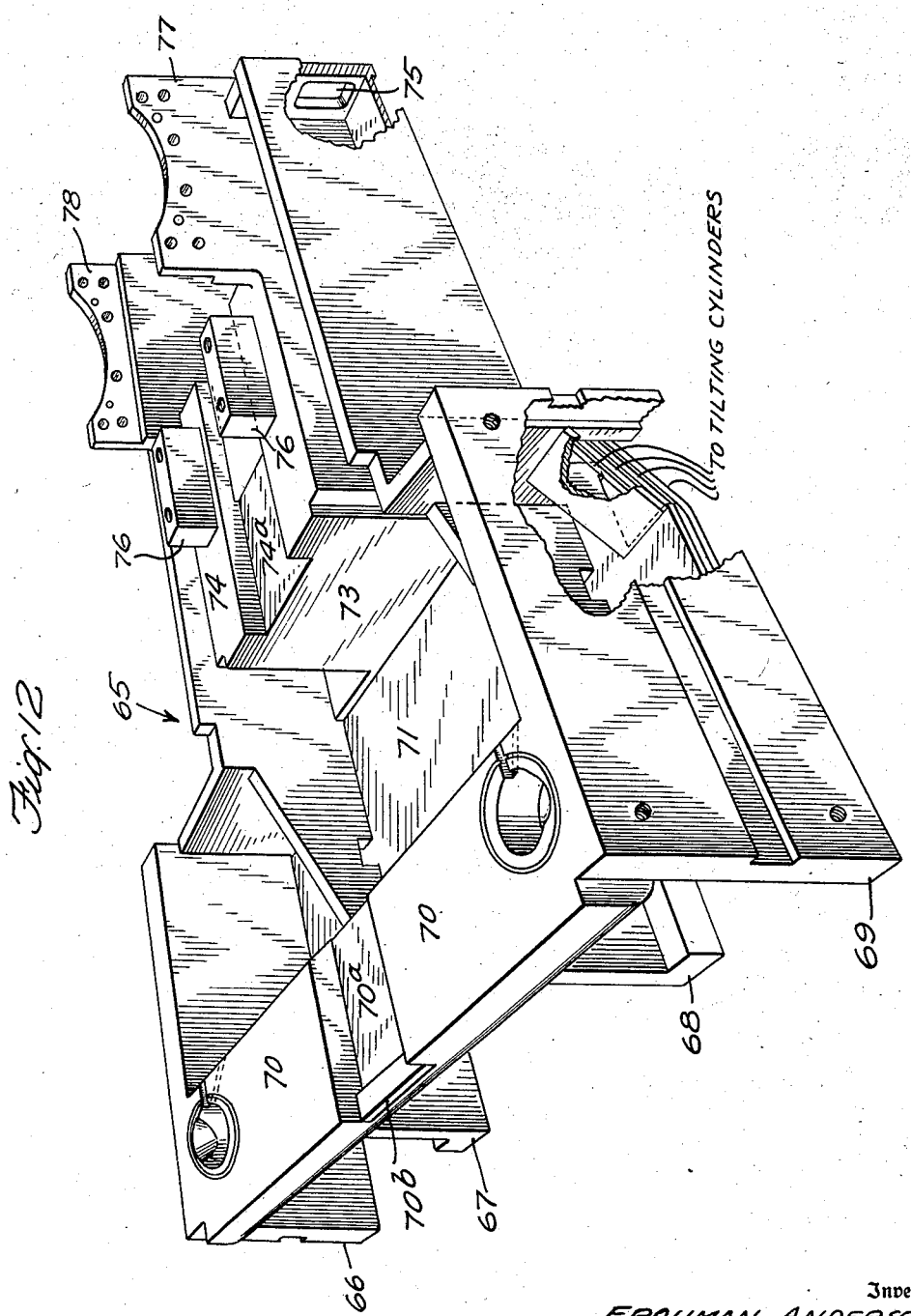

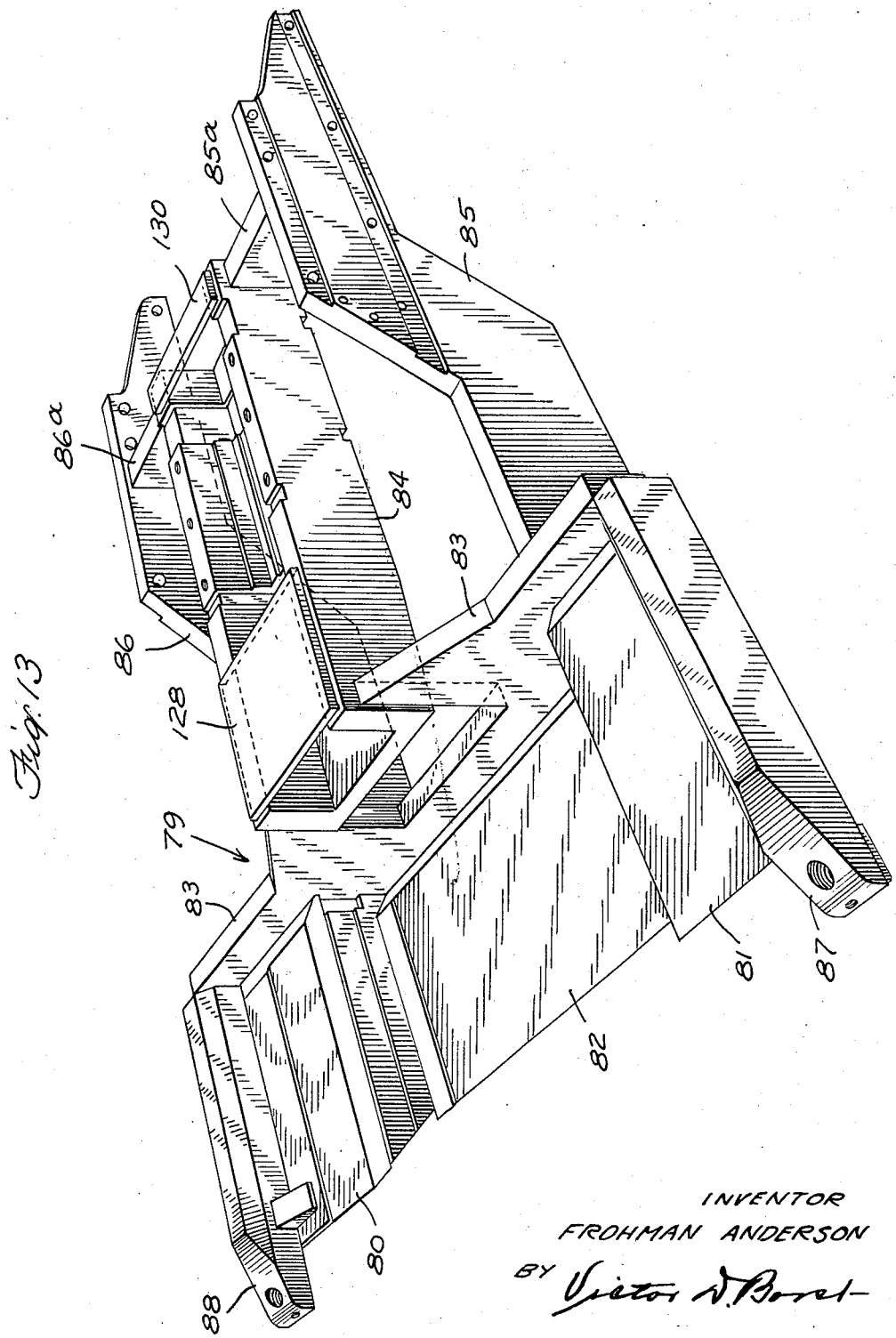

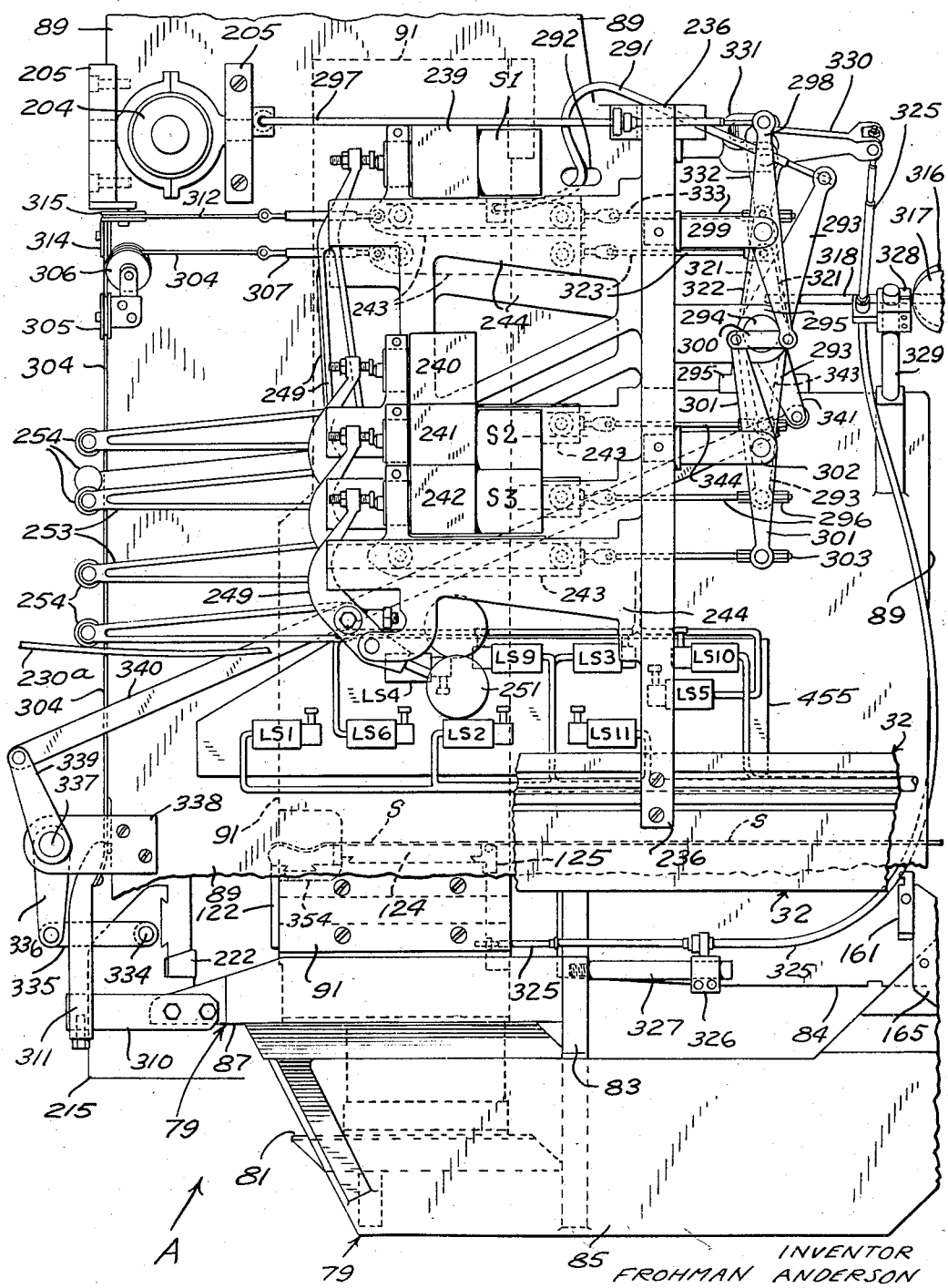

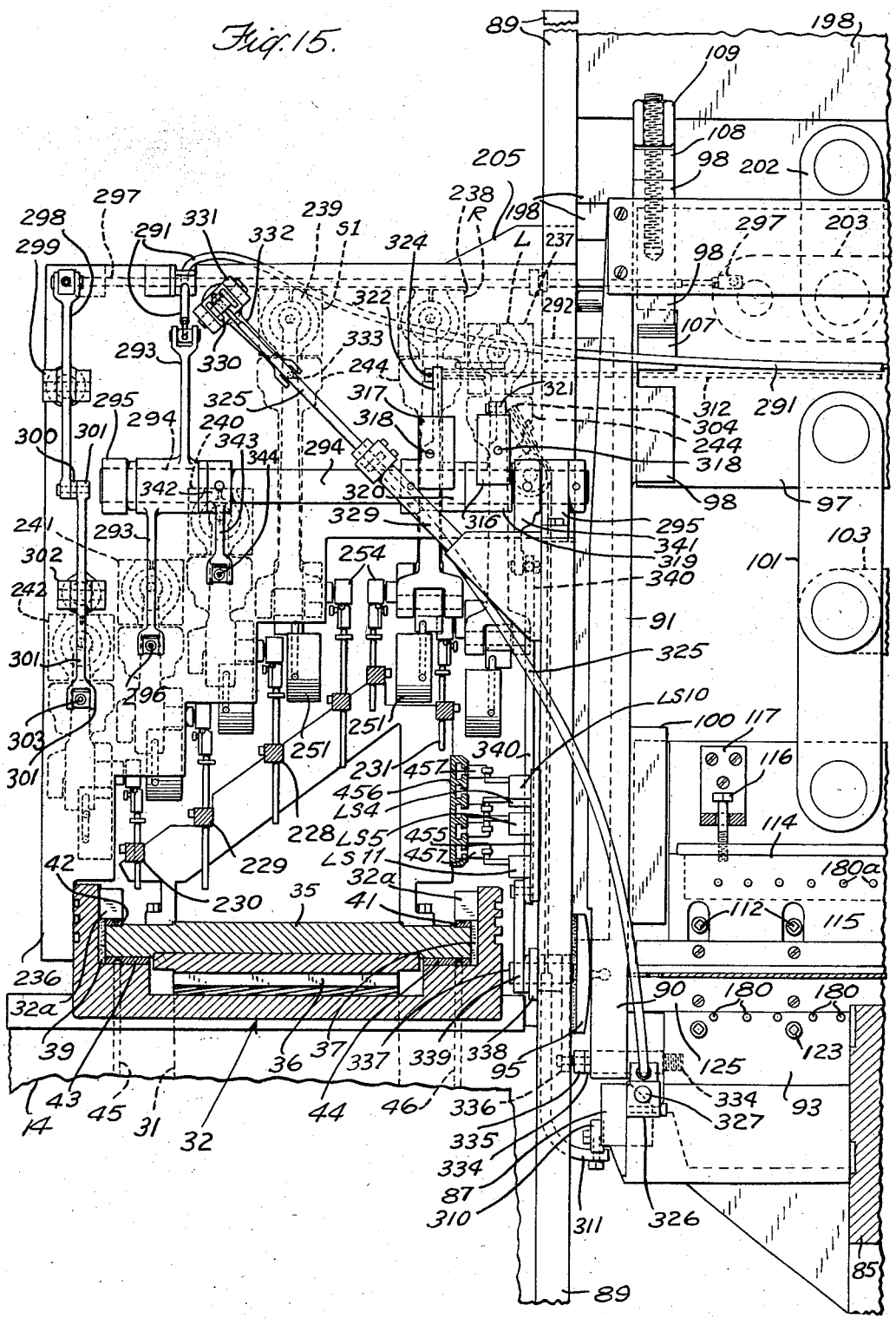

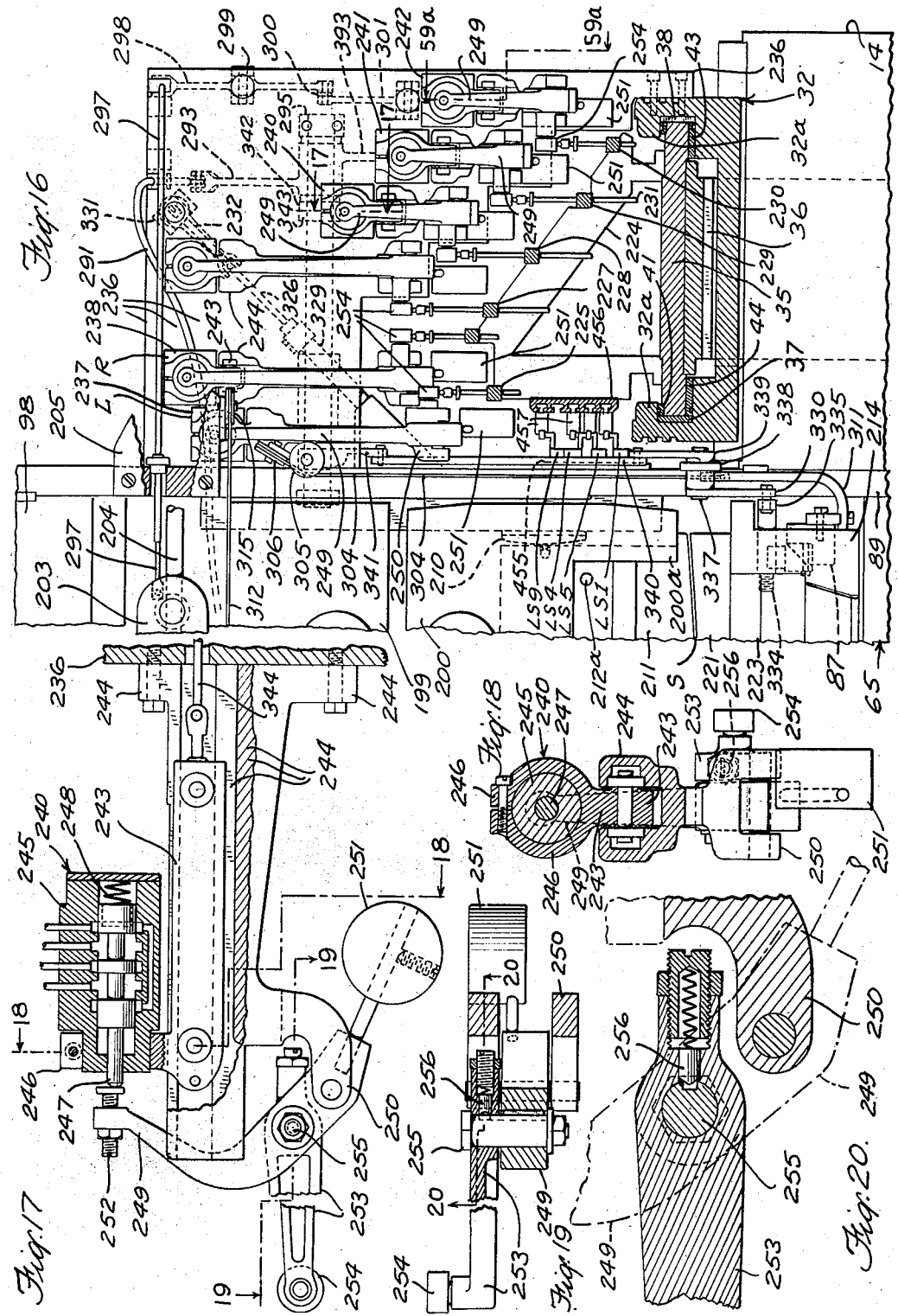

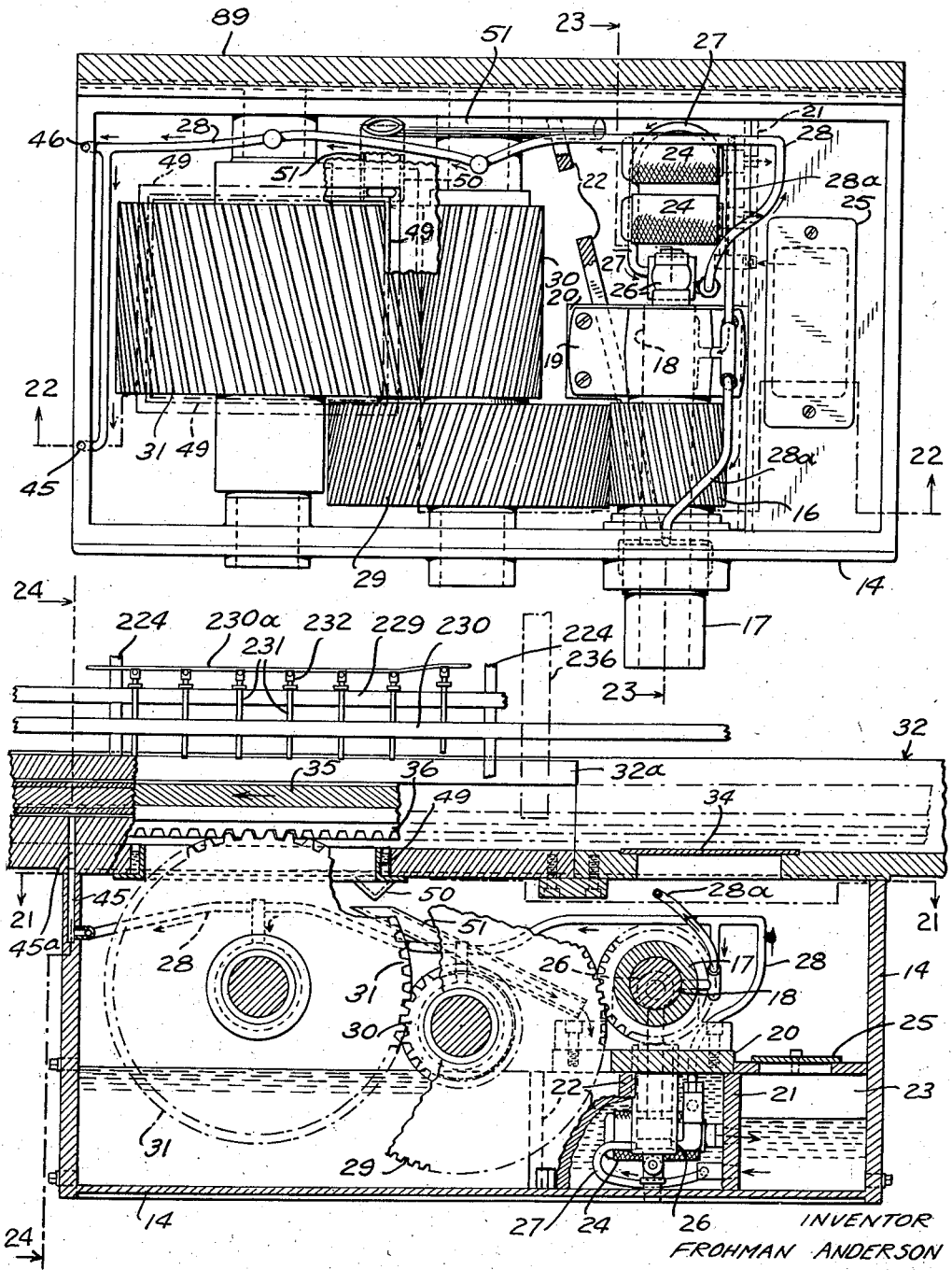

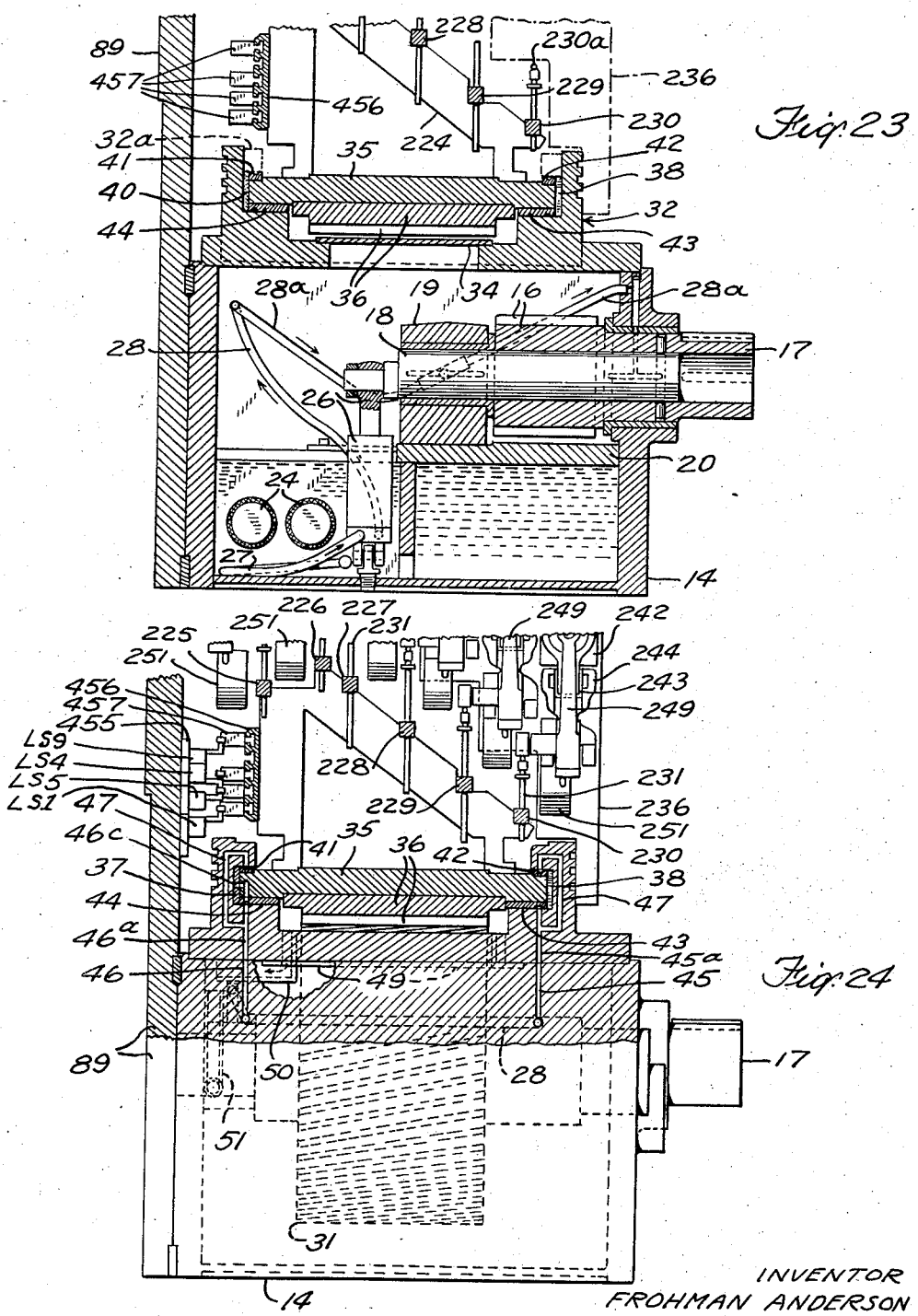

Sept. 9, 1958          F. ANDERSON          2,851,080
APPARATUS FOR FORMING SHEETS INTO COMPOUND
CURVES BY DRAWING OVER FORMING ELEMENTS IN
A SUCCESSION OF FORMING STAGES
Filed Feb. 8, 1955          35 Sheets-Sheet 15
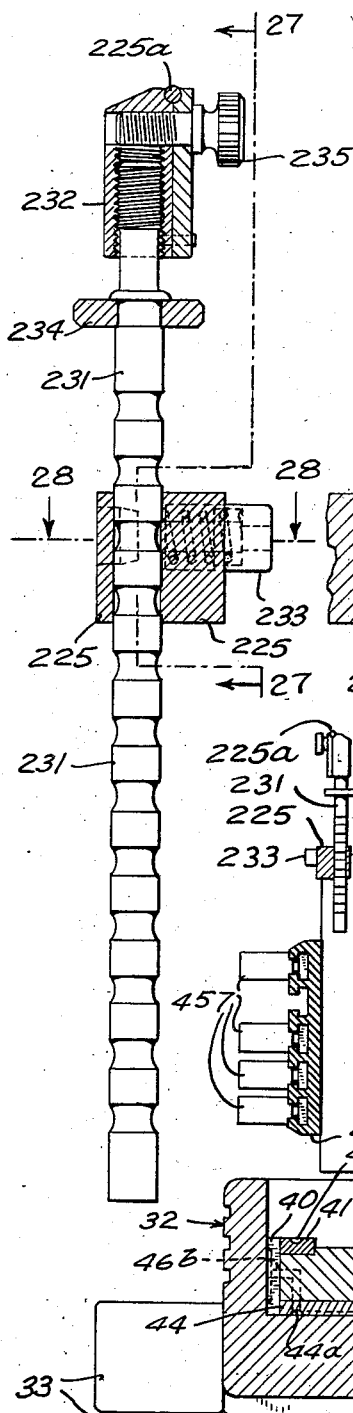
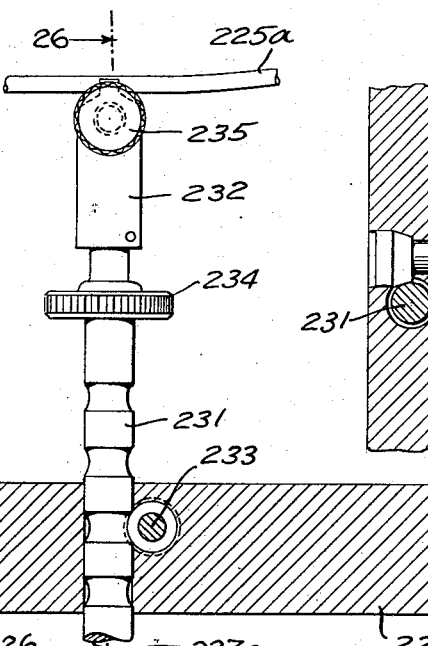
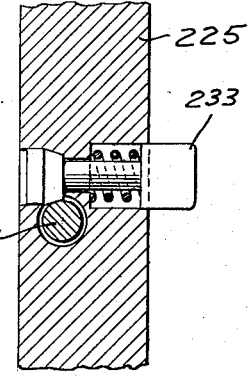

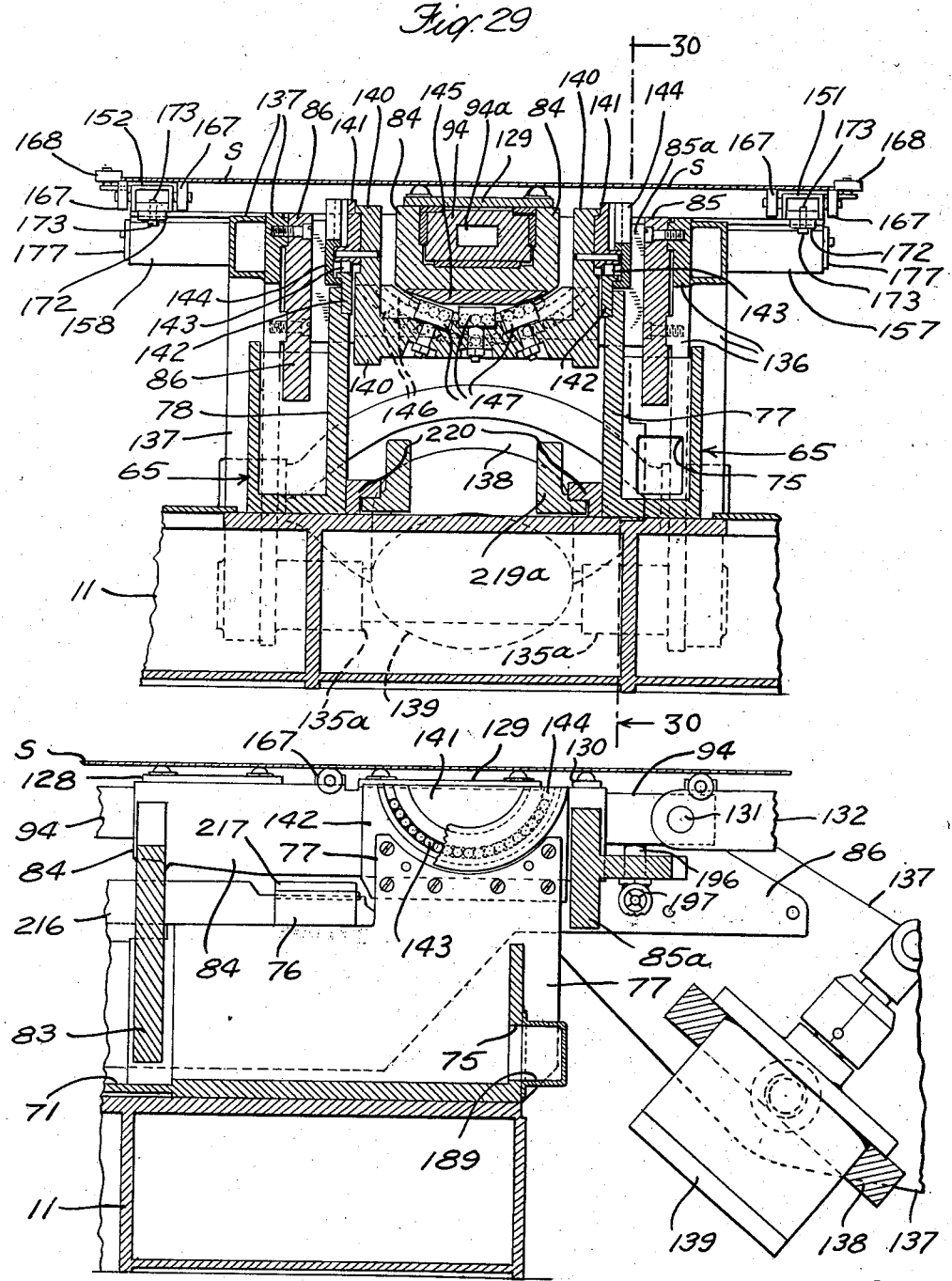

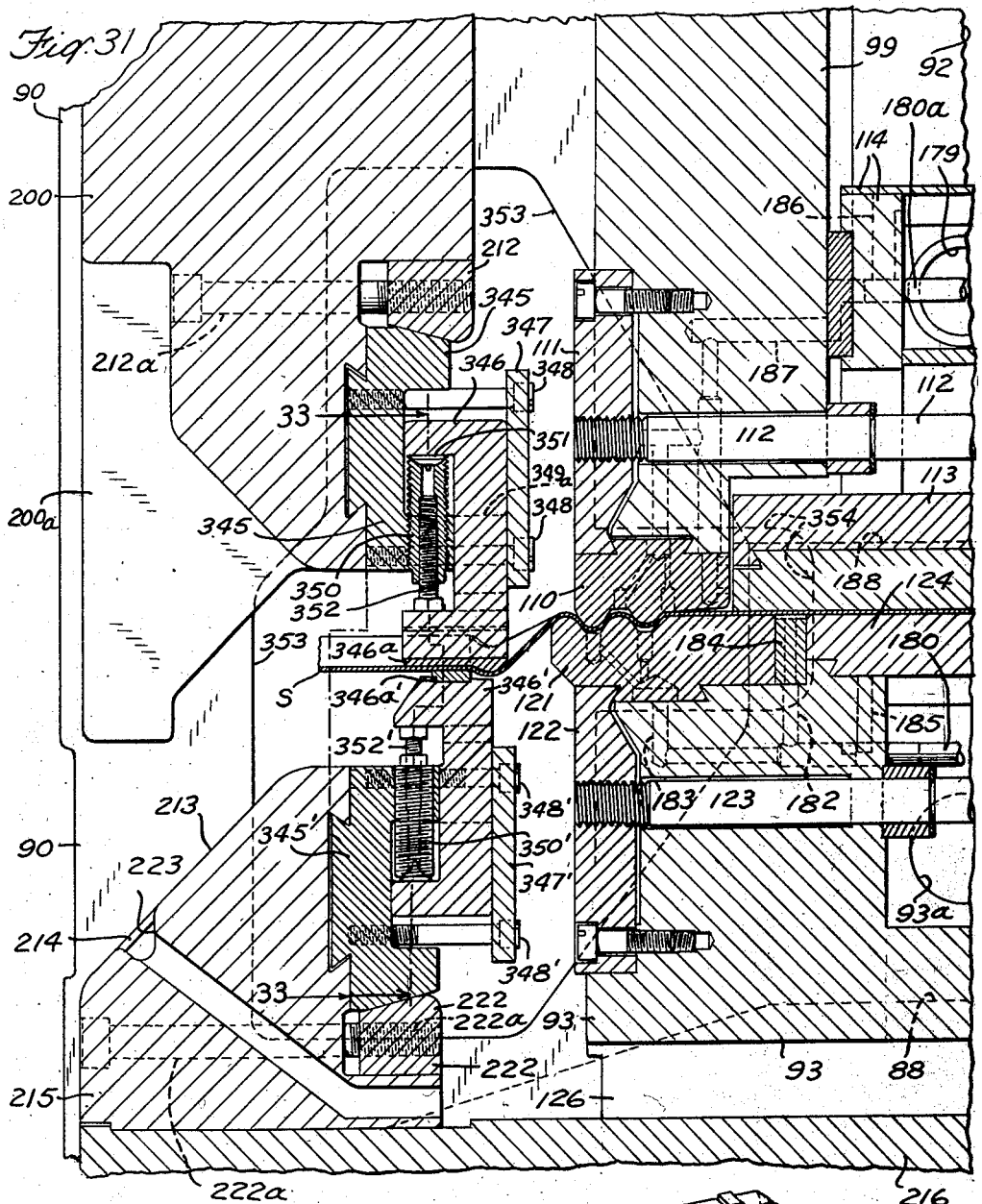

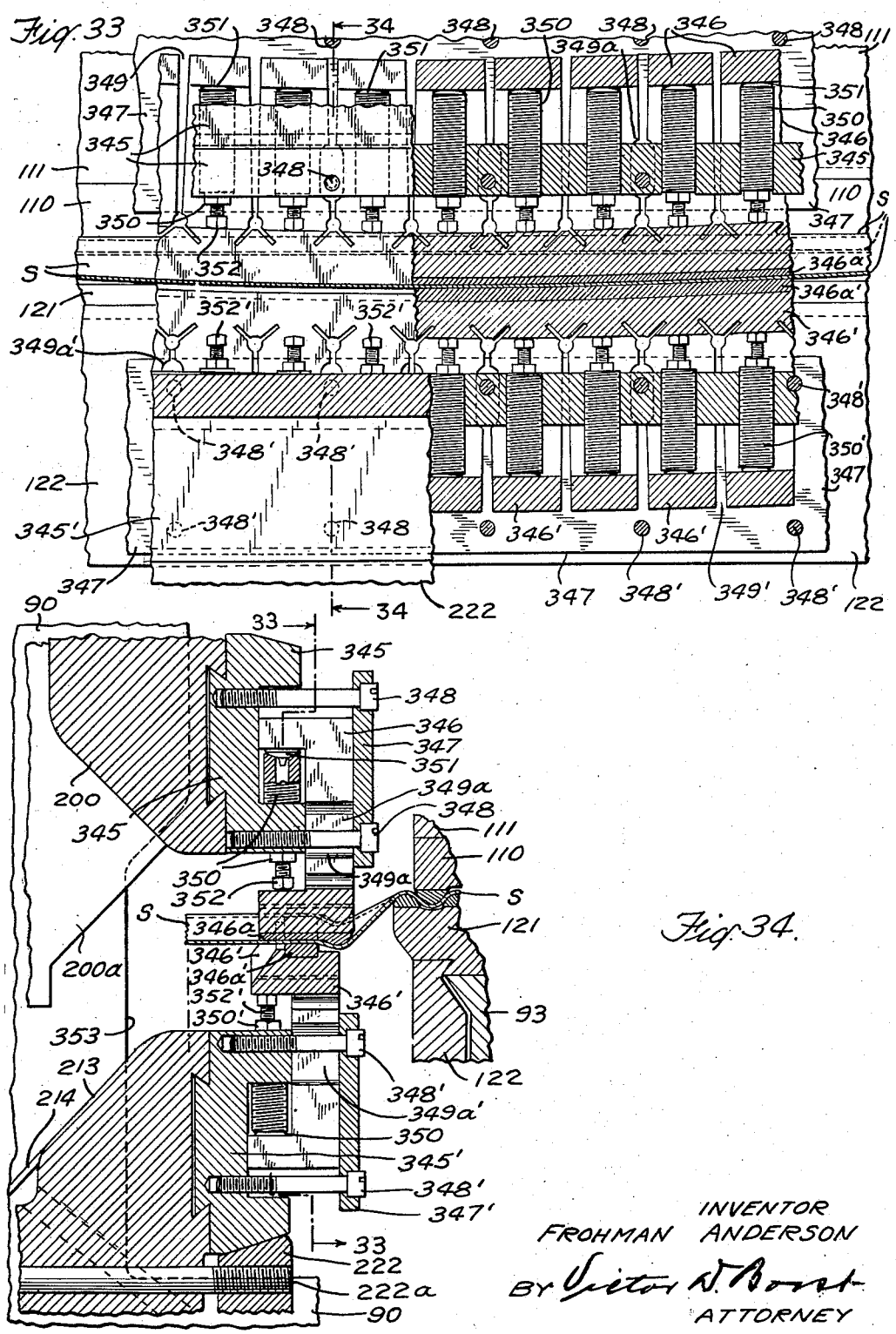

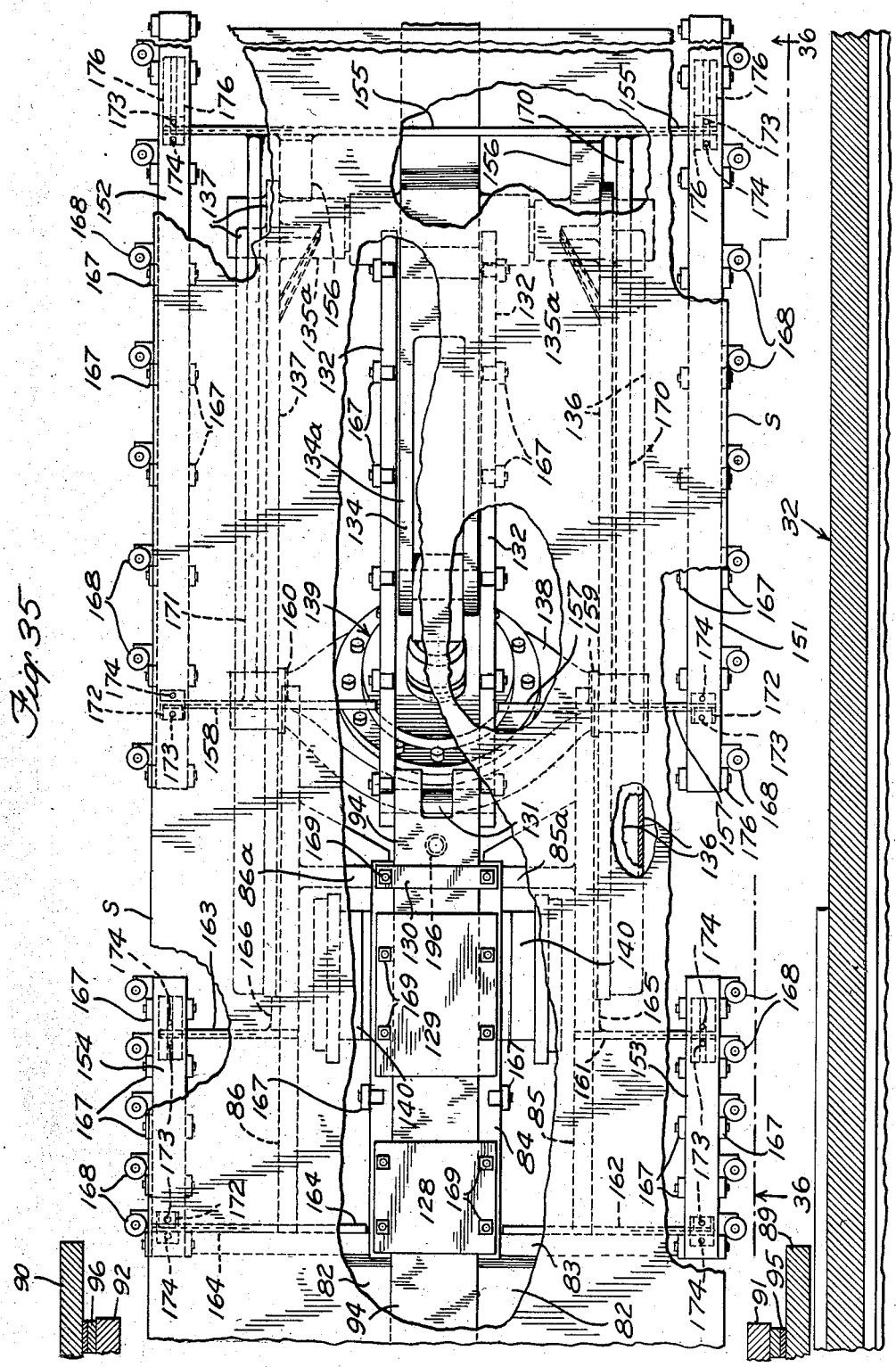

Sept. 9, 1958　　　　　F. ANDERSON　　　　2,851,080
APPARATUS FOR FORMING SHEETS INTO COMPOUND
CURVES BY DRAWING OVER FORMING ELEMENTS IN
A SUCCESSION OF FORMING STAGES
Filed Feb. 8, 1955　　　　　　　　　　　　35 Sheets-Sheet 20
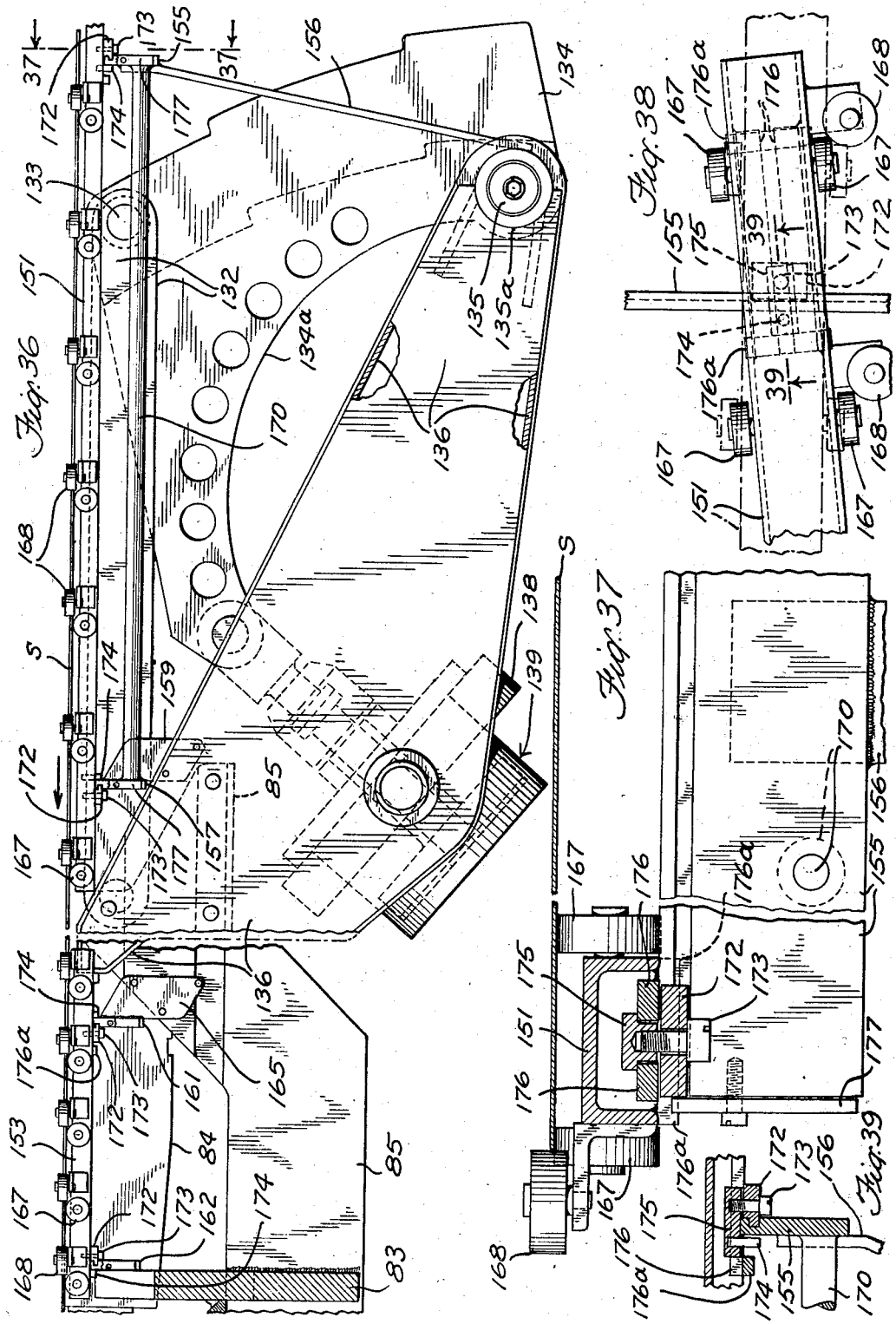

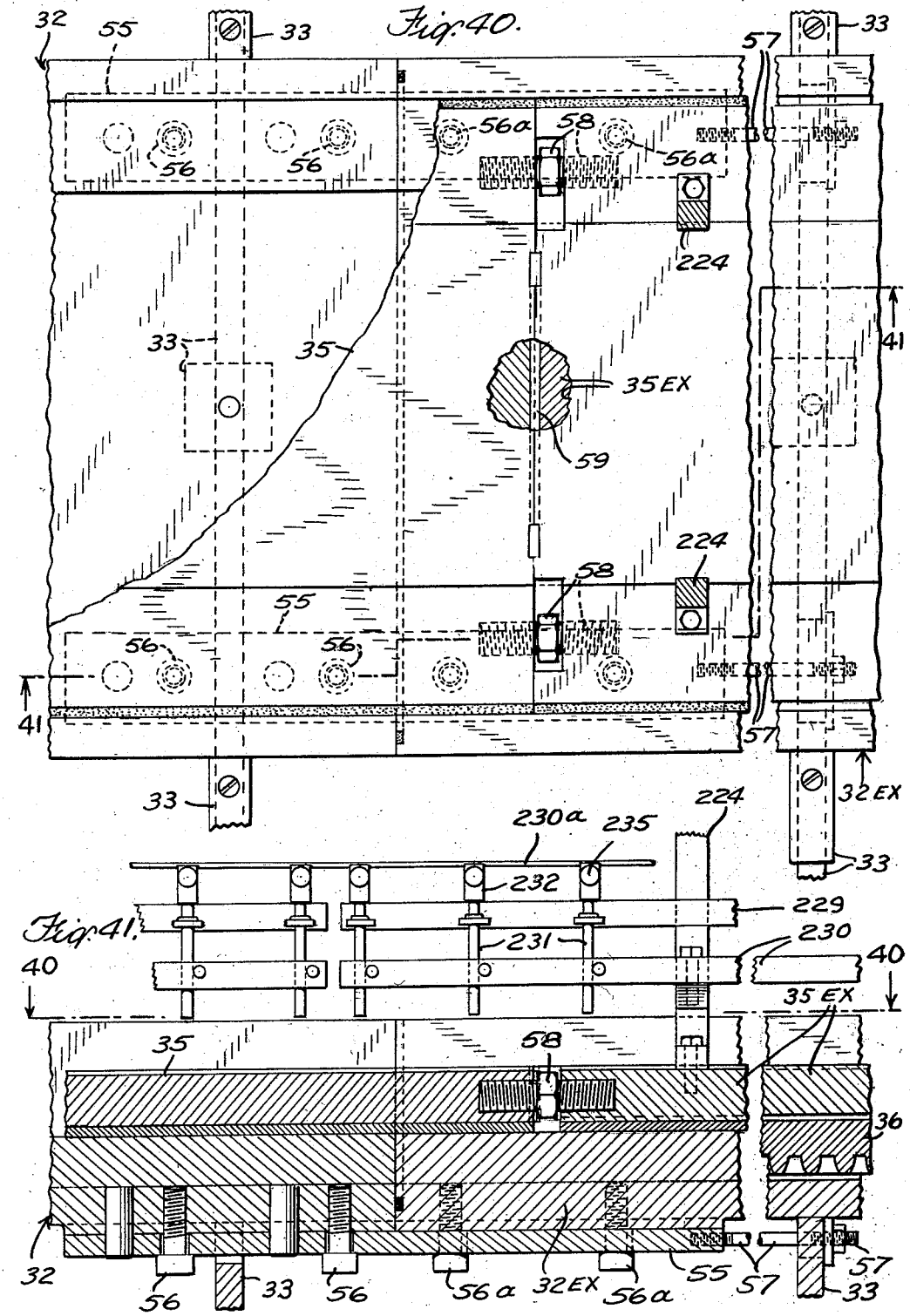

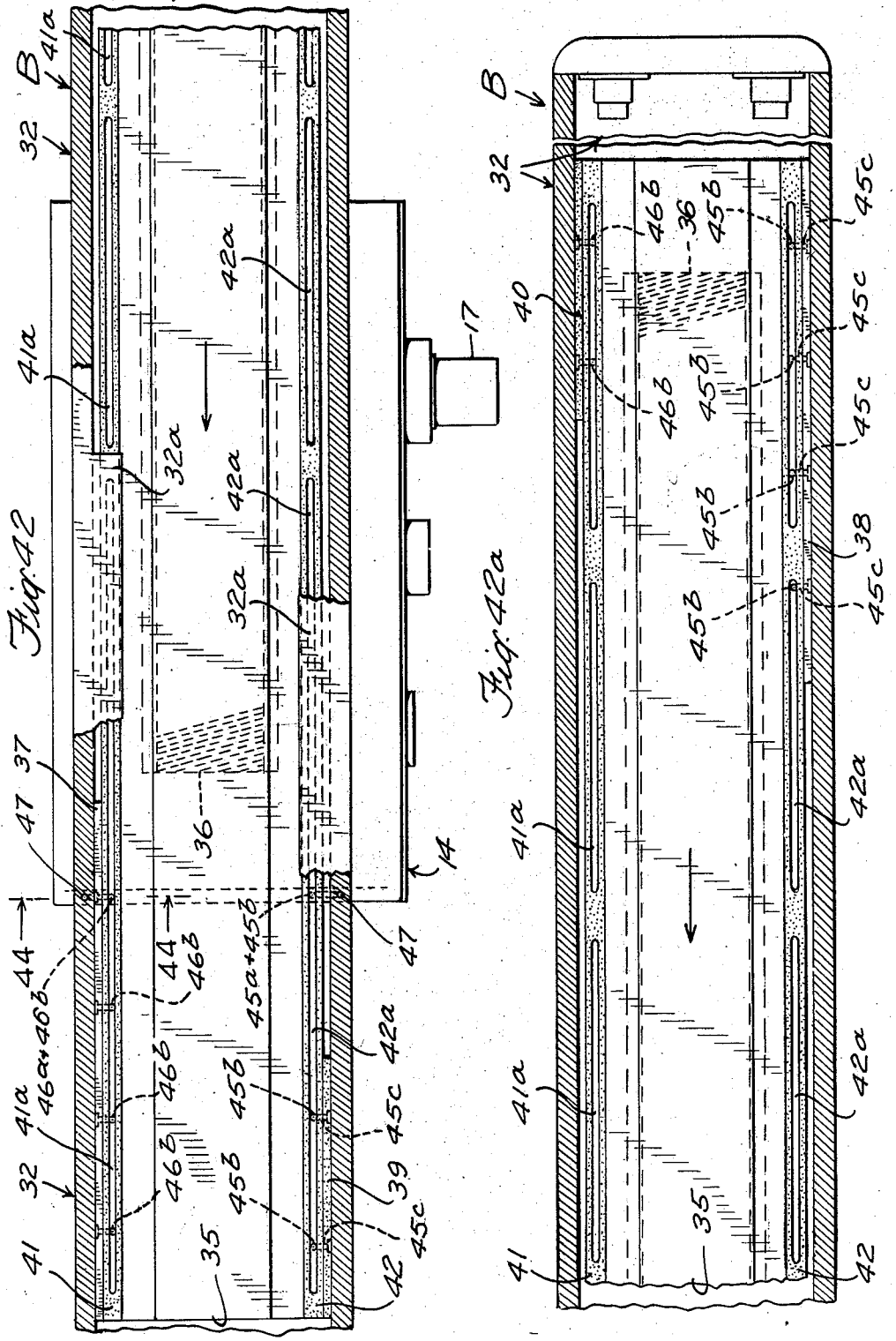

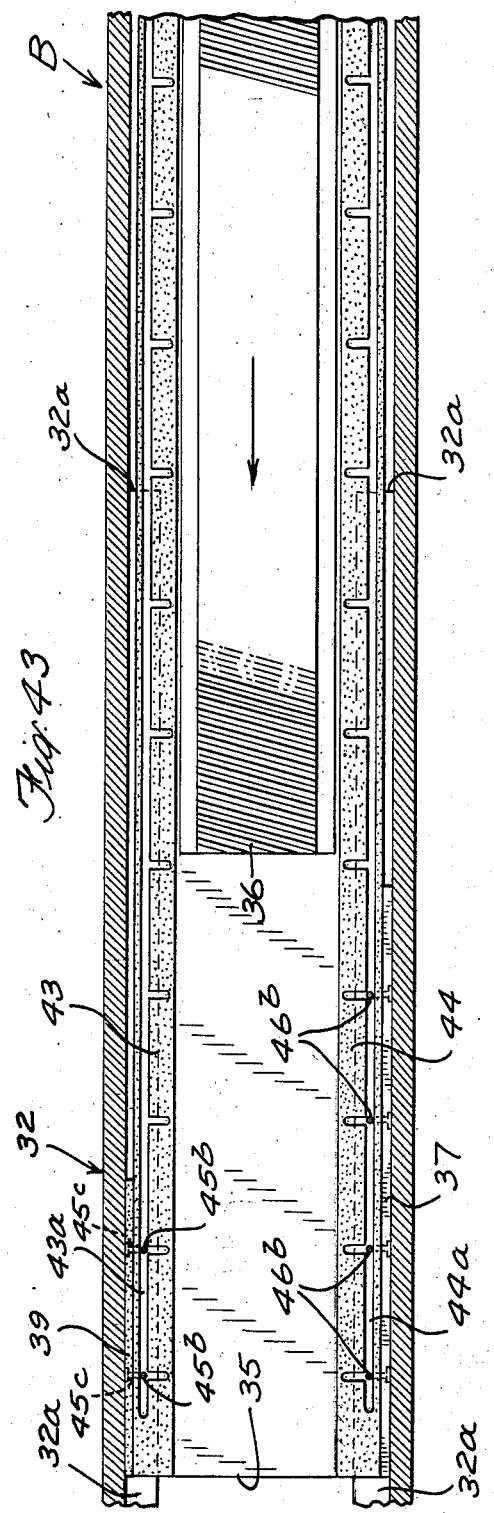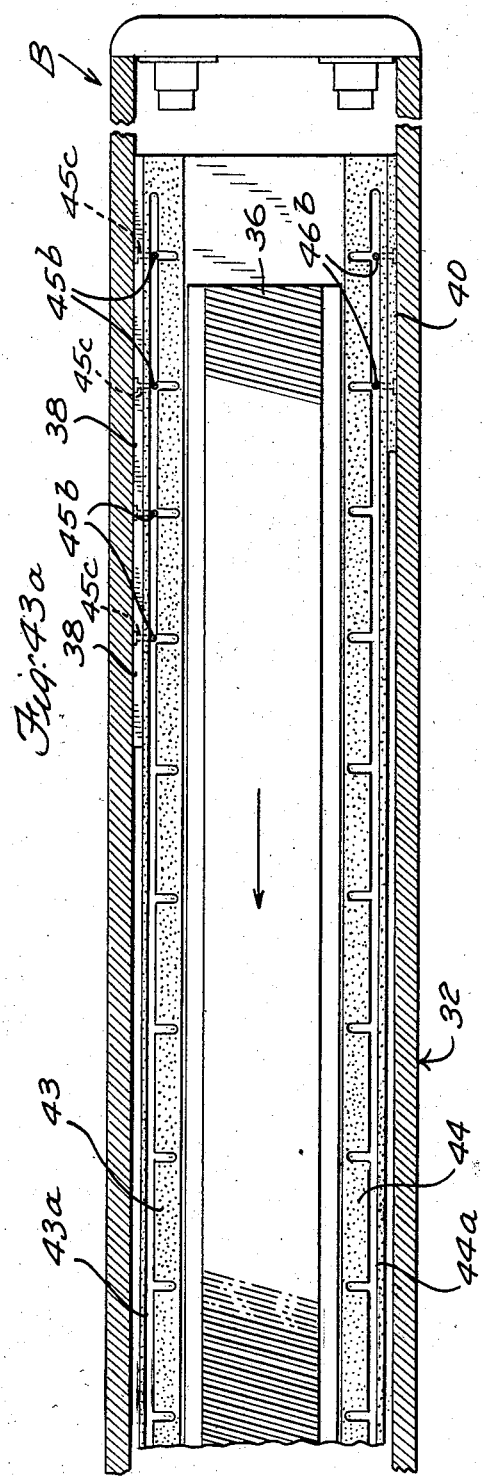

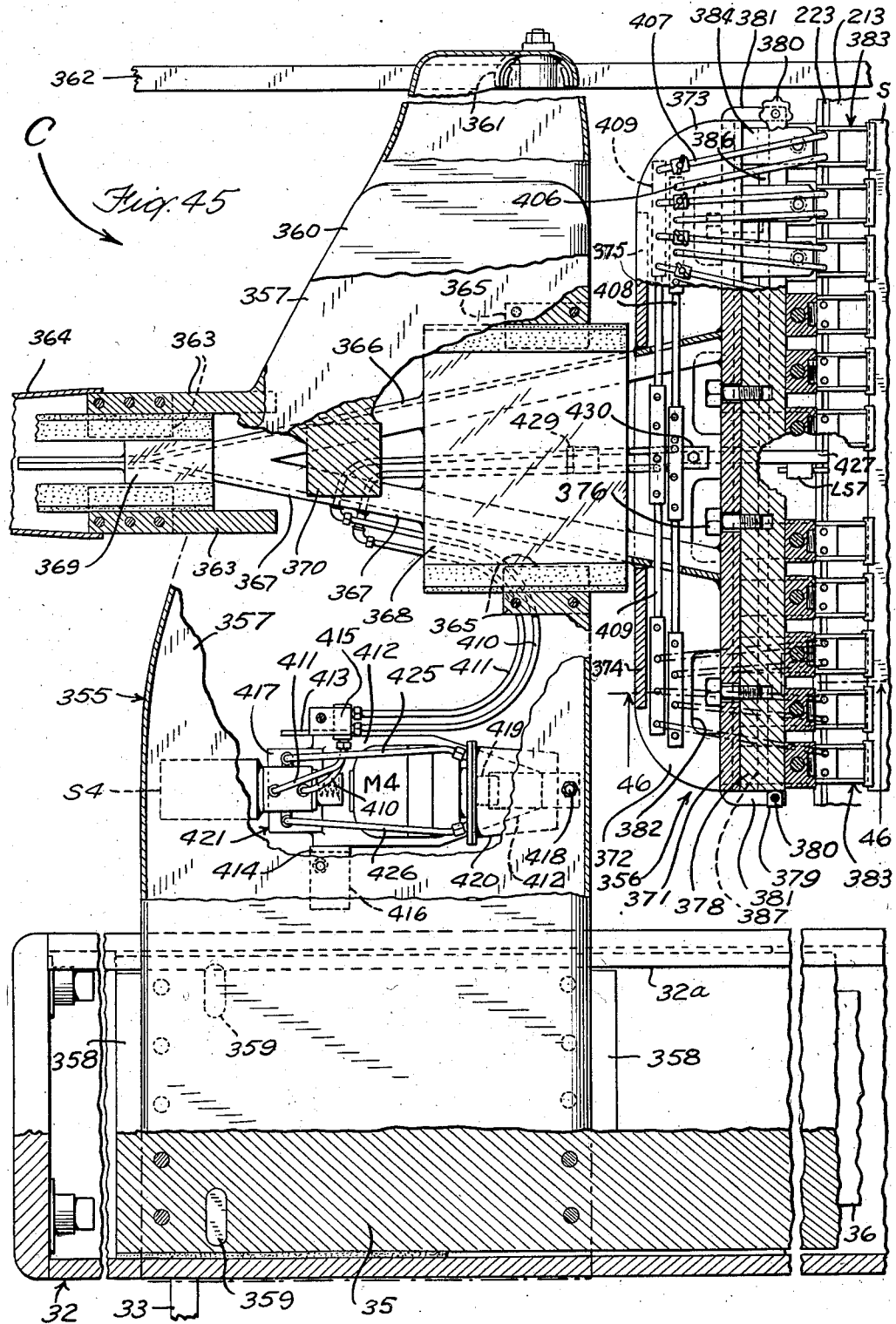

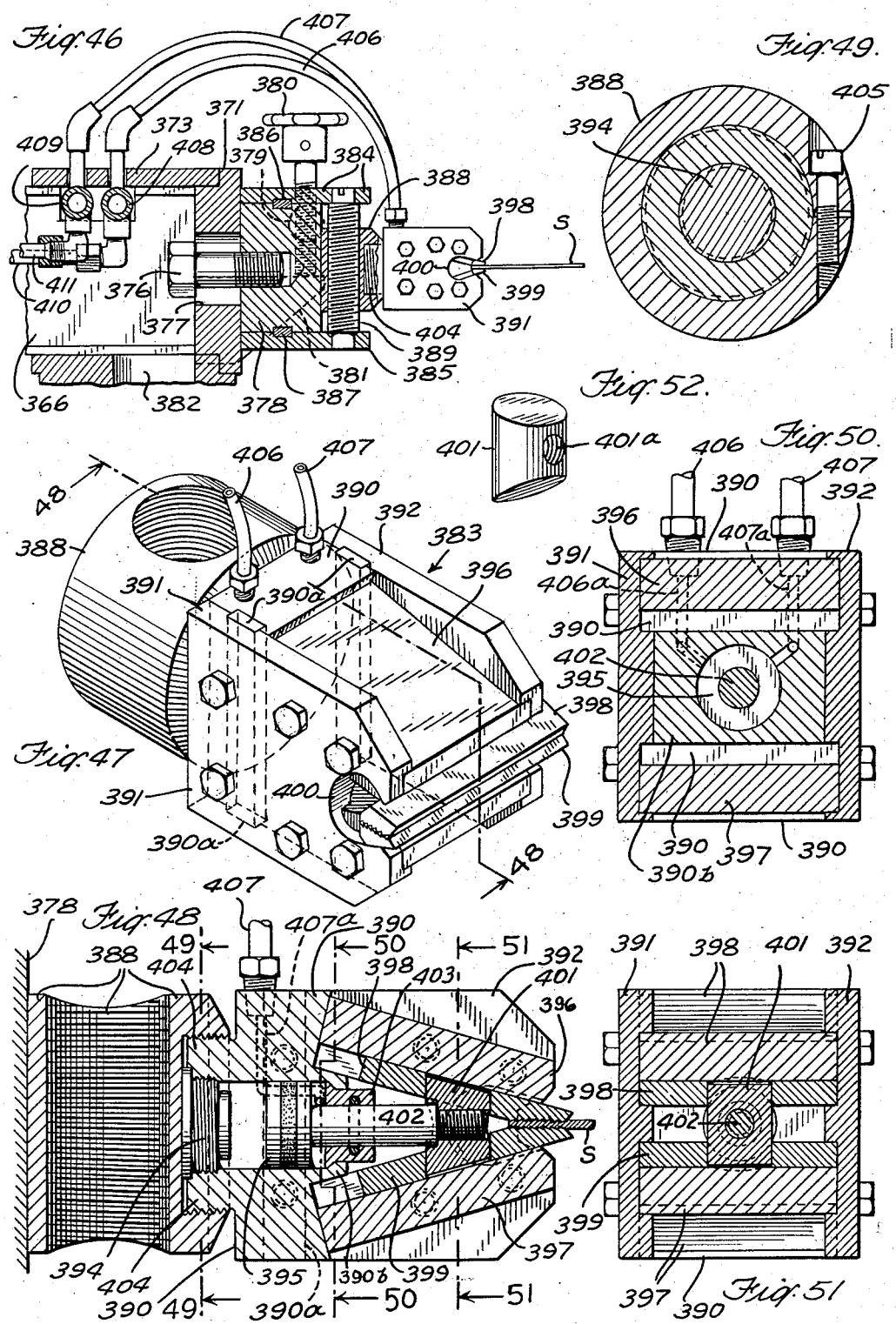

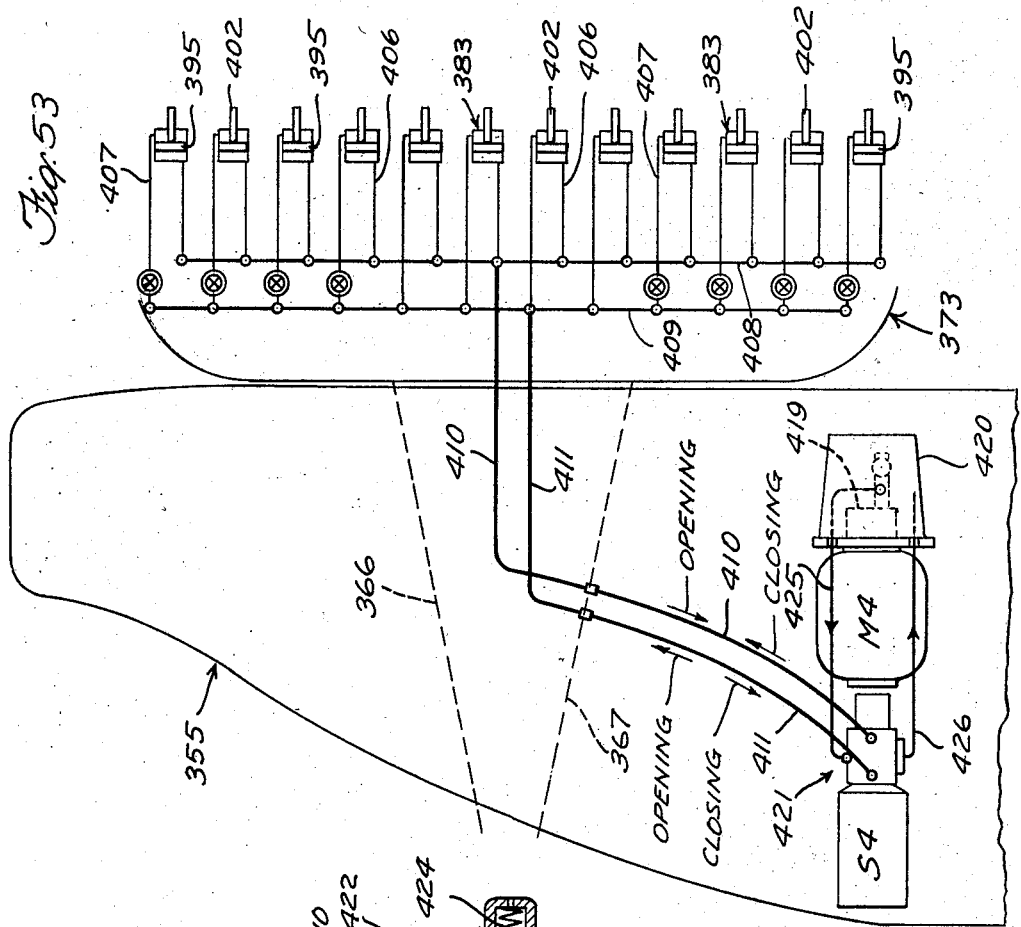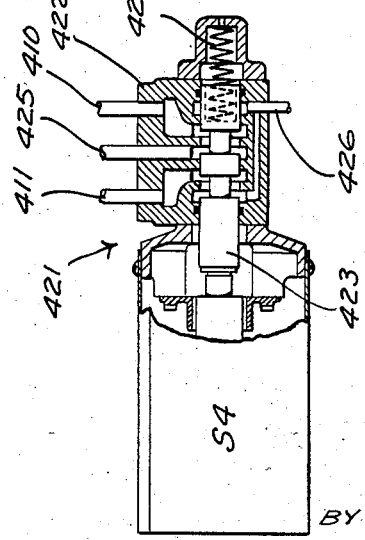

Sept. 9, 1958
F. ANDERSON
2,851,080
APPARATUS FOR FORMING SHEETS INTO COMPOUND
CURVES BY DRAWING OVER FORMING ELEMENTS IN
A SUCCESSION OF FORMING STAGES
Filed Feb. 8, 1955
35 Sheets-Sheet 28
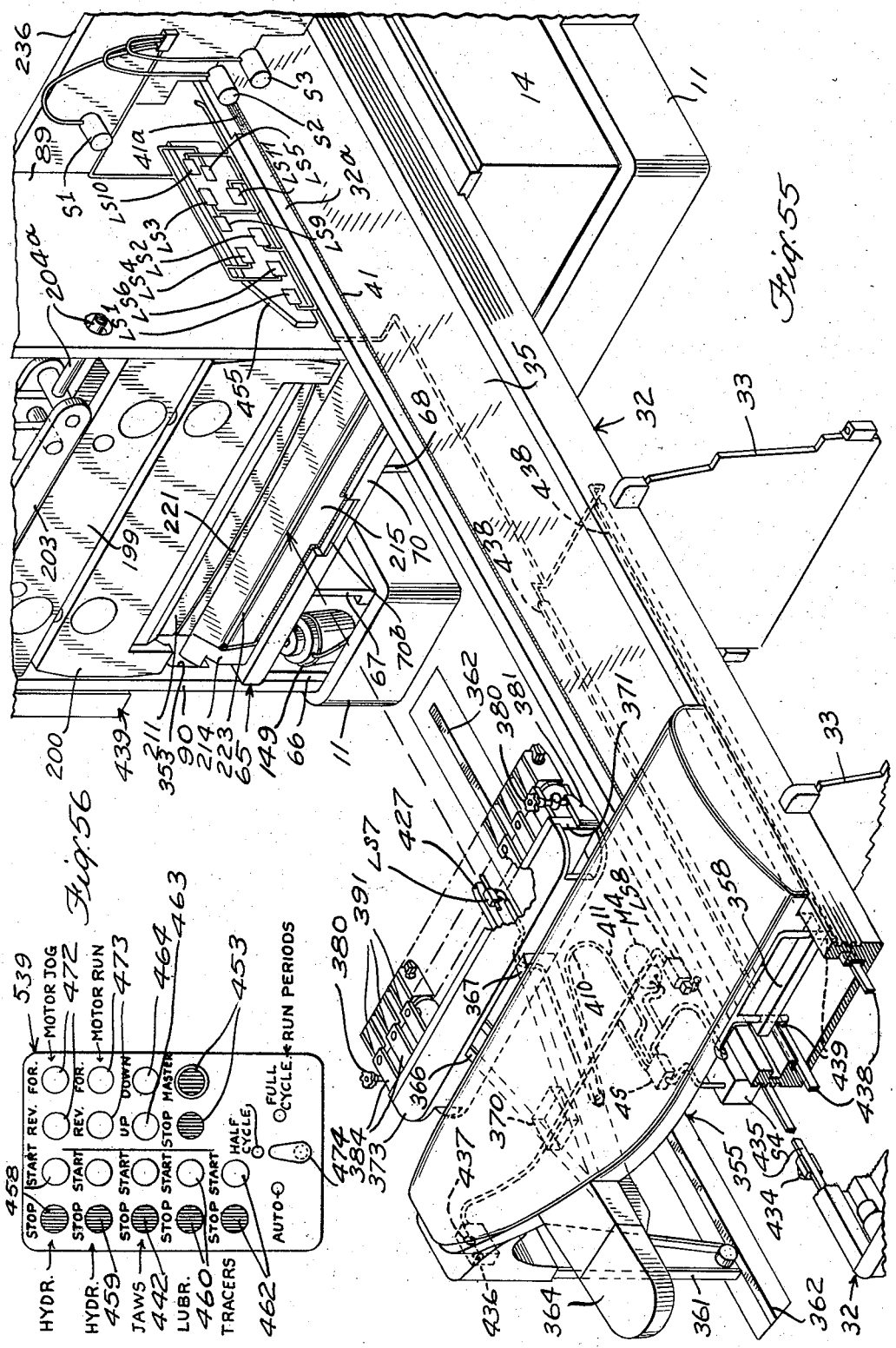

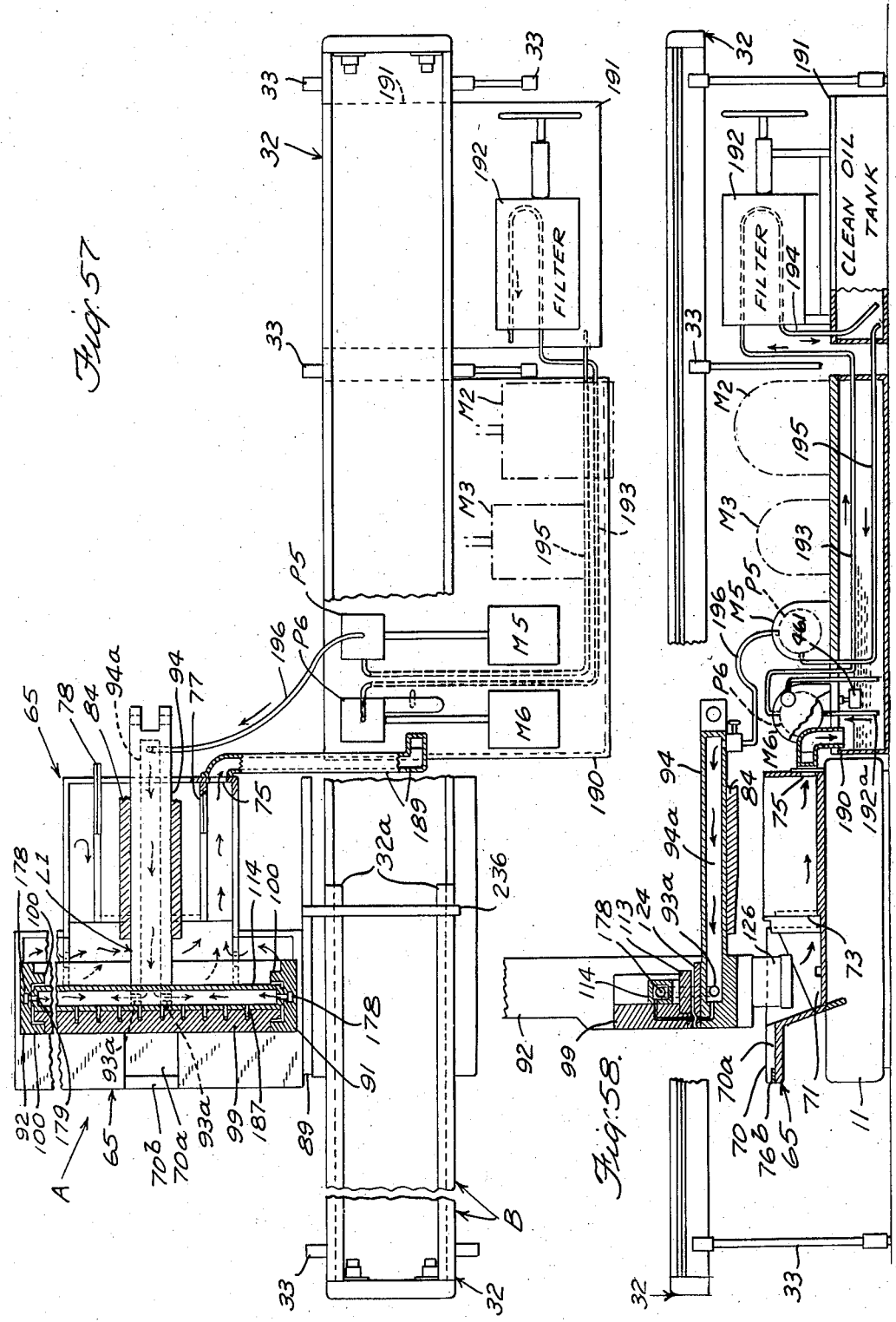

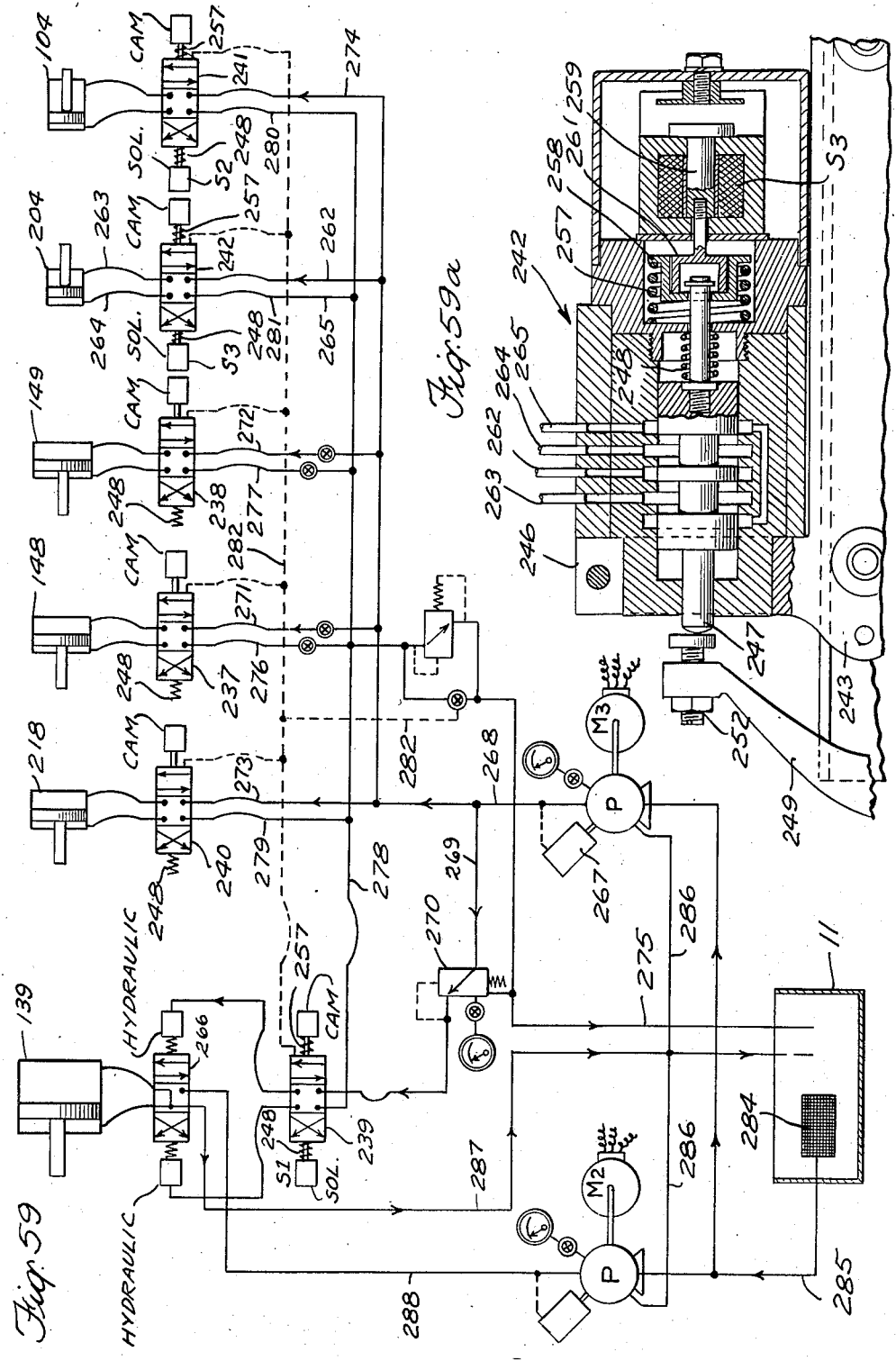

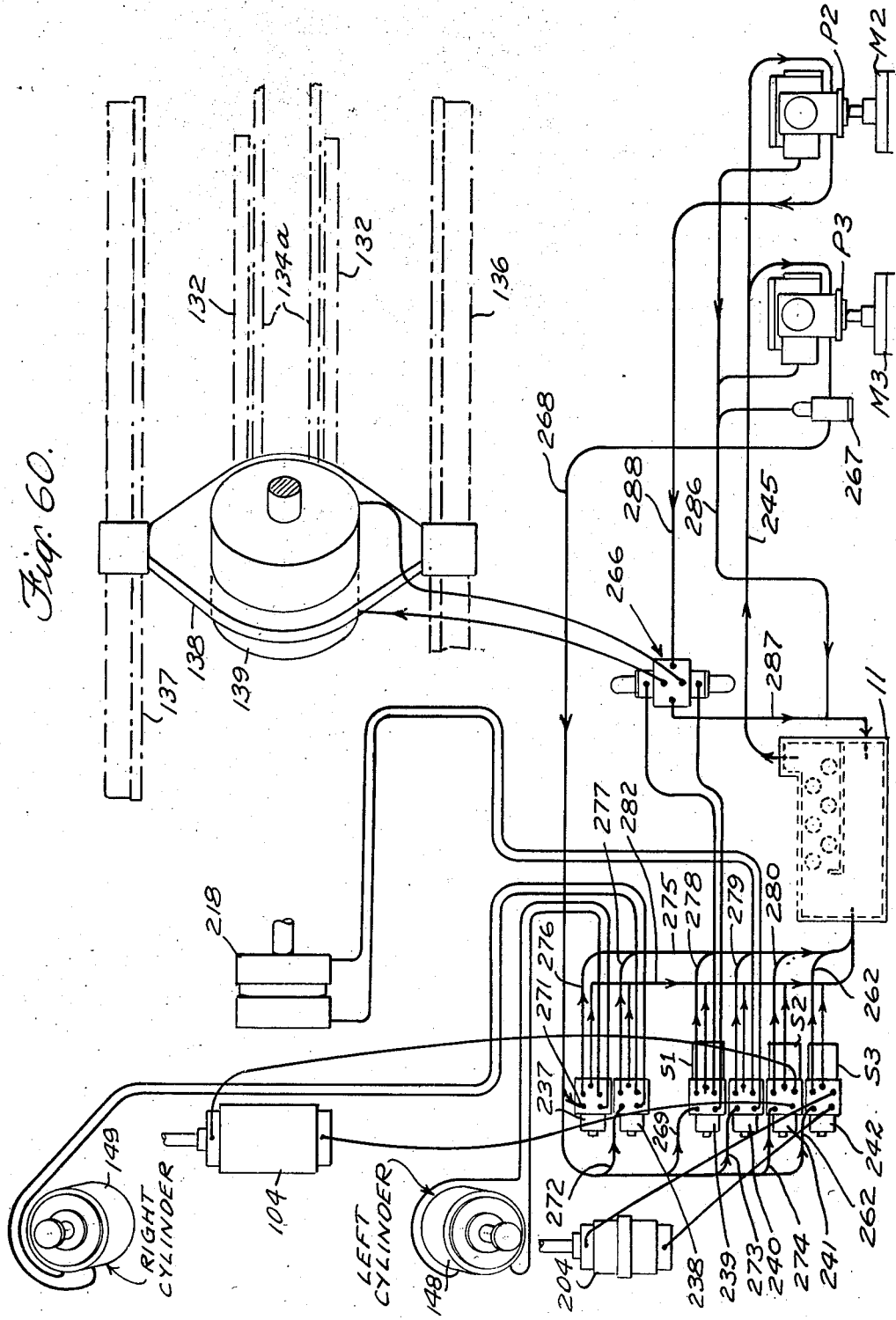

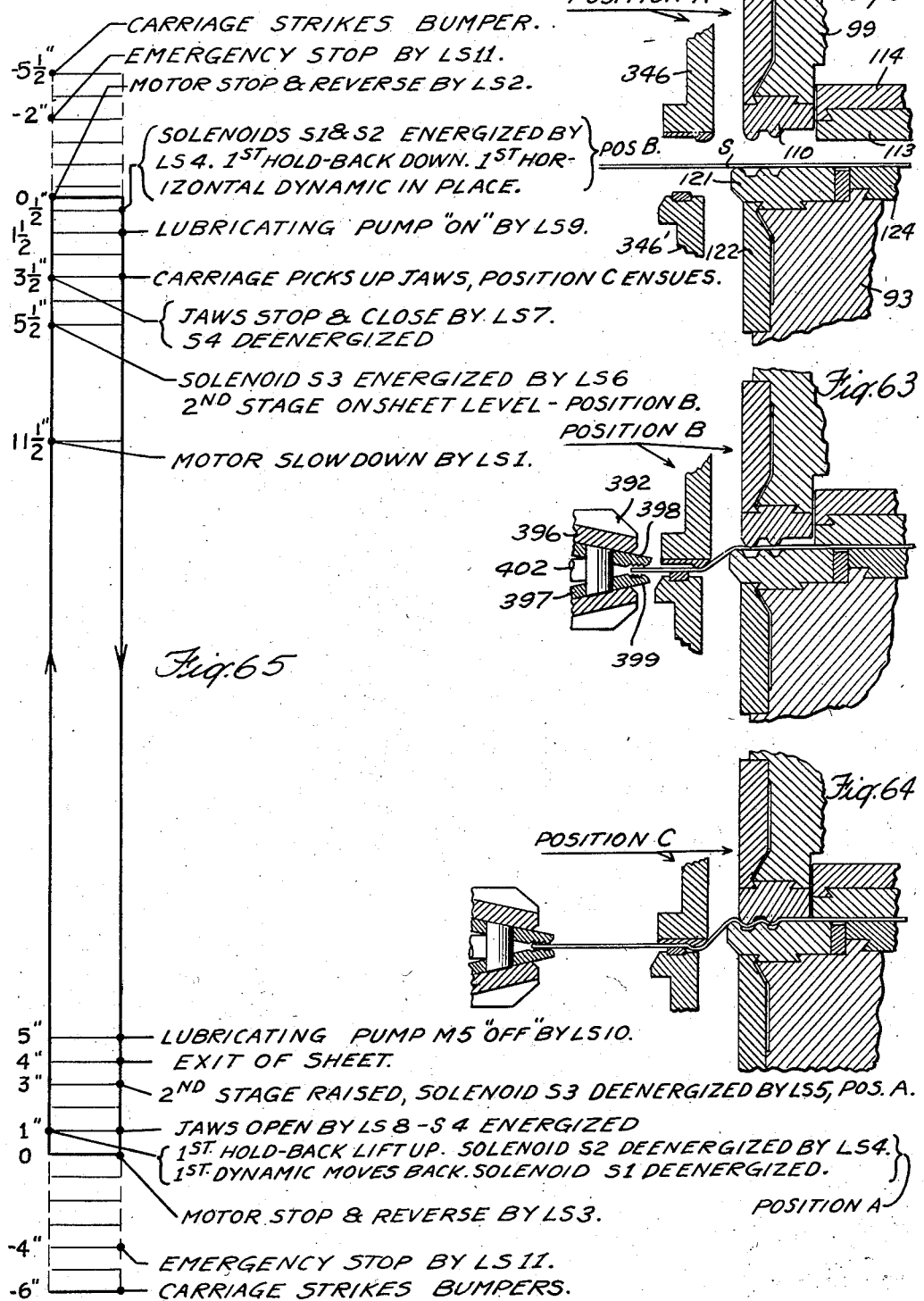

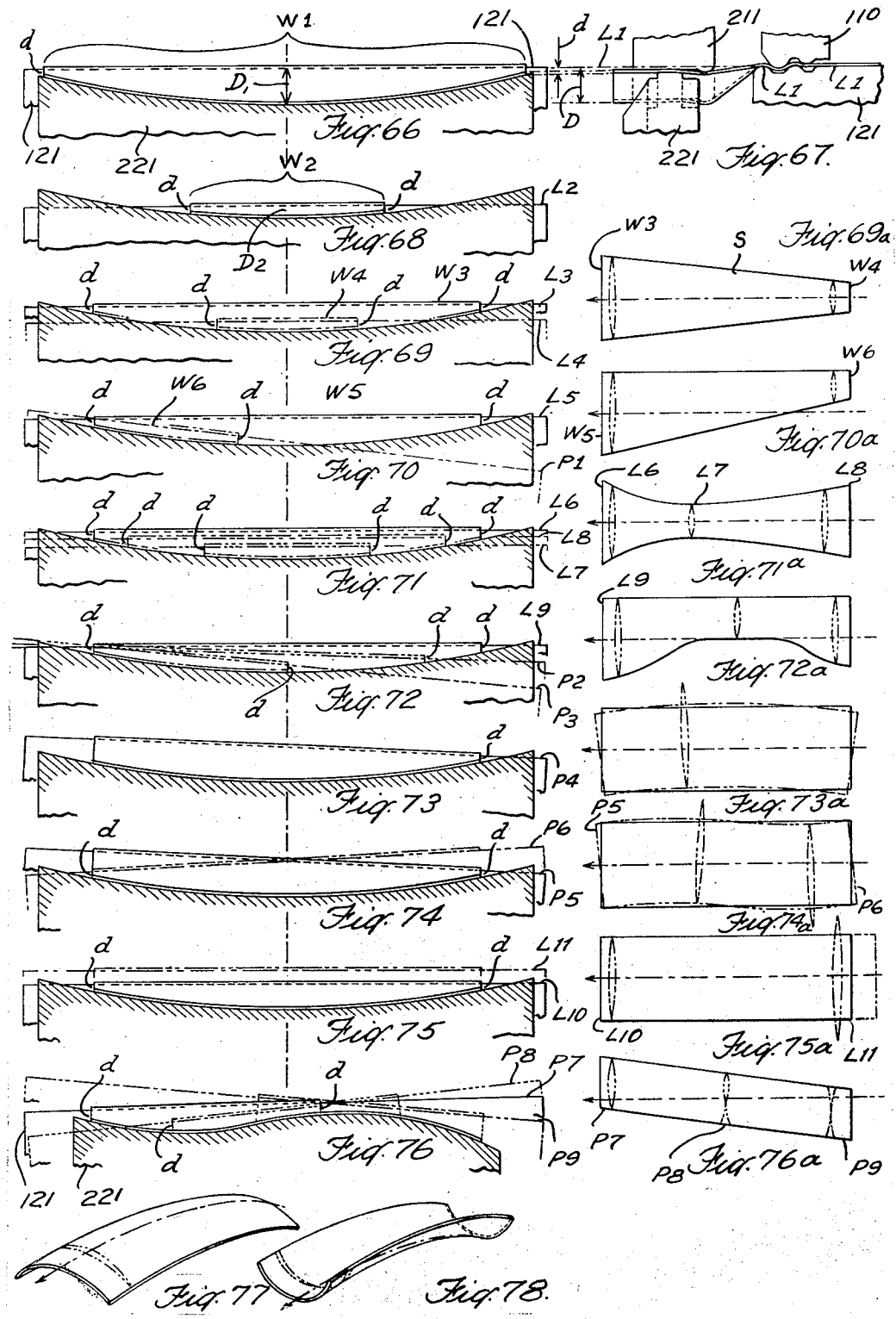

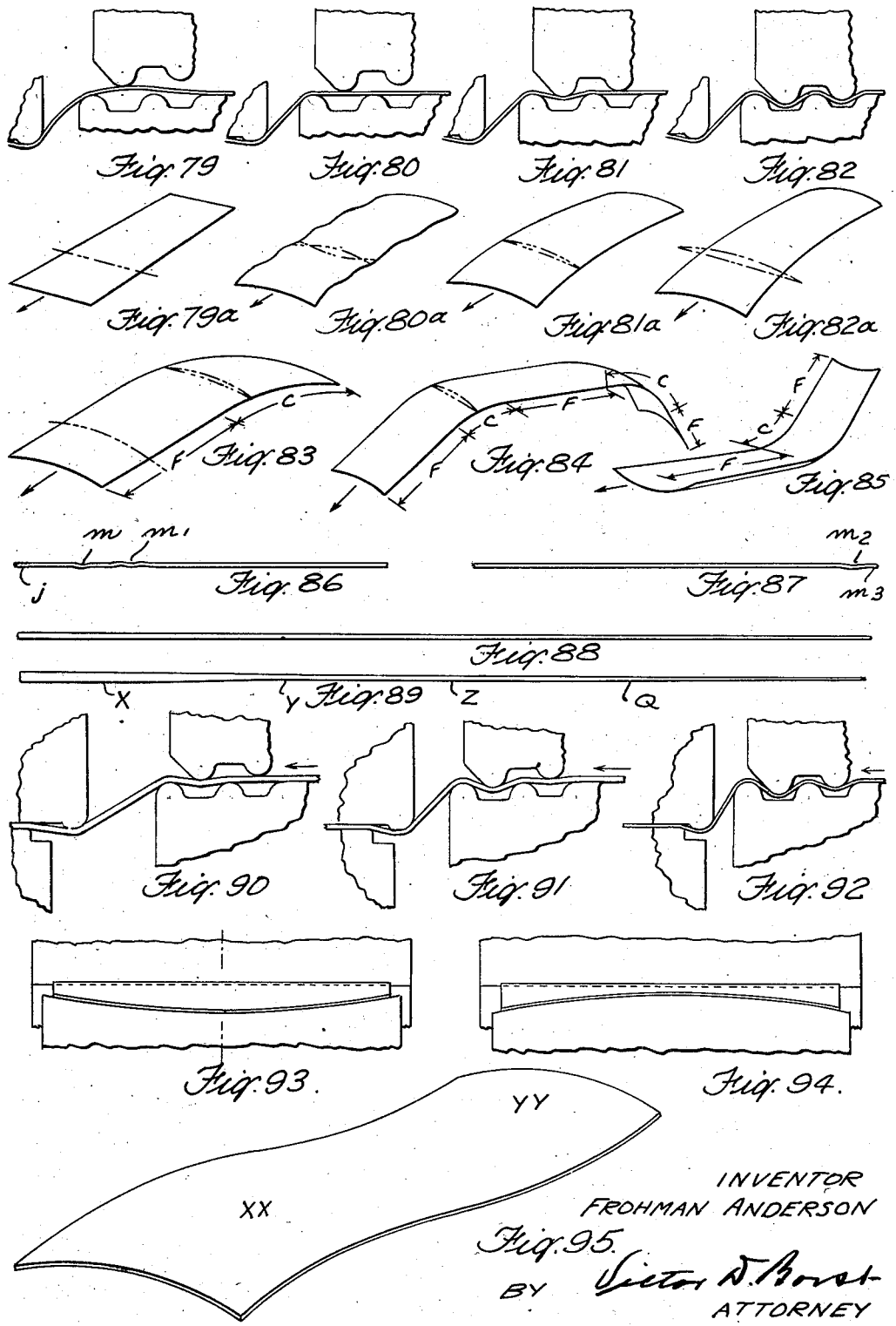

United States Patent Office 2,851,080
Patented Sept. 9, 1958

2,851,080

APPARATUS FOR FORMING SHEETS INTO COMPOUND CURVES BY DRAWING OVER FORMING ELEMENTS IN A SUCCESSION OF FORMING STAGES

Frohman Anderson, New York, N. Y.

Application February 8, 1955, Serial No. 486,773

44 Claims. (Cl. 153—2)

This invention relates to machines for forming sheet metal with compound curvature by drawing or pulling the sheets over forming elements as distinguished from the conventional operations of draw presses and stretch presses. Such machines are known as forming-by-drawing machines, the principle being illustrated in United States Patent No. 2,480,826, issued September 6, 1949.

The forming-by-drawing operation involves three stages of operation upon a sheet being drawn through the machine, the first two stages coacting to impart a differential longitudinal stretch to the sheet, that is, a longitudinal stretch which varies across the width of the sheet, and the third stage acting to proportion the relative surface longitudinal dimensions to the inherent longitudinal curvature of the sheet introduced by the differential longitudinal stretching. In other words the third stage functions to counteract to a controlled extent the uneven displacement of the metal through the thickness of the sheet incident to the drawing of the sheet over the forming elements of the first and second stages.

In principle, the sheet is drawn over stepped forming elements which provide contact lines where the sheet changes direction differing in geometric shape and the sheet is subjected to a tensile stress beyond its elastic limit. Consequently there are progressively introduced into the sheet longitudinal increments determined by the difference in geometric shape of the forming elements and by the length of the material between the forming elements, that is, by the separation between the elements.

If, for example, the first stage forming element has a straight, horizontal working edge and is located reasonably close to the second stage, and the second stage element has a downwardly curved working edge, that is, one which is lowest at its center, the sheet will have its maximum elongation at the center; while if the second stage element has an upwardly curved working edge, that is, one in which its center is highest, the sheet will have its maximum elongation at the side edges. The elongation at the side edges in the first instance and at the center in the second instance will depend upon the drop or vertical distance between the level of the first stage element and that of the second stage element in the common vertical plane through those points and upon the thickness of the material. In general it may be said that there will be no elongation in such planes if the drop is less than three to six times the metal thickness, and that if the minimum drop exceeds six times the metal thickness there will be elongation in the zone or zones of minimum drop.

For instance, if the curve of the second stage element is down at its center and the drop at the edges of the sheet being formed is from three to six times the metal thickness, the edges of the sheet will not be elongated and the increments will uniformly diminish from maximum at the center to zero at the edges; while if the drop is greater than the three to six times the thickness the zero point of the increments will lie outside the edges of the sheet, and if the drop is less than the three to six times the thickness, the zero point of the increments will be inside the edge of the sheet.

A restraining force is applied to the sheets as they are drawn over the forming elements, sufficient to subject the sheets to a tensile stress beyond their yield point. For example, with commercial sheets of material known as 24ST aluminum alloy, the yield point is at 43,000 pounds per square inch, at which the material passes over from the elastic into the plastic range. The first stage provides this restraining or hold-back force and it is therefore known as the hold-back stage. For this purpose it is composed of two opposing members which may be caused to impose more or less of a drag on the sheet. In practice they have complementary convolute or beaded cooperative faces and their approach determines the amount of drag they exert, which is never sufficient to lock the sheet. The draw or pulling force on the sheet is just enough greater than the hold-back force to cause the sheet to progress over the forming elements.

The depth of the curvature imparted to a sheet being drawn over the two forming elements depends not only upon the difference in relative curvature between the two elements, but also upon their horizontal spacing, that is, upon the ration between the longest and shortest longitudinal dimensions of the instantaneous portion of the sheet between the two forming elements. Therefore, as described in said patent, the varying of this horizontal spacing dynamically during the forming draw will effect a modification of the depth of the curvature being produced.

The change of direction as the sheet is being drawn over the second stage element causes a differential elongation through the thickness of the sheet, the outer face being stretched more than the inner face. This causes a tendency of the sheet to coil up and, as explained in said patent, the third stage element is disposed to engage the side of the sheet opposite that engaged by the second stage element and equalize or effect the desired proportion between the elongation of the two surfaces due to being bent around forming elements. In other words, the third stage introduces a negative coiling tendency to counteract to the desired extent the positive coiling tendency produced in the second stage. The sharpness of the bending over the third stage element depends upon the distance between the second and third stages, as well as the relative elevation of the third stage element, and the effectiveness of the third stage made be modified dynamically by moving the third stage to and from the second during the draw.

In order to introduce sheets into the machine in position to be gripped by the jaws it is necessary that the first stage elements be opened or vertically separated, and this is done by raising the upper assembly, leaving the lower element to determine the level of the sheet. Assuming that the second stage element is stepped down from the first stage, the second stage must also be raised from the third stage to admit the sheet to the jaws and the third stage will determine the emergence level of the sheet and, in cooperation with the second stage element, the contour of the leading edge to be gripped by the jaws.

Heretofore the first and second stage elements have been raised and lowered by toggle mechanism either manually or power-operated, thereby affording but two possible positions. Such a construction not only makes it impossible to vary the hold-back or restraint imposed upon a sheet with a given pair of first stage elements, but another fault is the fact that the full descent of the vertically moved elements upon the sheet before the start of the draw is apt to produce beads or indentations in the surface of the sheet which may render that portion of the sheet unusable and so augment the scrap or waste.

One of the objects of this invention is to correct this faul in present machines, and to this end in accordance with this invention dynamic means are provided to control the elevation of the upper first stage element and of the second stage element, so that the elevation will follow or vary according to a desired pattern throughout the cycle of operation. Not only does such dynamic control make possible the variation of restraint upon a sheet of uniform thickness throughout the forming draw, but it is useful in adapting the restraint or hold-back to sheets of varying thickness.

Another object of this invention is to provide means to adjust the increments laterally of a sheet at will and to determine at will the location of the points of zero increments, either at or within or without the two longitudinal edges of the sheet independently.

This capability is useful, for example, in the drawing of a sheet the two side edges of which are not parallel, for instance, a tapering sheet having the shape of a truncated isosceles triangle or one trapezoidal in shape having the two sides at different angles to the leading edge. The need also may arise with an oblong sheet in which it is desired to effect differential elongations of the edges. Thus it might be that the points of zero increments be made to lie at or within one side edge and outside the other side edge.

To provide such capacity it is contemplated in accordance with the invention to vary the vertical distance between the first stage level and the level of the lowest point of the curved second stage forming element; and to vary the relative vertical distances between the first stage levels of the two edges of the sheet and the level of the points in the second stage element in the path of the respective edges.

Specifically this is preferably accomplished by providing in effect a gimbal mounting for the first stage assembly with the axes transverse and longitudinal of the machine, together with means for dynamically moving the first stage assembly about said axes according to a predetermined pattern.

Another object is to provide simple and dependable means for determining the pattern to be followed in the dynamic controls, and accurate and dependable servo means to cause the elements to follow the pattern. To this end, the invention specifically comprehends a flexible cam which is translated with the draw means, and tracer or cam follower means including a valve in control of a servo motor which determines the movement of the element in accordance with the contour of the cam and is self-limiting through a suitable feed-back.

The forming elements are subjected to great stresses and a desideratum is that the forming elements will have the necessary rigidity and strength during the draw and yet may be readily adjusted in contour to adapt them for different problems. Furthermore, the work-engaging faces must be durable and wear resistant.

To meet these needs the invention contemplates a composite forming element in which the work engaging face is of hardened steel integrally united, as by welding, to a relatively soft steel body, and to make the element deformable it is contemplated that the soft body will be slotted from the vicinity of the hardened work face to the opposite edge. The slots are close enough to provide the needed flexibility and the mounting means will include transversely adjustable devices operative to open and close the slots at their open ends and thereby flex the element. The hardened face is a thin strip which will readily flex and the soft steel body provides a rigid backing for it, the contour of which can be changed.

Specifically, the element is preferably channel-shape with the hardened strip on the outer face of one flange and the slots extending from close to the under face of the work strip through the opposite flange. The mounting member has a flange entered between the two flanges of the element and the adjusting devices are screws which engage in the mounting member flange and bear at their ends against the inner faces of the element flanges. Preferably the screws are adjustable in length, for example, being made in two telescopic sections so that the screws may be shortened and relieve pressure at one end to permit the pressure applied at the other end to flex the element.

Another requirement is proper lubrication of the sheets to minimize abrasion of their surfaces. For this purpose means are provided in accordance with the invention to apply lubricating oil to both sides of the sheets just before they enter into the zone of restrain or hold-back, and also to apply oil to both sides at a plurality of points during their passage through the restraining zone.

The first stage work engaging members include opposing flat plates known as guide plates which function to smooth out the sheets on their way to the beaded or convolute hold-back elements, these plates being spaced slightly more than the thickness of the sheets. This space enables a film of oil to be spread over both faces of the sheet, and there are oil ducts on both sides also between the front edges of the plates and their hold-back elements, and likewise oil passages through the hold-back elements deliver oil on the top and bottom of the sheets as they are being subjected to their frictional hold-back.

The lubricating system includes a pump which maintains an oil pressure in the several ducts and passages, and the used oil falls into a sump and runs into a tank from which it is filtered and again pumped into the lubricating system.

Another object which this invention satisfied is the facilitating of access to the forming elements and to the jaws for adjustment or other service upon them. A desirable characteristic of embodiments of the invention is the fact that one side of the machine is open so that a workman can enter in front of the shaping structure when the draw head is retracted and readily adjust the second and third stages forming elements or loosen them for removal or replacement. Access is also thus afforded to the jaws for adjustment or other service on the draw head.

In other words, the invention contemplates a machine having a single draw bench on one side of the shaping structure. Another advantage of such a machine is the fact that it does not require a pit for cross drive members as is the case with machines having a draw bench on each side. Since all the operating parts are above the floor level, the invention simplifies machining of base parts of the structure.

Therefore, in accordance with the invention it is possible to have a single flat top sub-base requiring a simple machining job on its flat surface on which the main base structure of the machine sits. The sub-base may be hollow and provide oil chambers, and will rest upon a suitable foundation through feet that are adjustable for leveling.

The base structure makes possible the provision of a knee hole in the front of the forming structure to facilitate access to the forming elements. For adjustment and to enable the operator to be seated during the adjusting operation, the invention contemplates such a knee hole.

Due to the fact that the machine has a draw bench on but one side, the draw head is attached at the one end and has its other end free except for a possible roller support on a track. The operating cycle requires a further movement of the draw head support after the jaws engage the emerging edge of the sheet and come to rest. For this purpose the invention contemplates cooperative abutments which interengage and allow the support to move on and leave the jaws and pick up the jaws again on the return movement.

There are various other features of the invention which will appear in the following description.

A more complete understanding of the invention will be had from the following description of the invention by means of the particular embodiment thereof illustrated in the accompanying drawings to which reference will now be made.

Fig. 1 is a side elevation of a complete machine embodying the invention;

Fig. 2 is a plan of the same;

Fig. 3 is a front elevation of the forming structure and a partial transverse section of the draw bench structure as viewed in the plane of the line 3—3 in Fig. 1;

Fig. 4 is a partial sectional view of the forming structure and of a portion of the draw bench structure as viewed in the plane of the line 4—4 in Figs. 1 and 6;

Fig. 5 is a fragmentary detail on the section line 5—5 of Fig. 4;

Figure 44:
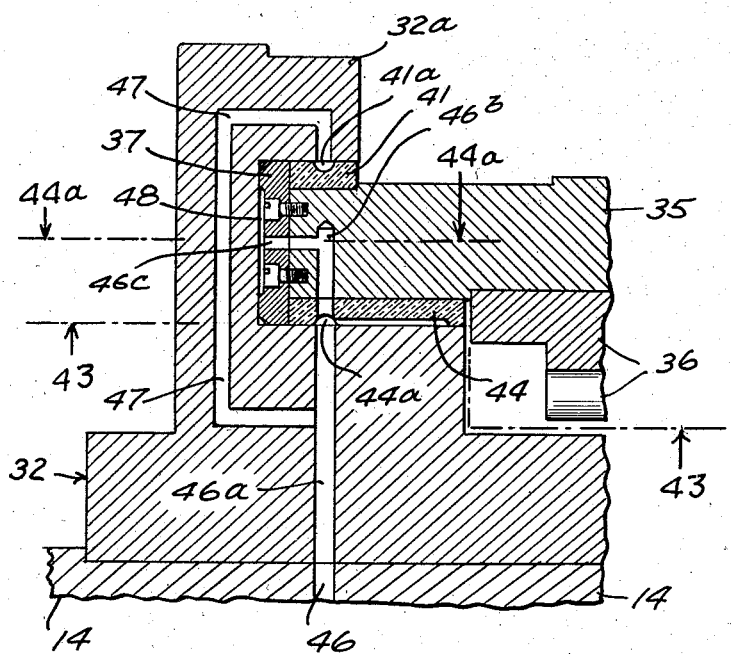

Figs. 6 and 7 are a longitudinal vertical section of the machine on a plane central of the forming structure and indicated by the section lines 6—6 in Figs. 3 and 4, Fig. 7 being a continuation of Fig. 6 on the line a—a;

Fig. 7a is a central sectional view of the hydraulic cylinder of Figs. 6 and 7;

Fig. 7b is a detail of an alternative connector for the piston rod.

Figure 44A:
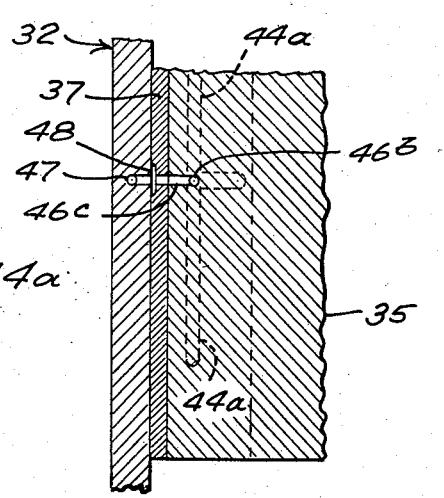
Figure 61:
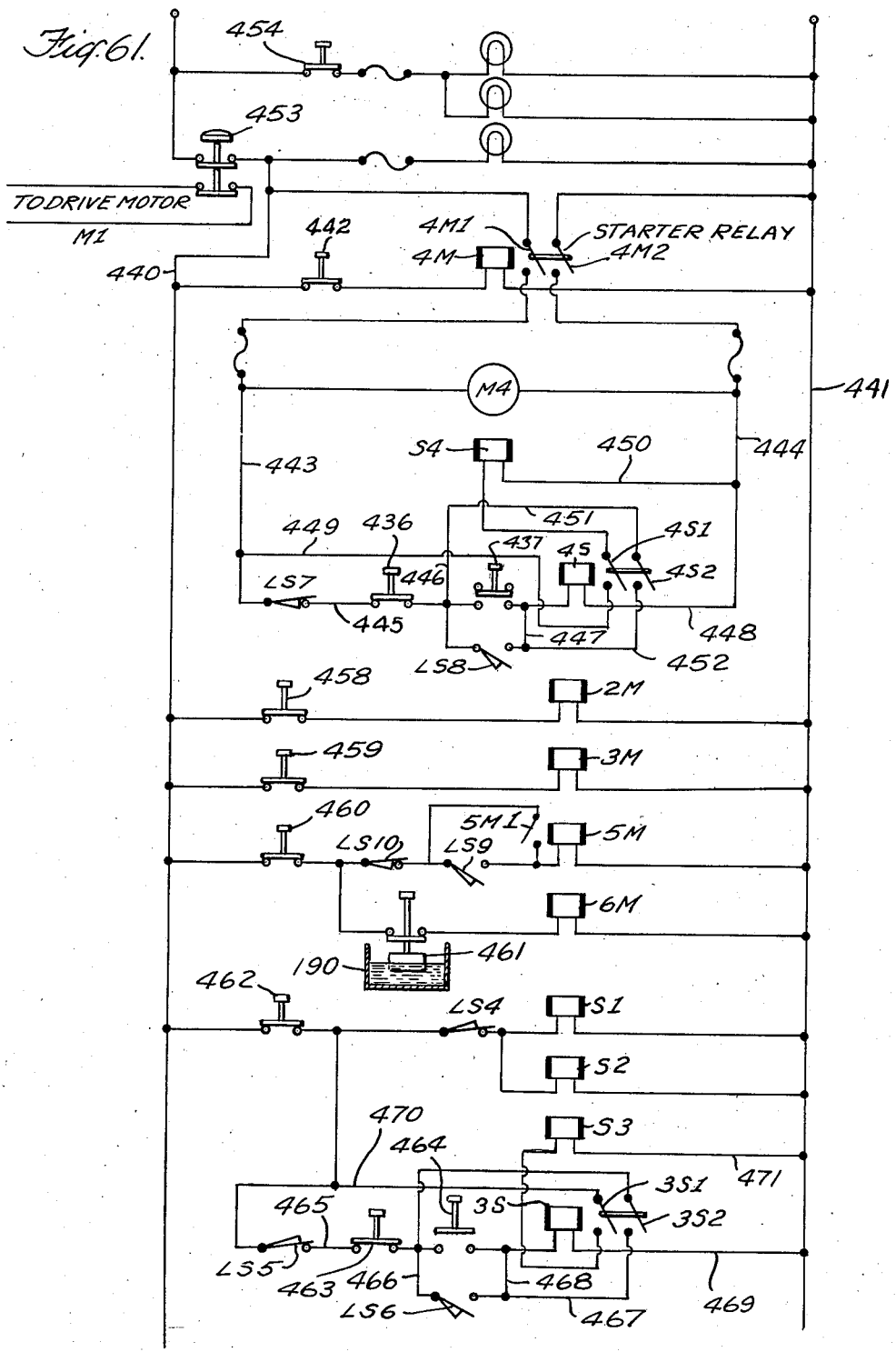

Fig. 8 is a longitudinal section on an enlarged scale of a portion of the forming structure and the draw head taken on the plane indicated by the line 8—8 of Figs. 3 and 4;

Fig. 9 is a fragmentary section of the forming structure on the line 9—9 of Fig. 8;

Fig. 10 is an enlarged sectional detail of a lubricating control valve, taken on the line 10—10 of Fig. 9;

Fig. 11 is a vertical section of a portion of the forming structure on the plane of Fig. 6 and an end elevation of the draw head;

Fig. 12 is a perspective of the main base of the machine with certain parts broken away;

Fig. 13 is a perspective for the guide structure for the first stage forming elements;

Fig. 14 is a side elevation of a portion of the forming structure with the draw bench broken away, showing the tracer valve and associated mechanism;

Fig. 15 is an end elevation of the parts shown in Fig. 14, as viewed from the right;

Fig. 16 is a fragmentary vertical section on the plane of line 16—16 of Fig. 1 and showing substantially the portion shown in Fig. 15 as viewed from the opposite direction;

Fig. 17 is an enlarged section, partially in elevation, of one of the tracer valves and associated mechanism taken on the broken line 17—17 of Fig. 16;

Fig. 18 is a transverse vertical section of the parts shown in Fig. 17 taken on line 18—18 of Fig. 17;

Fig. 19 is a horizontal section of the tracer arm mechanism taken on line 19—19 of Fig. 17;

Fig. 20 is an enlarged section taken on line 20—20 of Fig. 19;

Fig. 21 is a plan of the gear box and enclosed mechanism taken on the plane of line 21—21 of the Figs. 1 and 22;

Fig. 22 is a vertical section taken on line 22—22 of Fig. 21;

Fig. 23 is a vertical section taken on line 23—23 of Fig. 21;

Fig. 24 is a partial section and partial elevation taken on line 24—24 of Fig. 22;

Fig. 25 is a vertical section taken on line 25—25 of Fig. 1;

Fig. 26 is an enlarged sectional detail taken on line 26—26 of Fig. 27;

Fig. 27 is a section taken on line 27—27 of Fig. 26;

Fig. 28 is a horizontal section on line 28—28 of Fig. 26;

Fig. 29 is a transverse section taken on line 29—29 of Fig. 6;

Fig. 30 is a vertical section taken on line 30—30 of Fig. 29;

Fig. 31 is a fragmentary enlarged central vertical section of the forming structure showing a modified form of the second and third stage forming elements;

Fig. 32 is a fragmentary perspective of the lubricating bar;

Figure 33 is a fragmentary vertical section of the modified forming elements of Fig. 31, the view being on two planes indicated by the line 33—33 of Fig. 31;

Fig. 34 is a vertical section of the same on line 34—34 of Fig. 33;

Fig. 35 is a plan of the sheet supporting and guiding structure, with a sheet shown in place but partially broken away;

Fig. 36 is a vertical section on the line 36—36 of Fig. 35;

Fig. 37 is a fragmentary enlarged section on line 37—37 of Fig. 36;

Fig. 38 is a fragmentary plan on a reduced scale showing one of the sheet-supporting guides in adjusted position;

Fig. 39 is a fragmentary section on line 39—39 of Fig. 38;

Fig. 40 is a fragmentary plan of a section of the draw bench with extension added, being generally as viewed on line 40—40 of Fig. 41;

Fig. 41 is a longitudinal section on broken section line 41—41 of Fig. 40;

Figs. 42 and 42a are fragmentary plans of the carriage slide and draw bench, Fig. 42 being of the forward end and Fig. 42a being of the rear end, the sides of the draw bench being largely in section;

Figs. 43 and 43a are bottom fragmentary plans of the forward rear end portions, respectively, of the carriage slide, with the adjacent draw bench portions in section on the line 43—43 of Fig. 44, looking in the direction of the arrows;

Fig. 44 is an enlarged section of the inner side portion of the draw bench and slide, the section being on line 44—44 of Fig. 42;

Fig. 44a is a fragmentary horizontal section on line 44a—44a of Fig. 44 and on a reduced scale;

Fig. 45 is a horizontal section of the draw head and of the supporting wing plate and of the adjacent portion of the draw bench and carriage;

Fig. 46 is a longitudinal vertical section of the draw head on plane of line 46—46 of Fig. 45;

Fig. 47 is a detail in perspective of the jaw assembly;

Fig. 48 is a longitudinal central vertical section of the jaw assembly on line 48—48 of Fig. 47;

Fig. 49 is a transverse section of the jaw assembly on line 49—49 of Fig. 48;

Fig. 50 is a similar section of the same on line 50—50 of Fig. 48;

Fig. 51 is a similar section of the same on line 51—51 of Fig. 48;

Fig. 52 is a detail of the connecting pin of the jaw assembly;

Fig. 53 is a diagram of the jaws and of their operating hydraulic system;

Fig 54 is a sectional detail partially in elevation of the control valve for the jaw hydraulic system;

Fig. 55 is a combination perspective and schematic view of the draw head and operating wing plate and of the forming structure and of the associated portion of the draw bench and carriage;

Fig. 56 is a diagram of the control panel;

Fig. 57 is a diagrammatic plan of the lubricating system for sheets;

Fig. 58 is a diagrammatic elevation of the same;

Fig. 59 is a diagram of the hydraulic system of the machine;

Fig. 59a is a section of a solenoid tracer valve on line 59a—59a of Fig. 16;

Fig. 60 is a schematic representation of the hydraulic system of the machine;

Fig. 61 is a diagram of the electrical system of the machine;

Figs. 62, 63 and 64 are longitudinal sectional views of the forming elements and their immediately associated parts showing three operative positions;

Fig. 65 is a diagrammatic representation of the cycle of operation of the machine;

Figs. 66 and 67 are diagrammatic representations of the forming elements in an operative position with a sheet ready to be drawn, Fig. 67 being an end or side representation and Fig. 66 being a front elevation with the second stage element and the upper first stage element removed;

Fig. 68 is a diagrammatic view similar to Fig. 66 but showing the first stage level adjusted to a narrower sheet;

Figs. 69 through 76 are diagrammatic views similar to Fig. 66 but showing the first stage level and tilt about its longitudinal axis variously adapted to operate upon the sheets shown in Figs. 69a through 76a, respectively;

Figs. 77 and 78 are perspectives of two formed sheets having different compound curvatures;

Figs. 79, 80, 81 and 82 are diagrams showing successive positions of the hold-back elements of the first stage;

Figs. 79a, 80a, 81a and 82a are perspective views of formed sheets resulting from the four positions of Figs. 79, 80, 81 and 82, respectively;

Figs. 83, 84 and 85 are perspective views of sheets formed by various combinations of the settings of Figs. 79, 80, 81 and 82;

Figs. 86 and 87 are elevations of sheets illustrating the effects on the front and rear ends of locked first and second stages;

Fig. 88 is an elevation of a taper sheet;

Fig. 89 is an elevation of a sheet having sections of different tapers;

Figs. 90, 91 and 92 are diagrams showing various relative positions effected by the dynamic actions of the first, second and third stages;

Fig. 93 is a front diagrammatic view of the forming structure with the second and third stage forming elements having a downward curve;

Fig. 94 is a view similar to Fig. 93 with the second and third stage forming elements curved upwardly;

Fig. 95 is a perspective of a formed sheet the convex part of which at the left end was formed by the elements of Fig. 93 and the convex-concave part of which at the right end was formed by the elements of Fig. 94.

The machine is made up of three main functional components, viz. the sheet-forming structure designated generally by A in Figs. 1 and 2, and including uprights and dynamically moved forming mechanisms therebetween and a feeding table behind the uprights, the draw bench including the carriage, designated generally by B, and the draw mechanism for pulling sheets through the sheet-forming elements, designated by C. The power for reciprocating the carriage for drawing the sheets and effecting other operations is mechancal power applied by a main motor which may be electrical. The power for effecting the various dynamic operations of the parts is hydraulic. The delivery of the hydraulic fluid to several power cylinders is controlled according to preestablished patterns, as, for example, by cam tracks which are adjustable to desired contours and follower or tracer mechanism including valves in control of the respective cylinders. The cams or other pattern determining devices to which the valves respond in their controlling functions are translated by the carriage. Cam followers in the case of cams operate valve controlling arms.

Structurally the machine has a sub-base which is a hollow structure with its longest dimension extending transversely of the machine and serves as a reservoir for the hydraulic oil. One end of the sub-base supports the main power unit and the gear box containing the drive gears for the carriage. On the other end of the sub-base is supported the main base structure for the sheet-forming structure. The draw bench is supported at its mid portion upon the gear box and by legs at spaced intervals either side of the gear box.

Referring to Figs. 1 and 2, the sub-base is numbered 11 and has a narrower extension at one end on which is mounted the main power unit M1 with the housing 12 containing the gear reduction and the coupling 13. On the full width part of the sub-base immediately adjoining the narrow extension is the gear box 14. The sub-base is seated upon a level foundation such as a concrete floor indicated by 15. The sheets pass through the machine from right to left as viewed in Figs. 1 and 2 and therefore with relation to the movement of the work Fig. 1 is a view from the left side of the machine.

The draw bench mechanism and the means for reciprocating the carriage slidable therein will first be described. The gearing in the gear box 14 (see Fig. 21) consists of the pinion 16 the shaft 17 of which is connected to the coupling 13 and is hollow and contains an internal pump shaft extension 18 which bears in a bearing 19 on an L-shaped base strip 20 resting upon the top edges of two cross members 21 and 22, the other bearing for shaft 17 being in the wall of the gear box. The member 22 serves as a cross brace and extends diagonally, as shown in Fig. 21, for clearance purposes and has openings along its bottom edge to provide free communication between the two sides of the member. The entire bottom of the gear box up to the member 21 constitutes an oil-collecting sump for returned lubricating oil, as will later be described, and the member 21 serves to partition off a space 23 which is a tank for clean lubricating oil, filters 24 in the collecting sump delivering into the tank 23. The top for the tank 23 has a removable cover 25.

The pump shaft 18 operates a pump 26 through an eccentric on the end of the shaft and draws clean oil from tank 23 through connection 27 and delivers it into a line 28 from which it is distributed to several points as will appear.

The pinion 16 meshes with gear 29 the shaft of which bears in bearings in the two sides of the gear box and has pinion 30 fixed thereon. Pinion 30 meshes with bull gear 31 the shaft of which bears in bearings in the sides of gear box 14. The bull gear meshes with and drives a rack 36 on the carriage as will now be described.

The top of the gear box is machined to form a seat for the fixed draw bench 32 which guides the carriage, the seating of the draw bench upon the gear box being shown in Figs. 23 and 24.

The draw bench is an elongated channel guide member which rests at substantially its mid point on the gear box and has its extending ends supported at intervals by legs 33. The cross-sectional shape of the draw bench is shown in Figs. 15, 16, 25 and 44. The upstanding sides of the channel serve as side guides for the carriage and for a portion of its length the upper edges of the sides have inwardly overhanging projections 32a. These overhangs extend from the left end of the draw bench as viewed in Fig. 1 to somewhat beyond the middle of the gear box, as shown, for example, in Fig. 22, and serve to oppose the upward thrust of the bull gear on the carriage. They also have a function in the lubricating of the carriage, as will appear.

The bottom of the draw bench is provided with a longitudinal depression or channel as appears in the cross-sectional views, for accommodation of the rack on the bottom of the carriage, and immediately over the bull gear the bottom of the bench is apertured to provide for the meshing of the bull gear with the rack 36, as shown in Fig. 22. Also, a removal cover 34 (Fig. 22) affords access to the interior of the gear box.

The carriage is a longitudinal sliding member 35 of a width fitting between the upright sides of the draw bench and, as will be seen, it carries the cam mechanism and the draw mechanism and other parts which require translation in the functioning of the machine. On its underside for the portion of its length corresponding to the length of its travel, the carriage has a rack 36 secured thereto which occupies the longitudinal channel or recess in the bottom of the draw bench. This rack is engaged by the bull gear, as above stated.

The draw bench and carriage structure is shown in greater detail in Figs. 42 to 44a. The carriage is provided with wear plates, for example, formica, but preferably more durable material, such as bronze, where the greatest wearing friction occurs. Since the draw mechanism extends laterally from the carriage, the drawing stress is lateral of the carriage and therefore imposes a lateral strain or torque upon the carriage and causes the greatest wear at two opposing side terminal portions. At these portions, therefore, the wear plates should be metal while formica will suffice for the other bearing or wear strips.

As shown in Figs. 42 through 43a, the carriage 35 has relatively long bronze wear strips 37 and 38 on opposite side ends and short formica strips 39 and 40 on the other opposite side terminals. It is evident that the drawing stress will cause a clockwise twisting force on the carriage and produce the greatest friction on the bronze plates.

Also, the carriage has full length top and bottom formica wear strips on each side. The two top strips are numbered 41 and 42 and the two bottom strips are numbered 43 and 44. The top strips 41 and 42 are relatively narrow, their inner edges terminating with the overhang 32a, and the bottom strips 43 and 44 are of a width to reach to the channel in the bottom of the draw bench.

The top and bottom and the side wear strips are provided with lubricating channels or grooves, and lubricating oil is pumped to these from the gear box as will now be described.

The forward wall of the gear box has in its upper portion two vertical oil passages 45 and 46 which are spaced to register with passages 45a and 46a, respectively, in the draw bench extending through to the slide space (see Figs. 24 and 44). The pump 26 delivers oil from tank 23 to the bearings in the box and to the passages 45 and 46. This is shown particularly in Figs. 21 and 22. Conduit 28 has a branch 28a which delivers oil to the bearing 19 and to the other bearing for shaft 17, as shown in Fig. 23, and it also delivers to the bearings for the shafts of pinion 30 and bull gear 31, as indicated in Fig. 22. Thence it continues on and has branch outlets connected with the passages 45 and 46.

The formica strips 43 and 44 on the bottom of the carriage have full length oil grooves 43a and 44a together with several lateral grooves and the top formica strips have interrupted oil grooves 41a and 42a.

The passages 45a and 46a lead to the full length grooves 43a and 44a on the underside of wearstrips 43 and 44, and branching from each of passages 45a and 46a is a passage 47 leading up through the respective side wall of the draw bench and inward and downward through the overhang portion 32a into the top grooves 41a and 42a. Vertical passages 45b and 46b lead up from the respective grooves 43a and 44a into the carriage slide 35 and branch laterally into recesses 48 in wear plates 37, 38, 39 and 40 by way of lateral passages 45c and 46c. There are four passages 45b for inner plate 38 and two passages 45b for wear plate 39, and four passages 46b for wear plate 37 and two passages 46b for wear plate 40. It will be seen that the length of the interrupted grooves 41a and 42a is such that each groove is entirely covered by the overhang 32a when oil is delivered to it by the passage 47.

The excess lubricating oil delivered to the carriage through the passages above described runs down into the channel for the rack and collects in a space around a rectangular angle member 49 surrounding the bull gear opening in the bottom of the draw bench, and from thence it runs through a hole shown in Fig. 21 into a gutter 50 and is led to a tube 51 and delivered into the oil sump in the bottom of the gear case. The oil level is maintained in the gear case about at the top of brace 22 and of the tank 23, so that the gear 29 and bull gear 31 run in it, as shown in Fig. 22.

The length of the carriage and rack is adjusted to the maximum length of sheets to be drawn and the draw bench is provided with bumpers at its ends to limit the movement of the carriage in case the automatic means for stopping the motor fails, the length of the rack being such that the teeth leave the bull gear just before the bumpers are engaged.

It will be understood that it is desirable on occasion to extend the draw bench and carriage to form unusually long sheets, for example. One of the advantages of the draw bench construction above described is that it may readily be extended.

Figs. 40 and 41 illustrate means for such extension. The draw bench 32 has secured underneath it on each side of the rack channel a plate 55 by means of screws 56, and theses plates have extensions to connect to the draw bench extension 32 Ex. The plate extensions have elongated screw holes through which pass screws 56a and screw into the bottom of 32 Ex. Extending from the end of each plate 55 is a threaded rod 57 which extends through a leg 33 or other downward lug on the draw bench extension and has a nut and washer on its threaded end which, when tightened up, bear against the leg and draw the two sections of the draw bench together. A gasket will be provided at the joint, as shown, to prevent leakage of lubricating oil.

A way is also shown to join an extension 35 Ex to a carriage 35. As shown two screws protrude from the ends of each section disposed so as to aline, and those in one section have right hand threads and those in the other section left hand threads. A nut on each pair constitute turnbuckles 58. Thus the two sections are drawn together and a key 59 is shown at the joint to aline and support the two edges vertically.

It will be understood that for a given extension of the carriage and rack, the draw bench must have an equal extension on each end.

In Fig. 41 cam bars are shown with an upright support fixed on 35 Ex. Since the carriage carries the cams, as will be later described, it will be understood that with an extension of the carriage there must be an equal extension of the cams and their bars. Fig. 41 shows a way to continue the bars to provide for an extension of the carriage.

The forming structure of the machine which is designated by the letter A in Figs. 1 and 2 is mounted upon a main base which is secured upon the sub-base 11 on the right side of the gear box and draw bench, the direction being designated with reference to the direction of movement of work through the machine.

The main base is shown in perspective in Fig. 12 and is designated generally by the numeral 65. It is a fabricated structure the front portion of which is substantially the full width of the forming structure mechanism, and has a narrower rearward extension. It serves as a support for a guide structure for the third stage forming assembly, as will later appear, and at its rear end it provides a trunnion support for a guide structure that supports and guides the first stage assembly.

Referring to Figs. 3, 4 and 12, it will be seen that the main base 65 has at its front four upright plates serving as supports or legs 66, 67, 68 and 69 for a cross plate 70 on which the third stage head slides, as will be seen. Back of the cross plate 70 is a space having a bottom 71 on a level slightly above the bottoms of the legs, and having a front rearwardly incline wall 72, a back wall 73, the end walls being continuations of the outer legs 66 and 69 while the inner legs 67 and 68 also have continuations which have cut-outs in their bottom edges, with the result that the entire width of the chamber constitutes an oil sump.

The wall 73 terminates on a level with the plate 70 and has a rearward plate 74 and side plates making a housing for a hydraulic cylinder which is connected to move the third stage assembly forward and back, as will later appear. It will be observed that both the plate 70 and the top 74 of the cylinder housing have a central depressed longitudinal groove or channel 70a and 74a, respectively, to receive and guide a correspondingly shaped part of the third stage body member. On either side of the cylinder housing are lateral continuations of the oil sump with an outlet 75 in one of the rear walls. Blocks 76 on the cylinder housing top on opposite sides of groove 74a provide fastenings for a cover plate, as will later appear.

The side walls of the cylinder housing have upward extensions 77 and 78, respectively, at their rear ends, the top edges of which are concaved to provide trunnion bearings for a first stage guide structure, as will be described.

The guide structure for the first stage assembly is shown in perspective in Fig. 13. This guide structure is supported on the trunnions 77 and 78 by means of a cradle which will later be described and which pivots on the trunnions on a transverse axis and provides freedom of movement for the first stage assembly in the cradle about a longitudinal axis. The articulated support is therefore equivalent to a gimbal mount. Power means are provided to move the first stage assembly about the two axes and it is apparent that a universal joint would afford the same facility.

The guide structure for the first stage mechanism is designated generally by the reference numeral 79. It likewise is a fabricated structure having a full width front portion and a narrower rearward extension. The structure is designed to support and guide the lower first stage assembly which, as will be seen, is T-shape, and the cross head rests and slides back and forth upon the wide front portion of the guide while the rearwardly extending leg portion slides through an elongated rear guide portion. The cross head has a central depending portion which has a hole through it for the passage of the rearwardly extending leg of the third stage structure which is also T-shape.

The front portion of the guide structure 79 therefore has two levels, the side portions 80 and 81 being higher than the central portion 82. A back wall 83 for the front portion supports an elongated rectangular guide 84 for the rearwardly extending leg of the first stage lower assembly, there being space below the guide 84 for the third stage rearward extension.

On each side of this central rectangular guide 84 is a rearwardly extending flat bar the rear end of which is stepped up and is machined for supporting attachment to a trunnion plate for a first stage operating cylinder, as will later appear. The flat bar on the left side is numbered 85 and the one on the right side is numbered 86. Brace plates 85a and 86a connect the respective flat bars to the rear end of the guide 84. Extension bars 87 and 88 on the sides of the front portion of this guide structure 79 extend forwardly beyond the front edge of the front portion, the extending ends being bored, as shown, for connection to operating hydraulic cylinders, as will be described.

The frame structure for the forming mechanism of the first, second and third stages includes two side main uprights 89 and 90. These uprights are secured at their bottom ends to the sub-base 11, as shown in Fig. 4, and are spaced the width of the front portion of the main base 65, being attached to the sides thereof by screws and keys.

The work-engaging elements of the three stages with their supporting and operating parts are contained within the space bounded by the uprights 89 and 90. The first stage has an upper and lower assembly the work engaging elements of which coact to engage a sheet between them with more or less clamping restraint or holdback. The upper part which is designated comprehensively by U1 in Fig. 6 has an element-carrying ram which is raised and lowered by toggle mechanism. The lower part which is designated generally by L1 has a T-shape body the head of which extends transversely between the uprights. The second stage mechanism is designated generally 2ND in Fig. 6 and also comprises an element-carrying ram which spans the two uprights and is raised and lowered therein by toggle mechanism. The third stage mechanism is designated generally 3RD in Fig. 6 and is also of T-shape, the transverse head of which carries the work engaging element and spans the uprights, while the rearwardly extending leg underlies the leg of the first stage member and guides upon the cylinder housing of the main frame.

The first stage mechanism will now be described. The sheet S is drawn between the upper portion U1 and the lower portion L1, and these two portions are contained between two secondary uprights 91 and 92 (see Fig. 4). The lower assembly L1 has a T-shape body with a cross head 93 and a rearward leg 94. The leg and cross head are hollow for lubricating purposes, as will be fully described later.

The secondary uprights 91 and 92 are attached to the ends of the cross head 93, and they fit within the main uprights 89 and 90, having guiding connection therewith through rocker bearing plates 95 and 96.

The upper first stage assembly comprises a top fixed plate 97 which spans the secondary uprights and is adjustable in height between gibs 98 on the uprights, a ram 99 which is also a cross bar spanning the uprights and slides within gibs 100, and toggles 101 and 102 connected by bar 103. A hydraulic cylinder 104 has trunnions in bearing brackets 105 on the top of the fixed bar 97, with its piston rod connected to the top end of a toggle operating lever 106 that has its fulcrum pivot in the bar 97 and is pivoted at its lower end to the pivot of bar 103. The bar 106 is double, the rear arm being slightly wider than the front, as indicated by the broken lines in Fig. 4, and the bar 97 is hollow, as shown.

It is desirable to adjust the height of bar 97 for sheets of different thickness, and for this purpose the ends of the bar are notched as shown at 97a and the gibs 98 are notched as shown at 98a. Blocks 107 are inserted on the bottom of notches 97a and shims are inserted on top of the blocks the thickness of which determine the upward limit of movement of bar 97. Also across and on top of the gibs 98 at each end is a bridge piece 108 which is bored to allow a screw 109 to pass therethrough and screw into a tapped hole in the top of bar 97 a distance which determines the downward limit of movement of bar 97.

The bottom edge of ram 99 has a dove-tail groove into which fits the complementary shaped face of a hold-back element 110 which is clamped in place by clamp strip 111. A feature of the fastening of this clamping strip is the fact that the screws 112 are available for operation at the rear, as shown, for example, in Fig. 11. This is necessary because of the fact that the second stage mechanism interferes with access at the front.

Back of the ram 99 and element 110 is a full length plate 113 which together with a similar lower plate serves to smooth and flatten out the entering sheets. This plate 113 is secured on the bottom of a plate carrier 114 that runs the full length of the ram and has a lost motion connection therewith. The plate carrier is a member rectangular in cross-section somewhat higher than it is wide and is hollow in its upper portion to receive lubricating oil, as will later appear, and has arch-shape openings in its bottom to accommodate the screws 112. The gibs 100 on each secondary upright are spaced to receive the ram and plate carrier, the bearing surfaces being provided with formica or the like (see Figs. 11 and 57). The bottom of the plate carrier is broader than the superstructure and the plate 113 has a dove-tail fit with the bottom, being secured thereon by clamp 115.

The lost motion connection between the ram 99 and the plate carrier 114 is shown best in Figs. 4, 6, 8, 11 and 15. Headed screws 116 are screwed into the top of the plate carrier 114 near each end and pass through holes in angle brackets 117 on the rear face of the ram. The screws are adjusted in length so that their heads are above the bracket arm a predetermined distance when the ram and plate are both down. Therefore the ram moves up the predetermined distance before picking up the plate.

The descent of the plate is limited by shims placed between it and its cooperative plate underneath the sheet, at the ends outside the edges of the sheet. These shims are slightly thicker than the sheet so that the plates do not actually contact the sheet except to determine its plane of movement. Since the descent of the ram will vary, it is necessary to have the downward pressure on the plate carrier a yielding pressure. This is effected through a cushioning device shown as a cup 118 on the plate carrier which contains compressible, elastic rings 119 (see Fig. 11) which may be leather or the like. An inverted angle bracket 120 is clamped between nuts on a center stud which is attached to and carries a follower disc disposed on top of the elastic rings in position to compress the rings to the extent that the descent of the ram exceeds that of the plate carrier and the lost motion may be of the order of half an inch.

The lower hold-back member has on the top of the cross head 93 a hold-back element 121 which has a dove tail fit at the front edge and is clamped in place by a clamp plate 122 and screws 123 (Figs. 4, 8, 9, 15, 31) which pass through the head and are operated from the rear, as are screws 112. Behind the element 121 a plate 124 has a dove tail fit on top of the cross head in opposition to the upper plate 113, and is clamped in place by a clamp strip 125.

The cross head 93 of the lower first stage assembly has a substantially T-shape downward extension 126 (see Figs. 4 and 6) which has an opening 127 at its center for accommodating the rearwardly extending leg of the third stage body. The lateral wings or head of the T rest and slide upon the elevated side portions 80 and 81 of the guide structure 79 while the bottom rests and slides upon the lower central portion 82. As shown, formica wear plates are provided on the wear surfaces of the first stage cross head.

The rearwardly extending leg 94 of the lower member L1 extends through and is guided in the elongated rectangular trough-shaped guide 84, as shown in Fig. 6, and cover plates 128, 129 and 130 are fastened across the top of the guide trough 84 and serve as supports for entering sheets. At its rear end the leg extension 94 is connected by pin 131 to links 132 the rear ends of which are connected by pin 133 to crank 134 which is pivoted at its bottom end on pin 135 (Fig. 7) which extends between the rear ends of two trunnion plates 136 and 137. These trunnion plates are attached to the rear ends of the flat bars 85 and 86 of the guide structure 79 (see Figs. 2, 35 and 36). The trunnion plates 136 and 137 provide bearings for trunnions on a supporting ring 138 which surrounds and supports a hydraulic cylinder 139 the piston rod of which is connected to arm 134a of crank 134. The reciprocation of the hydraulic piston therefore rocks crank 134 on its pivot and reciprocates link 132 and hence the entire first stage assembly in the guide structure 79. This movement is the horizontal dynamic movement of the first stage.

With different thicknesses of sheets being formed the extent of possible dynamic horizontal movement of the first stage elements will vary and the required leverage will vary inversely. Consequently means are provided to move the point of connection of the cylinder piston to the crank 134. As shown, the crank arm 134a is bifurcated and provided with a series of arcuately arranged holes for the connecting pin. The thinner the sheets the shorter the lever arm need be, and hence the nearer to the fulcrum 135 the connection may be. This requires an extensible piston rod and Figs. 7a and 7b show how this may be done. The piston rod has two telescopic threaded portions and in addition different length couplers may be used. For example, in Fig. 7a a four inch coupler is shown, and in Fig. 7b a thirteen inch coupler is shown which may be substituted for the four inch coupler. These couplers are attached to the end of the externally threaded piston rod by a split clamp, as shown.

The universal or gimbal mount for the first stage assembly will now be described, reference being particularly to Figs. 6, 29 and 30. In brief, there is a cradle hung on the main base trunnion arms 77 and 78 so as to rock on a transverse axis, and the cradle has a bottom concavely rounded about a longitudinal axis and the trough support 84 of the guide structure 79 has a convexly rounded bottom which seats and rocks on the cradle bottom.

The cradle 140 is a relatively short, open trough-shape member which has on each side an arcuate bearing member 141. The trunnion arms 77 and 78 of the main base each have a hardened arcuate roller bearing piece 142 constituting a roller race and fastened to its top edge by screws the holes for which are shown in Fig. 12 and which appear in Fig. 30. Anti-friction rollers 143 roll on the hardened arcuate surface of the roller races 142 and an arcuate retainer member 144 is fastened on the outer side to retain the rollers and lubricant. About this transverse axis, therefore, the first stage may have its elevation raised and lowered.

The rolling, or tilting of the first stage about the longitudinal axis occurs on anti-friction roller bearings in the bottom of the cradle 140. The trough-shape guide 84 of the guide structure has a rounded rocker 145 on its underside within the cradle and a single roller race is provided on the front end and a double roller race on the rear end, both numbered 146 and shown particularly in Fig. 6. The rear double ball race with the external clamp affords added strength and resistance to the pulling force which might tend to raise the rear end of the guide structure. This is further reinforced by rollers 147 which are carried by the bottom of the cradle and roll on vertical axes in a transverse groove in the rocker bottom 145.

The movement of the first stage elements about the two axes of the gimbal mount just described is produced by two hydraulic cylinders 148 and 149 disposed underneath the ends of the front plate 70 of the main base and having their piston rods extending up through holes in the plate and connected to the front ends of bars 87 and 88 on the guide structure 79, as shown in Figs. 3 and 4. It is obvious that if they are operated equally the movement will be solely about the transverse axis, while if they are operated differentially, there will be a component of movement about the longitudinal axis. Movement about the transverse axis is equivalent to pitch and effects a change in elevation of the first stage elements, while movement about the longitudinal axis is equivalent to roll and will be termed tilt herein.

The feed table on which the sheets are guided into the forming elements is shown particularly in Figs. 2 and 35 through 39 and will now be described.

The feed table structure overlies the guide structure and main base and parts carried by them behind the uprights 89 and 90 and the forming elements within those uprights, and comprises channel bars on each side with their open sides down and having anti-friction rollers on horizontal axes for supporting the edges of the sheets and also along their outer sides rollers mounted on vertical axes to guide the sheets laterally. In addition, there are anti-friction rollers for the center of the sheets on the double link 132 and on the tops of the sides 84 of the guide for the first stage rearwardly extending leg 94. The channel bars are mounted upon transverse guide plates on which they are adjustable to the width of the sheet. Also, provision is made for angular adjustment of the bars for sheets having one or both sides at an angle other than a right angle to the leading edge of the sheet.

In the construction shown the channel side bars are in two sections, there being the longer channels 151 and 152 in the rear on the left and right side, respectively, and shorter channels 153 and 154, respectively, in front. The bars 151 and 152 are slidably mounted at their rear ends on transverse plate 155 which is supported on the upper ends of legs 156 attached at their lower ends to the hubs 135a of shaft 135; and at their front ends on transverse plates 157 and 158 the inner ends of which abut the opposite sides of links 132. The short guide plates 157 and 158 are attached to the trunnion plates 136 and 137, respectively, near their attachment to the flat bars 85 and 86 by plates 159 and 160 to which they are welded.

The short front sections 153 and 154 of the guide channels are also supported and guided for lateral adjustment by transverse plates 161 and 162 for bar 153 and similar plates 163 and 164 for bar 154. Plate 161 is welded to plate 165 attached to flat bar 85, and plate 162 is supported by welding to wall 83 of the guide structure 79. Similarly, plate 163 is supported by welding to a plate 166 which is attached to flat bar 86 and plate 164 is welded to vertical wall 83 on the other side of the guide trough. The channel bars have horizontal guide rollers 167 and also rollers 168 on vertical axes to engage the edges of the sheet. Also, horizontal rollers 167 are provided on the links 132 and on the top edges of trough guide 84. In addition anti-friction balls 169 are provided on the top plates 128, 129 and 130.

The guide plate construction for the rear channel bar sections 151 and 152 is braced by rods 170 and 171 which are welded at their ends to plate 155 and to plates 157 and 158, respectively.

The details of the guide connections between the channel bars and their transverse plates are shown particularly in Figs. 37, 38 and 39. The plates all have longitudinal guide grooves on one face near the top and in the channel is fixed an anchoring block 175. A clamp 172 has a tongue which engages in the groove in the plate and a screw 173 passes loosely through the clamp and screws into the block 175. When the screw is loose the channel bar can be slid along the plate and the tightening of the screw clamps the bar in adjusted position. On the side of the plate immediately opposite the screw 173 is a pin 174 depending from the block 175.

As stated above, it may be desirable to set the channel bars on one or both sides on a bias or angle to the longitudinal axis of the machine. For this purpose they are made so that they can pivot about their forward guide connection. Hence the block on the rear ends must be free to slide longitudinally.

At each rear end the block 175 is T-shape and is slidable between two guide rail pieces 176 which are welded in the channel to the opposite legs and are braced at each end by cross strip 176a welded thereto. If it is desired to set the channel bar at an angle, as shown in Fig. 38, the screw 173 is loosened and the rear end of the bar is pushed in along the plate 155 in the case of the rear bars or along one of the plates 161 and 163 in the case of the front bars. The bar will pivot about the pin 174 at the front end, the screw at that end being loosened for the purpose. Since the diagonal distance between the bars is longer than the right angle distance, the block 175 slides back to compensate for it. The screws are then set up to fasten the bar in adjusted position.

At the front end the block in each bar is permanently fixed, as by welding. Otherwise the constructions at the two ends are alike.

To prevent the channel rail with its rollers and clamping parts from accidentally escaping off the end of the guide plate, a latch 177 is provided on the ends of the plates. As shown in Fig. 37, the latch is pivoted on the end of the plate and is long enough to extend above the top of the plate when in latch position in front of the clamp 172.

The means for lubricating the sheet will now be described, reference being had particularly to Figs. 8, 9, 10, 57 and 58.

As above stated, oil is supplied to both surfaces of the sheet before it enters between the smoothing plates 113 and 124, and also just before it is engaged by the first stage hold-back elements and while it is passing between those elements.

The course of the oil is through the hollow interior of the T-shape lower member and from thence through distributed oil passages to the lower side of the sheet and also through upward passages in the secondary uprights 91 and 92 into the hollow interior of plate carrier 114 and thence through distributed passages to the top of the sheet. The used oil drips back into the oil sump of the main base from where it is forced through filters into a storage tank. A motor-driven pump delivers the oil under pressure to the lower T-shape member.

The hollow interior of the rearwardly extending leg 94 is designated 94a, and this communicates with the hollow interior of the lateral arms of the head 93 through holes 93a. Holes 93b in the ends of the head 93 register with lateral passages in the secondary uprights leading to vertical passages 178 which at their upper ends lead into side openings 179 in the ends of the hollow interior of the plate carrier 114.

Along the arms of the head 93 spaced not more than two inches are a group of upwardly leading oil passages in the top of the head communicating with the hollow interior. For each group a hole is bored through the rear wall and into the front wall for an oil plug 180, and from this hole lead upward passages 181 and 182 (Fig. 10) and a continuation of the hole leads to upward passage 183 (Figs. 8 and 31).

The passage 182 leads to a lubricating bar 184 (Figs. 31 and 32) which has upward passages to the under side of the sheet in depressed portions of the top face of the bar and is disposed between plate 124 and lower element 121. Element 121 has through passages leading to the bottoms of the convolutions and communicating with a manifold recess in the bottom of the element with which passage 183 communicates. Passage 181 communicates with a passage in clamp 125 which leads to the underside of the sheet.

The plug 180 is designed so that when it is pushed in to the position of Fig. 10 it shuts off the oil from the passages, and when it is pulled out as shown in Fig. 8, it opens the oil passages to the interior of the head. Thus the passages which are outside the width of the sheet may be shut off. A pin 185 limits the inward movement of the plug.

From the interior of plate carrier 114 the oil passes under pressure through similarly spaced groups of passages to the top of the sheet, and plugs 180a control the inlet to these passages. In each group, from passage 186 in the wall of the plate carrier, the oil passes into lateral passage 187 in the ram 99 and thence branching into two downward passages in the ram, as shown in Fig. 8. One of these downward passages leads to a manifold recess in the top of element 110, and two passages in the element lead from this recess to the bottom of the convolutions in the sheet-engaging face. The other downward passage communicates with a passage 188 between plate 113 and the bottom of the plate carrier which discharges through a passage in clamp 115 on to the top of the entering sheet.

The used oil drips down into the oil sump in the main base 65, falling first on to the surfaces 80, 81 and 82 of the guide structure 79 and thence running down on to the bottom 71, some getting on to surfaces 70 and 70a. Grooves are provided around the holes for the piston rods of cylinders 148 and 149 with channels to lead the collected oil into the sump, and a barrier 70b is provided on surface 70a to prevent the oil from running out in front.

From the sump the oil runs out of opening 75 into pipe 189 whence it runs into a tank 190 disposed alongside the sub-base 11 and providing a support for motors M5, M6 and pumps P5 and P6 driven by the respective motors. At the right of tank 190 is a clean oil tank 191 having a filter 192 mounted thereon.

Pump P5 is the pressure or delivery pump and pump P6 is the suction or return pump. As shown in Figs. 57 and 58, pump P6 has suction pipe 192a extending into tank 190 and delivery pipe 193 leading to filter 192 from which pipe 194 leads into the clean oil tank 191. From the clean oil tank pump P5 draws oil through pipe 195 and delivers the oil through pipe 196 to the hollow interior of the first stage member 94. A valve 197 (Fig. 6) in pipe 196 provides a shut-off for the oil.

The second stage mechanism and assembly 2ND will now be described, reference being had particularly to Figs. 3 and 6.

Spanning the main uprights 89 and 90 in fixed relationship at the top is bar 198 and supported thereby through toggles is a two part ram which carries the second stage forming element and is raised and lowered by means of the toggles which are operated by a hydraulic cylinder and piston. The two parts of the ram have turnbuckle connection providing for adjustment of the relative horizontal disposition of the two parts of the ram. For example, for certain draws it is desirable to have one end of the forming element lower than the other, similar to a like adjustment which may be effected in the first stage by manipulation of the screws 109 and by the thickness of the shims on blocks 107.

The two parts of the ram are upper bar 199 and lower element carrying bar 200 which are connected by turnbuckles 201, one near each end. Toggles 202 connect the fixed bar 198 and bar 199 of the ram, the toggle joints being connected by bar 203. The toggles are operated by hydraulic cylinder 204 supported on brackets 205 on upright 89 (see Fig. 14). The piston of the cylinder is connected to the end of toggle-operating bar 203 by piston rod 204a.

A counterweight 206 for the ram is loaded on the free end of lever 207 which is pivoted at its other end to the top edge of fixed bar 198 and has an extension beyond the pivot connected to the top edge of bar 199 through links 208.

The lower ram bar 200 has its ends 200a depending below the intermediate portion, thus providing for the admission of jaws for gripping the sheet, as will later be seen. The ends of the ram bars 199 and 200 are constrained and guided by rails 209 which are fastened on the uprights and enter into the slotted ends of the ram bars.

The ends of the lower bar 200 are made slightly arcuate, as shown in Fig. 3, to allow for relative tilting by unequal adjustment of the turnbuckles 201, and a formica-faced rock plate 210 on each end of bar 200 bears against the edge of the adjacent rail 209, having pivotal connection with the bar to maintain vertical bearing faces as the bar tilts.

The lower edge portion of the ram bar 200 is thinner than the main portion of the bar and a forming element 211 is fastened to its inner face, having a dovetail connection therewith and being secured in place by a wedge member 212 bearing on its top edge and secured in place by screws 212a. The forming element is shown in Figs. 6, 8, and 11 as a full length plate extending from end to end of the ram and having a forming surface on its bottom edge which is downwardly curved, that is, its center is lower than its ends. The work-engaging portion is a ridge at the entrance or inner side portion of the bottom edge, beyond or in front of which the bottom edge is raised and is opposed by the complementary shaped work-engaging face of the third stage element, as will be seen.

The operation of the hydraulic cylinders 104 and 204 in controlling the height of the upper element of the first stage and of the third stage, in response to a pattern, such as a cam, will be explained hereinafter.

The 3RD or third stage mechanism will now be described.

The body member of the third stage is T-shape similar to the lower member of the first stage. It has a cross head 213 the ends of which are for appearance covered by plates 214 that extend substantially out to the uprights and cover the upper ends of the connections of the tilting cylinders 148 and 149 with the front ends of the side bars 87 and 88 on the guide structure 79. Underneath the cross head is a T-shape carrier structure having a cross head portion 215 fitting underneath and supporting the cross head 213 and having a rearwardly extending leg portion 216 which is oblong in cross-section. The ends of the cross head 215 are cut at an angle to provide room for the tilting cylinder piston rods and the cover plates 214 are shaped to cover the space beyond their ends.

The third stage body member is susceptible of forward and back dynamic movement during the drawing operation and means to be described are provided for that purpose. The bottom cross head 215 is equipped with formica wear plates on its under surfaces and rests upon and is guided back and forth by the surfaces 70 and 70a of the main base, having a downward extension at the center to fit into the central depression in surface 70. The rearwardly extending leg 216 passes through the opening 127 in the downward extension 126 of the first stage lower body member and rests and slides upon guideway with bottom 74a in surface 74. A cover plate 217 (Fig. 6) is fastened on blocks 76 (Fig. 12) and provides a top bearing for the leg 216, formica wear plates being provided on the leg for engagement with plate 217 and surface 74a.

The rearwardly extending leg 216 has connection with a hydraulic cylinder 218 which is disposed in the housing in the main base under the plate 74. This is shown best in Fig. 6. A cross head structure 219 is connected to the rear end of leg 216 and to horizontally reciprocatory piston rod 218a of cylinder 218. The cross head has two legs 219a with out-turned feet that extend under angle guides 220 (see Figs. 6 and 29). The reciprocation of piston rod 218a therefore reciprocates the third stage structure, and this movement is dynamically effected under the control of a cam of adjustable contour, as will later be described.

The cross head 213 carries a forming element 221 which is a full length plate having a dovetail connection with the inner face of the cross head and locked by wedge member 222 which is secured in place by screws 222a. The cross head has an oil-catching groove 223 from which ducts lead down through the cross head into the oil sump of the main base. The configuration of the work face on the top edge of the plate 221 is substantially the complement of that on the second stage element.

As stated above, the control of the operation of the several hydraulic cylinder and piston devices 104, 139, 148, 149, 204 and 218 is effected in each instance by a pattern member which is shown as a flexible cam track that is adjustable to the desired contour and by mechanism known as tracer mechanism in that it traces or follows the pattern and causes the hydraulic power device to respond according to the pattern, that is, according to the contour of the cam.

Specifically, the hydraulic system includes one or more pumps delivering fluid such as oil under pressure to the cylinders through lines that are controlled by valves, termed tracer valves, that are operated by tracer arms having cam follower rollers thereon. The tracer valves are mobile in that the cases are mounted on rollers that run in tracks, and provision is made for a response from the part moved by each hydraulic cylinder and piston back to the tracer valve so that the valve case is moved thereby to compensate for the movement of the valve stem or plunger by the tracer arm and shut off the valve and stop the hydraulic piston when the movement called for by the cam contour is satisfied. This compensating movement is called the feed back and makes the valve operation self-limiting in a well-known way.

This tracer mechanism will now be described, reference being had particularly to Figs. 14, 15, 16 through 20, 25 through 27, 59 and 60.

The cam tracks are mounted on the draw bench slide or carriage 35. The cams are shown as flexible round rods or wires, six of them, one for each hydraulic cylinder, adjustably supported on a series of angular support frames marked 224 of which there are seven in all, as shown in Figs. 1 and 2. These frames support six cam bars marked 225 through 230 (see Fig. 25) and each bar carries a vertically adjustable cam-supporting rod 231 on the top end of which is a cam-supporting clamp 232. The vertically adjustable feature of the cam to adjust its contour is best illustrated in Figs. 25 through 28.

The bar, for example, bar 225, has a vertical hole through which the rod 231 freely passes. The rod is provided with fairly closely spaced circumferential grooves. In the bar laterally of the rod 231 is a spring-pressed latching plunger 233 that has an enlarged conical end which is urged by the spring into the registering circumferential groove. This latching condition is illustrated in Fig. 28. When the plunger is pushed in it releases the latch from the groove and leaves the rod free to be moved up or down.

This coarse adjustment is used if a considerable adjustment of the cam is required. Fine adjustments are effected by the clamp 232. As shown, the clamp has an internally threaded vertical socket into which the threaded top end of rod 231 engages, and knurled ring 234 on the rod facilitates turning it and screwing the rod up or down in the socket. Thus coarse and fine adjustments are very easily effected.

The cam rods or cam tracks are numbered 225a through 230a for the corresponding bars 225 through 230, and, as shown in Fig. 26, they are releasably clamped in a recess between the socket and plate members of clamp 232 by a clamping screw 235.

As will develop in the further description, cam 225a controls the tracer valve of the left tilting cylinder 148, cam 226a controls the tracer valve for the right tilting cylinder 149, cam 227a controls the valve for the first stage horizontal dynamic cylinder 139, cam 228a controls the valve for the third stage dynamic cylinder 218, cam 229a controls the valve for the first stage vertical dynamic cylinder 104 and cam 230a controls the valve for the second stage vertical dynamic cylinder 204.

The tracer mechanism operated by the cams as they are translated with the slide is mounted on a transverse plate 236 which overlies the draw bench and is secured at its inner edge to the main upright 89 and is bolted to the draw bench at the bottom of its outer edge. It has a cutout space to allow the cams and their supports to pass through.

The six tracer valves for the six dynamic hydraulic cylinders are all alike so far as the result effected by the movement of the stem or plunger is concerned. However, as will be seen, three of the six valves have a solenoid as well as spring control. As will presently appear, the supplemental control by the solenoid is for the purpose of disabling the cam operation on the return movement of the part. In respect to the tracer arm and cam operation and to the mobility of the valve, they are duplicates and a description of one will suffice for all. The tracer valve 237 is for left tilting cylinder 148 and is controlled by cam 225a. Valve 238 is for the right tilting cylinder 149 and is controlled by cam 226a. Valve 239 is for the first stage horizontal dynamic cylinder 139 and is controlled by cam 227a. Valve 240 is for the third stage dynamic cylinder 218 and is controlled by cam 228a. Valve 241 is for the first stage vertical dynamic cylinder 104 and is controlled by cam 229a. Valve 242 is for the second stage vertical dynamic cylinder 204 and is controlled by cam 230a.

The detail construction of valve 240 and of the tracer arm mechanism for operating it is shown in Figs. 17 through 20 and will now be described, this valve together with valves 237 and 238 being without a solenoid.

For mobility the valve is mounted on a carriage 243 which has rollers running on tracks inside a hollow bracket arm 244 attached to the front side of plate 236. The case 245 of the valve has a reduced portion which is embraced by split clamp 246 on the carriage. The valve spool or reciprocable stem 247 is urged in one direction by spring 248 which keeps the valve stem in contact with the tracer arm which is biased to oppose the spring.

The tracer arm is a two-arm, bell crank lever the arm 249 of which is pivoted on depending arm 250 from bracket 244 and has a weight 251 which urges the free end of the arm toward the valve stem 247. This free end has an adjustable contact member 252, the arm being proportioned so that the head of member 252 will engage the end of the valve stem and be influenced by the weight to move the stem against the spring.

Attached to the arm 249 is arm 253 which extends forwardly and has on its free end a cam follower roller 254. The attachment between arms 249 and 253 is a normally fixed joint but one that is capable of yielding under abnormal force, as would occur, for example, if the rise in the cam were so abrupt that the feed back response did not occur fast enough to move the valve case in the direction of movement of the stem and relieve the stem from continued pressure after it was seated at its extreme position.

The two arms are joined by a through pin 255 which has a nut and washer on one end to create pressure between the arms and is splined to arm 249. In arm 253 is a spring-pressed dog 256 which seats in a groove in pin 255 but will yield against the spring in case of sufficient force. The spring is enclosed in a screw cap which can be adjusted to adjust the pressure on the dog.

The tracer valves having solenoids are valves 239, 241 and 242 and their operation will be understood by reference to Fig. 59. The electric circuit for timed energizing of the solenoids in the cycle of operation will be explained later. The solenoid for valve 239 is S1, that for valve 241 is S2 and that for valve 242 is S3. All of these valves are of similar construction.

The purpose of the solenoids is to allow the control by the cams to be disabled or interrupted during the upward movement of the upper first and the second stage elements and during the movement of the first stage elements backward or away from the second stage. The cam control is then restored as the vertically moving elements start down and as the horizontal movement starts forward toward the second stage. This interruption of the cam control on the upward movements of the first and second stage elements and on the backward dynamic movement of the first stage mechanism is desirable because it avoids the unnecessary retracing of the cams on those movements and allows of a quick setting of the valves to effect the backward movements and holding of the valves there until the movement is completed, thus saving time. The dynamic movement of the third stage device and tilting movement of the first stage elements are relatively very small, at the most a fraction of an inch, and therefore that movement can be cam-controlled in both directions and for that reason valves 237, 238 and 240 do not require solenoids.

The operation of valves 237, 238 and 240 will, it is thought, be apparent from Fig. 59a. The spring 248 urges the valve spool or stem toward the cam so that the cam roller 254 traces or follows the cam contour and the cam and spring coact to control the valve and admit pressure to one side or the other of the pistons of cylinders 148, 149 and 218 or to hold the valve in neutral position.

The construction of the solenoid valves is shown in Fig. 59a, this being, for example, valve 242 which is typical. The movable spool is urged toward the left by spring 248 to maintain it in follower contact with the tracer arm as was explained in connection with Fig. 17. In addition, a stronger spring 257 presses in the opposite direction against a slidable cup member 258 and if unrestrained will overcome the weaker spring 248 and force the spool and stem 247 to the limit of its movement to the right away from the tracer arm. The core 259 of the solenoid S3 terminates in a hollow cylindrical head 261 which bottoms in the cup 258 and surrounds the end of the spool spindle or stem. A washer on the end of the stem is adapted to be engaged by the cup member and carry the spool along with the cup when the spring 257 expands. When the solenoid is energized the core is forced to the left and the cup member is caused to compress the spring and relieve the spool of the action of spring 257 and place it altogether under the influence of spring 248 and the cam. This is the condition shown in Fig. 59a, the solenoid being energized and the spring 257 being thereby taken out of action and the valve being in tracer relation to the cam by reason of the effective action of spring 248.

The valve is shown in Fig. 59a in shut-off or vertical position. Tube 262 is the pressure line and tubes 263 and 264 lead to the opposite sides of the hydraulic piston while tube 265 is the return line. If the cam rises and forces the valve spool to the right line 263 will be connected to pressure and line 264 to return; while if the cam dips the spring 248 will force the spool to the left and line 264 will be connected to pressure and line 263 to return.

Valve 239 for control of the first stage horizontal dynamic movement is termed a secondary valve in that it does not control the delivery of pressure to cylinder 139 directly but rather through another or main valve 266 (see also Fig. 60). This is because the pressure to the cylinder 139 is substantially higher than that to the other five cylinders.

The pressure to the system is delivered by two pumps P2 and P3, the pressure delivered by the former being, for example, of the order of 1000 pounds per square inch, and that by pump P3 of the order of 300 pounds per square inch.

As shown in Figs. 1 and 58, motors M2 and M3 stand on tank 190 beside motors M5 and M6. These motors M2 and M3 are connected to drive pumps P2 and P3, respectively, as indicated in Figs. 59 and 60.

The hydraulic circuit from pump P3 leads to all of the hydraulic cylinders except cylinder 139, and pump P2 delivers to cylinder 139 only. Pump P3 delivers through pressure reducer valve 267 to tube line 268 and thence by line 269 through pressure regulator 270 to valve 239. Also, the line 268 leads to valves 237, 238, 240, 241 and 242 through branch lines 271, 272, 273, 274 and 262, respecitvely. The return line is 275 to which the return ports of the valves are connected by the branches 276, 277, 279, 280 and 281, respectively.

In addition, each valve has a leakage connection to line 282 which also connects with return line 275. Return line 275 leads to the tank through a pressure regulator, as shown.

The tank for the hydraulic oil is the sub-base 11. Filters 284 (see Figs. 1 and 59) filter the returning oil and line 285 from the tank branches and leads to pumps P2 and P3. Each pump has an overflow return 286 connected to return line 287 from valve 266.

The main valve 266 for the high pressure pump P2 is controlled by solenoid valve 239 which has connection with the hydraulic cylinders on the opposite ends of the valve spool and position the spool according to the delivery of pressure from valve 239. Thus the low pressure is used through the secondary valve 239 to control the delivery of high pressure through the main valve 266. The pump P2 delivers to the pressure port of valve 266 through line 288. The return line 287 is connected to the other port.

Thus it will be seen that through the tracer valves the cams control the dynamic action of all six of the hydraulic cylinders.

The feed back connections whereby the parts which are dynamically moved by the cylinders move the mobile tracer valve cases to shut off the power when the movement called for by the displacement of the valve spool is satisfied, will now be described. For their description reference is made particularly to Figs. 3, 4, 14, 15 and 16.

The feed back from the cylinder 104 for the first stage vertical dynamic is connected to and actuated by the toggle connecting bar 103 (Fig. 4). An arm 290 is fastened to and extends up from bar 103 and attached to the upper end of arm 290 is a push-pull wire which is movable longitudinally through a fixed sheath in well-known manner. This wire 291 passes through hole 292 in upright 89 and over the top of transverse plate 236 where the sheath is fastened and the wire continues to the top end of lever 293 which is pivoted to rock on shaft 294 mounted on bearings 295 extending out from the back of plate 236. The lower end of lever 293 is attached to connecting rod 296 which is connected to the carriage of valve 241 and translates the carriage in the direction to compensate for the movement of the valve spool by the action of cam 229a.

The feed back from the cylinder 204 for the second stage vertical dynamic is connected to and actuated by the toggle connecting bar 203. A push-pull wire 297 is connected to the end of the toggle bar nearest cylinder 204 and passes through upright 89 and turns and follows the upright and passes rearwardly through transverse plate 236 where the sheath for the wire is fastened. At its rear end wire 297 is attached to the top end of lever 298 which is pivoted on a bracket 299 on plate 236, and at its lower end is connected by link 300 to the upper end of lever 301 pivoted on bracket 302. The lower end of lever 301 is attached by connecting rod 303 to the carriage of valve 242.

The feed backs for the tilting cylinders 148 and 149 are connected to the forward ends of bars 87 and 88 of the guide structure 79 (see Figs. 3 and 14). A pull wire 304 is connected to bar 87 and is guided up along the front edge of upright 89 over pulleys 305 and 306 to turnbuckle connection 307 with the carriage of valve 237. As shown in Fig. 14, wire 304 is connected to the end of bar 87 by an extension plate 310 and a vertical connector arm 311.

Bar 88 which is connected to cylinder 149 is similarly connected to the carriage of valve 238. A wire 312 is connected to arm 313 which is similar to arm 311 (see Fig. 3), and runs over pulley 314 on upright 90 and thence across the front of the second stage ram and over pulley 315 on bracket 205 and has turnbuckle connection with the carriage of valve 238.

The wires 304 and 312 are kept taut by weights attached to the opposite ends of the carriages of valves 237 and 238. These weights are numbered 316 for valve 237 and 317 for valve 238. These weights are on the ends of arms 318 which have their other ends secured to radial arms on hubs 319 and 320 bearing on shaft 294. The radial arm on hub 319 is numbered 321 and the radial arm on hub 320 is numbered 322. The radial arm 321 is connected by connecting rod 323 to the end of the carriage for the valve 237 opposite the connection of pull wire 304. The radial arm 322 is connected by connecting rod 324 to the end of the carriage for the valve 238 opposite the connection of pull wire 312. The weights create a clockwise torque on arms 321 and 322 as viewed in Fig. 14 and thus create a constant stress on the carriages and keep wires 304 and 312 taut.

The feed back for the first stage horizontal dynamic is operated by a push-pull wire 325 operating through a sheath anchored at two points. As shown in Figs. 14 and 15, the wire is attached to the rear side of the left end of cross head 93 of the lower first stage body member and the sheath at that end is anchored to a plate on an adjustable bracket 326 on an arm 327 extending rearwardly from wall 83 of the guide structure 79. From this anchorage the wire curves upward back of the plate 236 to a second anchorage for the sheath in a plate on an adjustable bracket 328 on bracket arm 329 extending angularly up from a support on plate 89. From the bracket 328 the wire continues on to a connection with the outer end of the horizontal arm of bell-crank lever 330 pivoted on a pivot pin in the bifurcated end of a yoke-shape bracket 331 on the rear side near the top of plate 236. The other arm 332 of the bell-crank lever extends angularly back parallel to wire 325 and is attached by a connecting rod 333 to the rear end of the carriage for valve 239. By these means the horizontal movement of the first stage assembly imparted to it by hydraulic cylinder 139 is transferred to the case of valve 239 which, acting through valve 266, shuts off hydraulic pressure to the cylinder when the final stage assembly has been displaced the amount called for by the displacement of the spool of valve 239 by the cam.

The feed back for the third stage is effected through lever linkage rather than through push-pull wire device. On the left end of cross head 213 of the third stage is a screw stud 334 on which is pivoted a forwardly extending link 335. Link 335 is pivoted at its forward end to a link 336 which is splined at its upper end to a rock shaft 337 that bears in a hub on a bracket plate 338 fastened to and extending forward from the front edge portion of main upright 89. Splined to the other end of shaft 337 is link 339 which is pivotally connected at its upper end to a relatively long link 340 which extends upwardly and rearwardly just outside of upright 89. At its upper end link 340 is pivotally connected to arm 341 which extends radially from a hub that is pinned to shaft 294 (see Fig. 15). At the other end of the shaft adjacent the hub for the first stage vertical dynamic levers 293 is another hub 342 pinned to shaft 294 and having a radial arm 343 the lower end of which is attached to connecting rod 344 that is fastened at its other end to the carriage for valve 240.

It is to be observed that link 340 passes through the large cut-out in plate 236 which accommodates the carriage 35 and the mechanism carried thereby and that all of the connecting rods to the valve carriages pass through holes in plate 236.

The forming elements 211 and 221 for the second and third stages are shown as inflexible plates with the forming surfaces respectively on their bottom and top edges. With such construction the surface contours are fixed and the variation in shapes that can be drawn by them is limited to the effects resulting from the dynamic movement of the third stage and the dynamic horizontal, change of elevation and tilting movements of the first stage. Consequently, with such inflexible forming elements a great number of different contoured elements would be required to take care of the usual commercial needs.

This invention comprehends a flexible forming element which is susceptible of easy adjustment so as to change its contour and which is, nevertheless, sufficiently rigid to withstand the forces to which it will be subjected in use without deformation.

The improved forming element has a hardened steel work face comprising a strip of suitable alloy which is backed by a body of soft steel to which it is secured and which is transversely slotted at close intervals, together with means to apply local pressures to open or close the slots and flex the unslotted portion of the soft steel body which serves as a backing for the hardened steel face, with the result that the work face flexes with the softer steel backing.

Such improved forming elements are shown in Figs. 31, 33 and 34 in which flexible elements for both the second and third stages are shown. Both are of two parts, a fixed abutment member which has a dovetail connection with the holder member, and a slotted work engaging member possessing the hardened work face and clamped to the abutment member and having adjusting means carried by the abutment member and acting upon the slotted member to exert deforming force thereon.

The second stage forming element will first be described. The abutment member 345 of the two-part element is a full length channel-shape member having a dovetail tongue on its back face which is received in a complementary groove along the inner face of the thinned bottom edge portion of ram 200 and is secured by wedge member 212. The work engaging member 346 of the two-part element is also a full length channel-shape member that has its channel face opposing that of the abutment member 345 but offset so that its upper flange is disposed between the flanges of the abutment member and the bottom flange of the abutment member is disposed within the channel of the work-engaging member. A clamp plate 347 bears against the rear face of the work-engaging member 346 and is secured to the abutment member 345 by two rows of screws 348 the upper row of which is above the top flange of the work-engaging member and the lower row of which passes through elongated widened slot portions, as will be more fully described.

The body of the work-engaging member 346 is of relatively soft steel to one end of which is secured a hardened steel work face 346a, the member being disposed with this end down. The body of the member is also provided with open-ended slots 349 which extend from the end opposite the work face into the flange having the work face. The slot is a single slot up to the lower flange where it branches into two slots diverging at about 90° and continuing a substantial distance into the flange, leaving an unslotted strip of the softer steel as a backing for the hardened work face, such strip being thin enough to be substantially flexible. Those slots which have the screws 348 passing through them have widened portions 349a to accommodate the screws which widened portions are of sufficient length to permit of the relative longitudinal adjustment of the work-engaging member, as will be described. The slots diverge somewhat toward their open ends so as to provide ample room for considerable convex curvature of the work face without the slots closing. The slots are in practice spaced about an inch and a quarter.

Flexing of the work face is done by exerting pressure upon the inner face of one or the other of the flanges of the work-engaging member. For this purpose a series of longitudinally extensible adjusting screws are located in screw-threaded holes through the flange of the abutment member which is disposed within the channel of the work-engaging member.

Each of the screws shown is composed of two telescopic parts. An external screw member 350 screws into the hole tapped in the flange of the abutment member and is hollow and internally screw-threaded. It is somewhat shorter than the distance between the inner faces of the flanges of the work engaging member and has one end squared to receive a tool and the other end concavely cupped to receive a bearing button 351 having a spherical under side to fit and rock in the cupped end of the external screw member 350, the purpose of the bearing button being to assure a full parallel surface contact between the end of the screw and the flange surface.

A smaller screw 352 having a hexagon head screws into the internal threaded bore of the larger screw. If it is desired to use a screw to exert upward pressure, the smaller screw 352 will first be screwed into the larger screw section to raise the head off the lower flange of the work-engaging member a distance as near as can be judged equal to that which the section of working face at that point is to be raised. Then the tool is placed on the square end of the larger screw section and that section is screwed up until the bottom flange again engages the head of the smaller screw. When trial shows that the right contour is obtained, the screws are given a final expansive turn to assure that the composite screw braces the work-engaging flange against the opposite flange. In this way the hardened work face is rigidly supported against any deformation under the stress of the work drawing force.

The third stage forming element is in all substantial respects a duplicate of the second stage element, being reversely arranged. The corresponding parts are therefore identified with the same numerals with a prime mark.

The chief difference between the lower and upper forming elements is in the shape of the work face bearing flange and in the cross-sectional shape of the hardened work-engaging strip. It will be noticed that forward face of the flange is beveled off on the lower element and that the hardened strip is oblong in cross-section and set into a longitudinal groove, being narrower than the width of the flange, while the strip on the second stage element covers the entire face of the flange and has the work ridge at the entrance edge.

To permit removal of the work-engaging elements of the first, second and third stages, a hole is provided in the outer or main upright 90. This hole is numbered 353 the outline of which appears in Fig. 31. There is also a notch 354 provided in the right secondary upright 92, as shown in Fig. 4, the outline appearing in dotted lines in Fig. 14. When the clamps 212, 222, 111 and 122 are loosed, the forming elements 211, 221, 346 and 346', the hold-back elements 110 and 121 may be slid laterally out of the hole 353, the notch 354 in the front edge of the secondary upright allowing the hold-back elements to pass through. The smoothing plates 113 and 124 are removed rearwardly when the clamps 115 and 125 are removed.

The front wall of sub-base 11 is centrally recessed (see Fig. 6), the recess being of substantially the same width as the spacing of legs 67, 68 of the main base 65, and the main base is secured on the sub-base with legs 67, 68 forming continuations of the side walls of said recess, as shown in Fig. 4, thereby creating a knee opening for an operator seated in front of the forming section while making adjustments of the forming elements, for example, the rearward inclination of wall 72 contributing to the depth of the knee opening and convenience of the operator.

The sheet-pulling or drawing mechanism C will now be described. It is shown principally in Figs. 1, 2, 8, 11, 45 through 54 and 55 and basically comprises a laterally extending wing-shape arm designated generally 355 which is attached to and reciprocated by the carriage 35 and a draw head carried by the draw arm and designated generally by the numeral 356, together with a local hydraulic system including motor, tank and valve mechanism carried by the arm.

The wing-shape draw arm 355 comprises a flat plate 357 (Figs. 8 and 45) which is fastened at its one end to the carriage 35. For attachment to the carriage the plate is provided on its underside at that end with a depending boss 358 making a thickened portion which is of a width to enter between the vertical sides of the draw bench 32 and of a thickness to contact the carriage with the plate just clearing the draw bench, as shown in Fig. 1. This thickened portion of the plate is keyed to the carriage by keys 359 and is also bolted to the carriage as indicated in Fig. 45.

The plate 357 is subjected to the entire pulling force of the sheets and it is reinforced by a streamlined concave top cover sheet 360 which makes in effect a hollow wing or arm that extends across in front of the forming mechanism A. The plate or arm is widest at its attached end and is rounded on its forward edge to a narrower width at its free end at which end the cover sheet 360 steps down in two steps to a substantially thinner construction. This free end is supported in its reciprocation by a leg 361 which has a caster on its bottom end that runs on a rail 362 flush with the foundation.

The plate 357 has integrally secured on its under side two pairs of channel-shape guides for supporting and guiding a frame structure that extends forwardly from the draw head 356 and the frame structure has a limited freedom of movement in the guides, as will be seen. One pair of channel guides is numbered 363 and is on the front edge of the plate extending forwardly therefrom somewhat nearer the narrow end than the wide end of the plate. This forward extension is enclosed by suitable cover plates which include an end cap closure 364 into which the front extremity of the frame reciprocates.

The other pair of channel guides for the frame are numbered 365 (Figs. 8 and 45) and are at the rear edge of plate 357 parallel with guides 363 but more widely spaced.

The guide frame of the draw head structure comprises two forwardly converging channel bars 366 and 367 which are attached to the draw head at their rear ends and come together in a V-structure. The flanges of the bars are disposed top and bottom with the web outside, and the top and bottom flanges merge at the juncture until the webs meet and continue forwardly face to face into the cap 364. The frame has two plates secured upon its top face which serve as crossheads guided in the guides 363 and 365. The rear plate 368 is relatively wide and slides in guide 365, suitable bearings, such as formica being provided, as indicated by the stippling in Fig. 45. The forward plate 369 is of a width to slide in guides 363 which have similar bearings. Depending from the bottom side of plate 357 is an abutment block 370 disposed between plates 368 and 369 and located so that it abuts against the rear edge of plate 369 on the draw but near the end of the return half of the cycle it is free to move with its supporting plate away from the plate 369 after the jaws arrive at the sheet-gripping position. It will be seen that this relative movement is necessary in the cycle of operation, but the spacing is such that the block 370 stops short of contact with the plate 368. Fig. 45 represents the most rearward position of the plate 357 with the jaws in initial gripping position. It will later be explained that the carriage slows down as the jaws approach the edge of the sheet and there is a definite stop for the jaw head at the correct gripping position, while the plate or draw arm continues on for a short distance before the carriage is stopped and reversed, and then the arm moves forwardly far enough for the block 370 to pick up plate 369 before the draw begins. In Fig. 2, the arm is shown as having moved forward part way to the pick-up position, as compared with Fig. 45.

The draw head construction 356 will now be described. At their rear ends the frame bars 366 and 367 are secured against the forward face of a vertical plate 371 which serves as the supporting and adjusting plate for the jaw assembly. On the bottom of plate 371 is secured the rear edge of a horizontal plate 372 which has rounded forward corners, as shown in Fig. 45. This plate 372 extends from end to end of plate 371 and underlies and is secured to the bars 366 and 367. A similar top plate 373 is secured at its rear edge to the top of plate 371 and is also secured on the top flanges of bars 366 and 367. Secured between the forward edges of plates 372 and 373 are vertical plates 374 and 375 which extend laterally from and are secured to the webs of bars 366 and 367, respectively. Thus there is provided an open-ended housing in front of and mounting the jaw assembly which serves as a truss as well as a housing for hydraulic manifolds and tubing.

The vertical plate 371 has a series of four through bolts 376 which pass through vertically elongated holes 377 and screw into a vertically adjustable jaw holder bar 378. On each end of bar 378 is a vertically threaded circular extension 379 in which is a manually adjustable screw 380 that bears on its lower end against the top of a rearward extending shoulder member 381 that is secured on each end of plate 371. It will thus be seen that screwing down on screws 380 will raise the bar 378 and all of the jaws as a unit, while screwing out on the screws will allow the bar 378 and the jaws to drop as a unit. The elongated slots 377 permit of such adjustment relative to the plate 371, it being necessary to loosen the bolts 376 to release the bar for such adjustment, the bolts being again tightened after each adjustment. Wrench holes 382 are provided in the bottom plate 372 in registry with each bolt to accommodate the tool for turning the bolts.

There are shown twelve individual jaws each designated as a whole by the numeral 383. Secured on the top and bottom of the bar 378 are twelve equally spaced screw-retaining plates 384 and 385, respectively, being keyed thereto by keys 386 and 387, respectively, and otherwise secured as by screws (not shown). The plates 384 and 385 are somewhat longer than the width of bar 378 so that their ends extend beyond the rear face of bar 378. The gripping mechanism of the jaws is rotatively mounted in a hub member 388 so as to turn therein on a horizontal axis for the purpose of adjusting the jaws to the angle of the leading edge of the sheet. The hub member is shown as circular in cross-section and is vertically tapped to receive an adjusting screw 389. This adjusting screw has reduced ends which bear in the overhanging extensions of plates 384 and 385, the upper end being slotted for a tool. Therefore, by turning the screw 389 the hub 388 and the jaw carried thereby are adjusted vertically, means being thereby provided for individual vertical adjustment of the jaws relative to the bar 378.

The jaw structure itself is shown in detail in Figs. 47 through 52. A rectangular solid body member 390 has two side plates 391 and 392 bolted thereto and keyed by keys 390a. The body member has a central axial bore closed at its forward end by a screw plug 394 and constituting a hydraulic cylinder in which is reciprocated a piston 395.

Spanning the side plates 391 and 392 and bolted thereto are rearwardly converging top and bottom plates 396 and 397, respectively. As shown, these plates are set in grooves in the inner faces of the plates and form backing members and guides for top and bottom jaw or gripping plates 398 and 399, respectively, the side edges of which occupy the space between the bottoms of the grooves in the side plates and the backing plates. The gripping plates are beveled off and serrated at their gripping ends to enhance their grip upon the edge of the sheet. The side plates have circular cut-outs 400 providing a mouth for the admission of the edge of the sheet.

For actuation the gripping plates are connected by a truncated cylindrical key or coupling member 401 which is seated at its ends in round bores in the gripping plates. This key 401 (Fig. 52) has a radial bore 401a which is screw-threaded and receives the reduced threaded end of the piston rod 402. The rear end of the cylinder is closed by a permanent head plug 403 which has an internal piston ring surrounding the piston rod 402, the body member 390 having a rearwardly extending rectangular neck portion 390b into which the head plug 403 hermetically fits and is secured. Thus, it will be seen that admission of pressure fluid on the right side of piston 395 as viewed in Fig. 48 will force the piston to the left and draw the plates up the inclined guide grooves and open the jaws; while pressure fluid on the left of the piston will force it to the right and close the jaws, which is the position shown in Fig. 48. The length of the gripping plates 398 and 399 is such as to allow of this movement in their grooves.

The body member 390 has a threaded reduced extension 404 on its forward face which screws into a threaded socket on the hub member 388. The wall of this socket is split, as shown in Fig. 49 and is expanded and contracted by a clamping screw 405. The angular position of the jaw may be adjusted when the screw is loosened and it is locked in adjusted position when the screw is tightened.

There are two hydraulic tubes 406 and 407 attached to the body member 390 and communicating with passages in the body member leading to opposite ends of the cylinder. As shown, tube 406 connects with passage 406a leading to the end at the left of piston 395 in Fig. 48 and tube 407 connects with passage 407a leading to the end of the cylinder at the right of the piston in Fig. 48. These tubes 406 and 407 connect with manifolds 408 and 409, respectively, which are housed within the housing in front of vertical plate 371. Two tubes 410 and 411 connect with manifolds 408 and 409, respectively, and are carried by the channel frame structure for the draw head and connect with correspondingly numbered flexible extensions leading to the valve and pump mechanism carried by the arm 355, the flexible portion of the tubing being to allow for the relative movement between the arm and the draw head with its guide frame.

The hydraulic pump and valve mechanism is shown particularly in Figs. 45, 53 and 54. It is suspended underneath the plate 357 on a hanger plate 412 that has at its forward end an upstanding arm 413 and 414 on the respective sides with outturned top extensions 415 and 416, respectively, that are riveted or bolted to the underside of plate 357. At an intermediate level in front is a valve supporting plate 417. An extension of plate 412 at the rear end is attached to plate 357 by a bolt 418, suitable spacing means (not shown) being provided.

The motor M4 is seated on plate 412 and operates a pump 419 which is connected into tank 420 which contains the hydraulic fluid.

The valve, designated as a whole by the numeral 421, is shown in detail in Fig. 54 and is seated upon plate 417. The valve proper has a case 422 and a slidable spool 423. The spool is urged in one direction by a spring 424 and in the other direction by a solenoid S4. The valve has four ports, one of which is connected to the pressure side of the pump by tube 425 and another of which is connected to the return to the tank through pipe 426. Of the other two ports one is connected to pipe 410 and the other to pipe 411. When the spool is in the position at the left in Fig. 54 to which it is moved by the spring, the pressure fluid is connected to tube 410 while tube 411 is connected to the low pressure or return; and when the spool is moved to the right under the influence of the solenoid, the connections to the jaws are reversed, tube 411 being pressure and 410 being return.

It will be seen that when the solenoid is deenergized and the spring is in control of the valve, the jaws are closed for the reason that the pressure is admitted to the left end of the cylinders in the jaws as shown in Fig. 48 through tube 410, manifold 408 and tube 406; and that when the solenoid is energized the valves are open since the pressure is in the right end of the cylinders through tube 411, manifold 409 and tube 407.

The operating of the valve is effected by automatic control of the energization of the solenoid at controlled times in the cycle, and may also be effected manually through push buttons connected in parallel to the automatic controls, as will now be described with especial reference to Fig. 55.

Fig. 55 shows the electrical circuit for the motor M4 and solenoid S4. Associated with the draw head is an adjustable positive stop member shown as a flat bar 427 (see especially Fig. 8). This bar is disposed under the jaw assembly at substantially the center line of the jaws and is supported in a guide channel 428 on the underside of plate 372. The forward end of the bar is rounded and screw-threaded and extends through the depending flange of an angle bracket 429, the horizontal flange of which is bolted to an arm 430 that is bolted onto the bottom plate 372 and extends forwardly over the bracket. The bolt 431 which secures the bracket 429 to the arm 430 extends through a slotted opening in the arm to allow of adjustment of the bar 427. Two nuts on the opposite sides of the bracket flange provide for the longitudinal adjustment of the bar, and the bar is positioned so that its contact end enters into the oil groove 223 in the third stage crosshead 213 at the limit of return or pick-up movement of the jaws. The jaw assembly moves very smoothly on the formica bearings and the bar is not subjected to any great impact force, although it serves to limit the movement with required exactness and accurately position the jaws to grip the edge of the sheet. An adjustable abutment screw 432 in a depending flange on the end of arm 430 bears against the flange of bracket 429 and braces the bracket on impact.

A spring plunger 433 on the end of bar 427 operates a micro limit switch LS7. As will be seen in later consideration of the electrical system of the machine, this limit switch is normally closed and is opened by the contact pressure on the plunger against the spring. This opening of switch LS7 deenergizes solenoid S4 and spring 424 moves the valve plunger or spool to the left in Fig. 54 and connects the pressure into line 410 and closes the jaws.

Carried by the wing arm 355 is another limit switch LS8 which is normally open and at the portion of the cycle near the end of the draw this limit switch LS8 strikes a dog 434 adjustable on a bar 435 on the side of the draw bench and closes the circuit of relay 4S which controls solenoid S4 and closes the solenoid circuit. As will later be seen, a holding circuit keeps the solenoid energized until the switch LS7 is again opened. The energization of solenoid S4 causes the valve plunger to move to the right and connect the pressure into line 411 and open the jaws.

To enable manual operation of the jaws the circuit for the relay 4S includes two push buttons 436 and 437 on the outer end of wing arm 355. Button 436 normally closes its switch contacts which are in series relation to LS7 and button 437 is in normally open relation to the contacts which are in parallel relation to LS8.

Bus bars 438 are laid in the inner faces of the upright sides of the draw bench and brushes 439 (one being shown in Fig. 55) are carried by the carriage 35 and wipe the bus bars. The bus bars are connected across a source of A. C. current and the brushes connect the circuit for the solenoid, relay and motor M4 to the bus bars, as shown in the diagram of Fig. 61 to which reference will now be made. On the main upright 90 is a control panel 539 on which are push buttons arranged as shown in Fig. 56, and in considering the portion of the electrical diagram of Fig. 61 having to do with the operation of the jaws, reference will also be made to the button diagram of Fig. 56.

The two A. C. conductors are numbered 440 and 441. The relay 4M for motor M4 is connected across the line through the button 442. If the button is closed the relay 4M is energized, closing contacts 4M1 and 4M2 which connect conductors 443 and 444 to the respective sides of the main line. This energizes motor M4 which is connected across wires 443 and 444 and the motor will continue to run and operate pump 419 until switch 442 is opened.

The energizing of relay 4S will energize the solenoid S4. In the condition shown in Fig. 61 the relay 4S is deenergized and the solenoid is deenergized, leaving spring 424 in control of valve 421 and holding the jaws closed. This is the condition during the draw until the dog 434 engages limit switch LS8 and momentarily closes it. This closes the circuit through relay 4S by way of line 443, switch LS7, wire 445, button 436, wire 446, switch LS8, and wires 447 and 448 including the relay to line 444. The relay thereupon closes switches 4S1 and 4S2. Switch 4S1 closes the circuit of solenoid S4 through wire 449, switch 4S1 and wire 450 to the other side of the line through solenoid S4. Normally open switch LS8 reopens at once but relay switch 4S2 holds the relay circuit closed through wire 445, wire 451, switch 4S2, wire 452, wire 447 and wire 448 including relay 4S. This condition remains until the holding circuit is broken either by the opening of switch LS7 or the opening of the switch controlled by button 436. The closing of the switch controlled by button 437 will also close the circuit for relay 4S.

While the entire twelve jaws will be required for sheets of maximum width, for narrower sheets a lesser number of jaws will be needed and, as shown in Fig. 53, for example, the outer four jaws at each end are provided with shut-off valves in their connection with the manifolds whereby one or more of the four may be made inoperative.

The operation of master switch 453 on the control panel makes and breaks the circuit connections for leads 440 and 441 and also to a control relay (not shown) for the main motor M1 the supply circuit for which may be a motor-generator set supplying a D. C. current. The lamp circuits are also controlled by the master switch 453 and in a parallel circuit by a switch 454 not on the control panel.

On a board 455 on the outer face of the left main upright 89 extending through plate 236 are mounted nine limit switches LS1, LS2, LS3, LS4, LS5, LS6, LS9, LS10 and LS11 (see Figs. 14, 15, 16 and 55). Opposing this board 455 is an elongated board 456 (see also Fig. 1) which is mounted on the inner edges of the cam support frames 224. This board 456 is of a length to have a portion opposing the board 455 in the extreme positions of the carriage. It is provided with five slots which are T-shape in cross-section and in these slots are disposed T-shape dogs 457. The limit switches L1 to L11 are disposed in rows so that dogs 457 will operate the switches in the desired order and time as the dogs move with the carriage. Means are provided to lock the dogs in the positions to which they are longitudinally adjusted in the slots. The function of the limit switches which are mounted on board 455 will appear in the following explanation of the electrical circuit of Fig. 61. In actual construction, as seen in Fig. 55, wires connect the limit switches to the bus bars 438 and also lead to the solenoids S1, S2 and S3 of valves 239, 241 and 242 mounted on transverse plate 236.

Relays 2M and 3M for starting motors M2 and M3 are connected across the line under the control of buttons 458 and 459, respectively, which appear on the control panel of Fig. 56.

The relay starters 5M and 6M for lubricating motors M5 and M6 are both under the control of button 460, the two relays being in branch circuits. Relay 5M is under control of limit switches LS9 and LS10, the former being a normally open and the latter a normally closed switch.

Relay 5M is deenergized in the circuit condition shown in Fig. 61. The closing of switch LS9 by one of the dogs as the dogs 457 are moved in front of the switches on board 455 will close the circuit through relay 5M and start the motor M5, at the same time closing relay switch 5M1 and establishing a holding circuit. The motor M5 will therefore continue to run until one of the dogs opens switch LS10 which will deenergize the starter relay and stop the motor.

The relay 6M for starting the motor M6 is not controlled by limit switches. It will run continuously, once switch 460 is closed, provided there is oil in the tank 190. If motor M5 stops pumping oil motor M6 should stop when the oil in tank 190 has been passed through the filter into tank 191. There is therefore provided a float-controlled switch 461 as shown in Figs. 58 and 61 which will open the circuit of relay 6M when the oil level in tank 490 is low enough.

The tracer solenoids are all under the control of button 462. Solenoids S1 and S2 for the first stage horizontal and the first stage vertical tracer valves 239 and 241, respectively, are in branch circuits under the control of limit switch LS4. This is the only maintained limit switch, that is, one that remains in the position to which it is set by a passing dog. As will be seen, therefore, solenoids S1 and S2 are energized on one half cycle of the machine and deenergized on the other half cycle. When the solenoids S1 and S2 are deenergized the relatively strong spring 257 is in control (Fig. 59a) and the tracer action is disabled, the first stage assembly being fully retracted by hydraulic motor 139 and the vertically movable upper first stage assembly being raised by hydraulic motor 104; and when the solenoids are again energized they restore the relatively weak springs 248 to control and the valves 239 and 241 become responsive to tracer control. The operation of alternately opening and closing the limit switch LS4 is effected at proper times in the cycle by dogs 457.

The solenoid S3 for the second stage tracer valve 242 is arranged under the automatic control of limit switches LS5 and LS6 and under the manual control of manual switches operated by buttons 463 and 464, the former being normally closed and the latter normally open. When limit switch LS5 is automatically opened in the cycle of operation it breaks the circuit for the relay 3S and when the limit switch LS6 is automatically closed it closes the circuit for relay 3S which establishes a holding circuit for the relay and connects the solenoid S3 across the line. Operation of the switches 463 and 464 produces the same effect as the operation of the limit switches LS5 and LS6, respectively.

In the circuit condition shown in Fig. 61, the solenoid S3 is deenergized under which condition the spring 257 of Fig. 59a is unconstrained and overpowers spring 248 and holds the stem 247 fully to the right, the tracer arm 249 following under the influence of weight 251 and raising the roller 254 from the cam. This connects tube 263 to pressure and 264 to return and operates hydraulic cylinder and piston 204 to raise the second stage assembly.

To return the second stage to tracer control, the limit switch LS6 is closed by a dog 457 at the proper time in the cycle and the circuit for relay 3S is closed through wires 465 and 466, switch LS6 and wires 467, 468 and 469 including the relay. The relay closes contacts 3S1 and 3S2, thereby energizing solenoid S3 through wire 470, switch 3S1 and wire 471 including the solenoid. At the same time switch 3S2 closes a holding circuit for the relay including wires 465 and 466, switch 3S2 and wires 467, 468 and 469 including the relay. The energization of the solenoid S3 places valve 242 under tracer control due to the disabling of spring 257 and spring 248 becoming effective, and the valve remains under tracer control until at the proper time in the cycle limit switch LS5 is opened by a dog 457 and the relay 3S and the solenoid S3 are again deenergized.

In addition to the limit switches which have been so far explained in connection with the operation of the machine, the board 455 contains limit switches LS1, LS2,  LS3 and LS11. It will be seen in the further explanation of the cycle of operation that switches LS2 and LS3 cause the main motor M1 to stop and reverse at the two ends of the reciprocative movement of the carriage, that switch LS1 effects a slowing down of the motor as the jaws approach gripping position and that switch L11 operates an emergency stop in case of overrun for each half cycle.

In addition to the master control buttons 453 on the control panel of Fig. 56, there are also buttons 472 controlling a special circuit (not shown) for inching or jogging the motor M1 and buttons 473 in the circuit for test running of the forward and reverse. Also switch 474 controls what are known as run periods, determining in its three possible positions whether the machine will run continuously and automatically, whether it will operate for one half cycle and stop, or whether it will run for a full cycle and stop.

Assuming that switch 474 is on automatic, the master switch 453 is in the closed position shown in Fig. 61, and that switches 442, 458, 459, 460 and 462 are in the closed position shown in that diagram, the successive steps that automatically occur in a complete cycle of operation of the machine is diagrammatically indicated in Fig. 65, which will now be considered in connection with Figs. 62, 63 and 64 which show three positions of dynamically moved parts at specified stages in the cycle.

Fig. 62 represents the condition, termed Position A, in which the first and second elements are in the position resulting from the deenergization of solenoids S1, S2 and S3 with the upper hold-back and the second stage elements at the top of that vertical movement and the first stage elements are at their maximum distance from the second stage.

Fig. 63 shows position B which results from the three solenoids being energized and restoring tracer control, the contour of the cams being such that the upper hold-back element is down to sheet level without hold-back coaction with the lower element, and the second stage is just brought down to sheet level and the jaws are about to grip the edge of the sheet. The cams will maintain the first and second elements at these levels until the draw starts, thereby avoiding the formation of beads or permanent convolutions in the sheet.

Fig. 64 shows the position of the parts, termed position C, which is the draw position of the forming and hold-back elements and which the cam contour effects at the instant that the draw begins, the closed condition of the jaws and their position farther to the left indicating that the draw is under way.

For the explanation of the diagram and chart of Fig. 65, it will be assumed that the sheet is being drawn as represented by Fig. 64. The movement will be in the direction of the arrow in the right side of the diagram, that is, down as represented in Fig. 65.

The first thing that happens as the end of the draw is approached is the shutting off of lubricating pump M5 which occurs at five inches from the stopping and reversing point which marks the end of that half cycle. It will be understood that the need for lubricating the sheet has ceased at this point since the trailing edge of the sheet has escaped from the hold-back elements and formation has ended. Pump M6 will continue to run unless stopped by the float valve 461.

The next occurrence that is indicated is the exit of the trailing edge of the sheet from the second and third stage elements which occurs four inches from the reversal point.

After a movement of one more inch to within three inches of the limit or reversal point, limit switch LS5 engages a dog and is momentarily opened, thereby deenergizing solenoid S3 and causing spring 257 to take over and stop the tracer action and move the plunger of valve 242 fully to the left as shown in Fig. 59 and to the right as shown in Fig. 59a and direct the pressure through tube 263 and cause cylinder 204 to raise the second stage element to position A of Fig. 62.

The carriage moves two more inches when limit switch LS8 hits dog 434 and solenoid S4 becomes energized, the jaws are opened and the sheet is dropped.

After a movement of one more inch the limit switch LS3 engages a dog and the motor is stopped and reversed, as indicated by the diagram. In case of failure of the limit switch to operate, the motor will continue the carriage in the same direction and at the end of four inches of travel a dog will operate limit switch LS11 and stop the motor M1. If the momentum carries the carriage on two more inches it will strike the bumpers shown in Fig. 45 at the forward end of the draw bench and the shock will be absorbed.

Assuming the normal operation involving the stopping and reversing of the motor, the return movement is represented by the line at the left side of the diagram in the direction of the arrow pointing up. When the carriage has moved one inch in that direction limit switch LS4 is opened by engagement with a dog and solenoid S2 and solenoid S1 are both deenergized. This causes the heavy springs 257 to take over and stop the tracer action and move the plungers of valves 239 and 241 fully over to the left as shown in Fig. 59 and to the right as shown in Fig. 59a, and direct the pressure to the right side of the pistons in cylinders 139 and 104 as shown in Fig. 59, and thus raise the upper hold-back element of the first stage and move the first stage elements away from the second stage to the position of these parts in position A of Fig. 62.

When the carriage and the draw head are eleven and one-half inches from the limit of movement of the carriage in that direction, a dog actuates limit switch LS1 which causes the motor M1 to slow down.

At five and one-half inches from the limit of movement of the carriage on this half cycle switch LS6 is closed by engagement with a dog and solenoid S3 is thereby energized. This restores tracer action and the cam will cause the second stage element to descend to sheet level which is position B.

At three and one-half inches from the end the limit bar 427 of the jaw structure hits the third stage crosshead and the jaws come to a stop. At the same time limit switch LS7 is opened, solenoid S4 is deenergized, valve 421 directs pressure through line 410 and closes the jaws. In Fig. 63 the jaws are shown in the act of closing.

The carriage continues on three and a half inches farther when a dog engages limit switch LS2 and the motor is stopped and reversed. This further movement brings the parts into the position shown in Fig. 45 with the block 370 separated from plate 369. If through a fault the limit switch LS2 did not function, there is the same emergency provision at that end as at the other, limit switch LS11 stopping the motor and bumpers being provided at the end of the draw bench.

One-half inch after the reversal limit switch LS4 is again closed and solenoids S1 and S2 are energized. The upper hold-back element is then moved down to position B by hydraulic motor 104 and the first stage assembly is moved in place by hydraulic motor 139. In Fig. 63 no change is shown in the separation of the first and second stages as compared with position A.

After a movement of the carriage another inch to one and a half inches from the reversal point, limit switch LS9 is closed which energizes the starter relay 5M for motor M5 and lubrication of the sheet is thus started.

At three and one-half inches on this draw stroke block 370 engages plate 369 and the carriage picks up the draw head and the draw starts. Instantly the cams cause the first and second stage elements to close down to the draw position illustrated in position C. The carriage continues forward through the draw stroke and the occurrences above described are repeated.

Figs. 66 to 78, inclusive, represent diagrammatically the functional advantages arising from the ability to raise and lower the level of the first stage holdback elements about the transverse axis of the gimbal mount shown in Figs. 29 and 30 and the ability to tilt the holdback elements about the longitudinal axis.

These angular movements of the first stage or holdback elements are effected dynamically by the hydraulic cylinders 148 and 149 under the control of their respective tracer valves and cams 225a and 226a. If the angular movement to be imparted is wholly about the transverse axis to effect a change in first stage level, only one of cams 225a and 226a is used, the other cam being dropped below the range of its roller 254 and the two tracer arms 249 of the tracer valves 237 and 238 being coupled to move together. Thus the two tracer valves and the two cylinders are controlled by the one cam, assuring uniformity in action of the two hydraulic cylinders. In such case, of course, the cylinders do not act as tilting cylinders but merely as leveling cylinders.

Such leveling action is illustrated in Figs. 66, 68 and 69. In these figures W represents the width of the sheet S; L is the level of the plane of the lower portion 121 of the first stage or the level of the bottom surface of the sheet to be formed; $d$ is the vertical distance or drop between the contact surface of the first stage 121 and the contact surface of the third stage 221 in the vertical plane of the edge of the sheet; D is the vertical distance or drop between the contact surface of 121 and the lowest point of the curved contact surface of 221.

As has been pointed out, if the drop $d$ is between three and six times the metal thickness, no permanent deformation will occur in the vertical plane of such drop and the increments will extend up to such vertical plane. If, as shown in Fig. 66, the same drop $d$ is at the two edges of the sheet and is within the range mentioned, the increments will be complete from edge to edge of the sheet, being maximum at the center line of the sheet and diminishing uniformly to zero at the edges. If $d$ is greater than six times the thickness of the metal, the zero point of the increments on that edge will lie outside the sheet, while if $d$ is less than three times the thickness, the zero point will lie inside the edge and incomplete increments will result.

Fig. 66 shows a sheet a maximum width W1 and the level denoted as L1 with no tilt and $d$ the same at both edges and within the range mentioned. The formation resulting from the draw will be a segment of a torus or a compound curve with maximum elongation at the center line and no elongation of the edges.

Fig. 68 shows the parts adjusted for a narrower sheet of width W2. The level is lowered to L2 so that the drop $d$ at the edges of the sheet is normal as in Fig. 66. This results in D2 being shallower than D1 of Fig. 66.

Fig. 69 illustrates the operation in drawing a sheet of tapering width, such as the truncated isosceles triangle of Fig. 69a. At the beginning the level is L3 which defines the chord of the arc of the third stage that provides a normal drop $d$ at the edges of the sheet, and to compensate for the narrowing of the sheet as it is drawn through the forming elements, cylinders 148 and 149 are caused to lower the first stage until the level becomes L4 at the narrow end of the sheet where the width is W4. The drop $d$ is kept normal at both edges throughout the draw since there is no tilting or component of movement about the longitudinal axis and hence the increments are complete and extend from edge to edge, as indicated by the dash and dot outlines in Fig. 69a.

Fig. 70 illustrates the operation of the tilting cylinders in the drawing of a sheet such as shown in Fig. 70a which is beveled at one edge only. At the start the level L5 will be the correct level for the wide end W5 with $d$ normal at both edges, and then cylinder 148 will be dynamically operated to lower the left edge (shown at the right in Fig. 70) gradually and progressing to compensate for the narrowing of the sheet along that edge and keep the drop $d$ at that edge normal. At the conclusion the first stage element 121 will be tilted to the position by the dash and dot line P1.

Fig. 71 illustrates the operation of cylinders 148 and 149 in the drawing of a sheet having the outline shown in Fig. 71a having symmetrical concave sides with the narrowest portion nearer the leading edge, and with the leading edge slightly wider than the trailing edge. Since the sheet is symmetrical about its longitudinal center line, no tilting of the first stage elements is required. It is only necessary to change the level progressively to keep the drop $d$ normal at both edges throughout the draw. At the start the level will be at L6 and it will be progressively lowered to L7 at the waist portion and then raised again to the level L8 at the end.

Fig. 72 illustrates the operation to draw the irregular shape shown in Fig. 72a in which the ends are parallel with the rear end slightly shorter than the front end and with right angles on one side and a concave opposite side and mid portion of which is straight and parallel with the first side. To have the increments complete and extend throughout from side to side, the level at the start will be that shown at L9 and the cylinder 148 will operate to lower the concave edge through the tilted position P2 to the tilted position P3 to keep the drop $d$ constantly normal on that side, which position will be maintained through the straight portion of the side and then raised gradually to the tilted position P2 for the rear end. The hold-back elements are not restored to level for the reason that the sheet is widest at its front edge.

Fig. 73 illustrates the operation to convert a rectangular flat sheet such as shown in full lines in Fig. 73a into a segment of a torus with one edge elongated, making that edge convex and the opposite edge concave, as shown in the dash and dot outline of the formed sheet. To do this the drop on the one side must be greater than normal so that the zero point of the increment lies outside that edge, as indicated by the increment outline in Fig. 73a. For this result the first stage element is placed in the tilted position P4 with $d$ normal on the one side and considerably greater than six times the metal thickness at the other edge.

Fig. 74 illustrates the operation to draw a sheet to the configuration of the dash and dot lines in Fig. 74a with the first half having the one edge elongated and the other half having the other edge elongated. This requires the tilted position P5 at the start and a reversal to the tilted position P6 at the mid point in the draw with the latter position maintained to the end.

Fig. 75a illustrates a problem in which a rectangular sheet is to be drawn at the start into a compound curve with no edge elongation and in the latter part into a compound curve with the edge elongation. In other words, in the latter part the increments are to be incomplete within the confines of the sheet and the edge elongation is to be equal in the two sides. For this purpose the level at the start will be L10 in which drop $d$ is normal on both sides, and at the latter part the level will be L11 in which drop $d$ is equal in both sides but more than six times the metal thickness.

Fig. 76 illustrates adjustments for forming a sheet as indicated in Fig. 76a. The sheet is to run on a bias through the elements, being a parallelogram with the sides meeting the ends at other than a right angle. As indicated by the increment outlines, it is desired to start to draw a regular compound curve with no edge elongation, and to merge into a formation midway of the ends in which there is an elongation at one edge only and the zero point of the increment is inside of that edge, and then to merge into a reversal of the starting condition with zero elongation at the center line and elongation at each edge equal to that at the center line at the start. For this result the second and third stage elements have a reverse curve in their length. The start will be made with the first stage elements tilted to position P7 at which it will be observed that $d$ is equal and normal at the two edges and that D is at the center. As the sheet progresses through the elements it emerges progressively farther to the right as viewed in Fig. 76, due to its bias shape. To get the condition desired at the center the first stage elements are tilted to position P8 in which it will be observed that $d$ at one edge and at a mid transverse point is normal and at the other edge is greater than normal. Progressively, the sheet emerges farther to the right until and as it opposes the upwardly convex portion of the second and third stage forming elements the tilting cylinders tilt the first stage elements to the position P9 in which $d$ at the two edges is equal and greater than normal while D at the center is within the normal limits of three to six times metal thickness. The result of such operation will be the various increments indicated by the dash and dot outlines in Fig. 76a.

Figs. 77 and 78 are perspective views of sheets formed by possible combinations of those above described. The sheet in Fig. 77 is convex with compound curvature and results from a setting to effect maximum elongation at the center and zero elongation at the edges as, for example, the setting in Fig. 66. The sheet shown in Fig. 78 is a concave-convex shaped sheet with the maximum elongation at the edges and zero elongation at the center, a result effected by the setting in position P9 in Fig. 76 with the increments of the shape indicated at the right end of the sheet in Fig. 76a.

Figs. 79 through 89 relate to the utility of the vertical dynamic control of the upper first and the second stage elements and illustrate the different operative positions of the first stage element and different shapes resulting from the several positions and the types of sheets on which this vertical dynamic control has especial advantage.

Figs. 79 through 82 are fragmentary diagrammatic outlines of the first and second stage elements with a sheet passing through them. In Fig. 79 the upper first stage element is only partly closed. With this setting practically no restraint or hold-back would be developed and a flat sheet blank drawn through the machine would come out flat even if the second stage were closed with reference to the coacting third stage. The sheet would emerge without any differential alteration in length and the increment would be zero as indicated by the dash and dot line in Fig. 79a.

In Fig. 80 the first stage opening is decreased so as to offer a minimum amount of restraint and yet sufficient to create a differential elongation of a sheet blank. With such inadequate restraint, however, there is the risk of not producing complete increments from edge to edge of the sheet, as indicated by the increment outline in Fig. 80a, in which event the edges are apt to be wavy, as shown in that figure.

Fig. 81 shows the upper first stage element still further down so as to produce a moderate amount of restraint sufficient to form complete increments on relatively narrow sheets, as shown in Fig. 81a. This sheet, as indicated by the increment outline, has a complete increment with the zero points at the edges with the result that the sheet has a proper compound curvature.

Fig. 82 shows a position of the first stage upper element with what normally is considered excessive restraint. Such restraint is needed on certain jobs, for example, (a) on wide sheets with deep draws; (b) on sheets where "out of bounds" increments are required in order to make a long part from a blank that is too short; (c) on sheets that are of a thinner gauge than that for which the forming elements were designed and made; (d) when it is desired to work harder or to raise the yield point of the material.

Fig. 82a shows a formed sheet resulting from the setting of Fig. 82, being an over-elongated compound curved sheet, the excessive elongation at the edges being indicated by the increment outline which has its zero points outside the edges.

In practice it is often desirable that a sheet be a composite of multiple shapes. For instance, as shown in Fig. 83, a sheet may need to be a combination of a cylindrical shape in one portion and the rest a compound curvature. For this the cam controlling the vertical dynamic action of the upper first stage element will be so shaped as to cause the setting of Fig. 79 while the section F is passing through, and to cause the setting of Fig. 81 while the section C is passing through. It will be noted from the increment outlines that the increment in section F is zero as in Fig. 79a, and in section C is the same as in the sheet of Fig. 81a.

Fig. 84 shows a sheet combining three cylindrical sections F of zero increment and two sections C of compound curvature, these shapes being obtained by blending settings of Figs. 79 and 81 by proper cam settings.

Fig. 85 shows a sheet of one compound area C between two cylindrical areas F obtained by proper blending of the positions of Figs. 79 and 81 by proper cam settings.

Blending or fading settings of the combination of settings shown in Figs. 79 through 82 makes possible the further reduction of scrap by reducing or totally eliminating the "flash" at the beginning and at the end of the blank. This will be better understood by reference to Figs. 86 and 87.

Fig. 86 shows a longitudinal cross-section of the forward or leading end of a sheet that has been formed. Fine tooth markings $j$ caused by the gripping jaws mar the surface usually from one-fourth to three-eighths of an inch along the front edge. This small amount is sufficient to draw the sheet through the several stages of stressing between the first and third stages. But these shallow serrations mar the surface of the material and for aircraft skin work this portion of the material is not usable.

In addition to these jaw-formed serrations, previous forming-by-drawing machines have produced imperfections resulting from locking the first stage upper element and the second stage element in their lowest positions before starting the draw and retaining them in those positions until the final exit of the sheet. This causes corrugations in the front and rear ends of the sheets which are avoided by the proper dynamic control of the elevational positions of these elements under proper cam settings.

Fig. 86 shows markings or corrugations $m$ and $m1$, the former being a permanent set caused by the second and third stages and the latter a permanent set caused by the first stage when the elements are locked down while the sheet is stationary.

Fig. 87 shows the effect of drawing the rear end of the sheet out of the forming elements while the upper first stage and the second stage elements are locked down. Referring to Fig. 82, it will be seen that as long as the trailing edge of the sheet moving in the direction of the arrow in Fig. 82a is restrained by the last upper bead of the first stage, tension will exist on the portion of the sheet between the first and second stages, producing a smooth surface in continuity with the already formed portion of the sheet. But as soon as the trailing end of the sheet leaves the restraint of the last upper first stage bead all tension disappears between the first and second stages and the sheet can no longer be "ironed out" by the second and third stages, with the result that, as shown in Fig. 87, permanent corrugations $m2$ and $m3$ are created in the end of the sheet by the second and first stages in the last instant while the sheet was still in motion.

By proper synchronization of the locking and unlocking of the first and second stages under cam control while the sheet is in motion, the corrugations $m$, $m1$, $m2$ and $m3$ can be avoided.

Figs. 88 and 89 are cross-sections of illustrative tapered blanks which may be satisfactorily drawn by proper dynamic control of the elevation of the upper first and the second stage elements. Fig. 88 shows a blank of continuous taper which for uniform results requires a progressive continuous lowering of the vertically movable elements during the draw.

Fig. 89 shows a blank of varying taper, having a leading section X of constant thickness and a thinner section Z of constant thickness joined to section X by a rapid tapering section Y, the section Z being followed by a tapering final section Q which tapers more gradually than section Y. The cams controlling the vertical positions of the first and second stage elements will be set to compensate for the change in thickness of the blank as it is being drawn.

Figs. 90, 91 and 92 illustrate the vertical and horizontal dynamic movements of the first stage elements, and the horizontal dynamic movement of the third stage element. In Fig. 90 the first stage is shown back from the second stage where the differential elongation is slight and the upper element is positioned to cause slight restraint on the sheet. The third stage is shown at substantially its maximum distance forward of the second stage with the result that the counteracting effect of the third stage on the positive tendency of the sheet to coil is at a minimum.

In Fig. 91 the first stage has been moved nearer the second stage and the restraint is increased, thereby increasing the differential elongation and depth of the draw. Likewise the third stage has approached the second stage, thereby increasing its effect in the distribution of the material through the thickness of the sheet to counteract the positive coiling tendency.

Fig. 92 shows the elements in nearly their posititions of maximum effect, in which it is possible for the negative effect of the third stage to exceed the positive coiling effect resulting from the bending of the sheet over the second stage forming element.

In Fig. 95 is shown a sheet having a convex area marked XX and a convex-concave area marked YY. This sheet is produced by blending or fairing in the lock-down of the second and third stage elements, first by drawing the sheet through the elements of Fig. 93 to that area XX and then by using the elements of Fig. 94 for the area YY.

The beads on the hold-back elements have been mentioned. In form they are somewhat similar to meshing gear teeth extending the full width of the elements 110 and 121, the final bead being on the lower element 121 when, as shown, the second stage is below the first stage, with the result that the sheet is bent over that final bead as it leaves the first stage and then is reversely bent over the second stage forming element, being finally again reversably bent over the third stage to counteract to a controlled degree the unequal surface elongation at the second stage.

The beads have rounded tops and are spaced somewhat more than the width or diameter of the beads immediately opposing the intervening spaces so that the sheet is not pinched between opposing beads when the two elements are at their closest approach, as approximately shown in Figs. 31 and 82. A proper set of the cam controlling the vertical movement of the upper element 110 will not allow the beads of one element to enter into the intervening spaces of the opposing element far enough to pinch the sheet between the tops of the beads and the opposing valleys. The restraint is imposed by the reverse bending of the sheet over the successive beads, the degree of bending depending upon the closeness of approach of the upper and lower elements. It will be observed that the beads increase in length progressively from the rear to the front.

The number and diameter of the beads depend upon the thickness of the sheet metal and generally speaking more beads of lesser diameter and hence more bends of lesser degree are required for relatively thin material than for thicker material. For example, it has been found in practice than for .025 inch metal thickness five beads of seven-sixteenths of an inch in diameter for each element but increasing in height from three-sixteenths to seven-sixteenths of an inch is satisfactory. For metal .040 inch in thickness it is satisfactory to have three beads on each element ten-sixteenths of an inch in diameter and increasing in height from five-sixteenths of an inch to eight-sixteenths of an inch for the middle bead and twelve-sixteenths of an inch for the forward bead, measuring from the root of each bead. For .051 inch metal thickness it has been found satisfactory to have two beads on each element which are thirteen-sixteenths of an inch in diameter and the rear bead ten-sixteenths of an inch in height and the front bead fourteen-sixteenths of an inch in height. For .063 inch metal thickness it is satisfactory to have two beads one inch in diameter with the rear bead eleven-sixteenths of an inch in height and the front bead seventeen-sixteenths of an inch in height. It is also desirable to provide a longitudinal groove in the upper element opposite the line of first bend to afford a relief or space for the metal in that line.

The particular construction of the machine shown in the drawings and above described in its various details is illustrative of one embodiment of the invention which has proved satisfactory and in general represents the preferred construction, but it will be understood that the principles involved are in large part independent of specific mechanical constructions which may be modified within the skill of the trained artisan without departing from the spirit and scope of the invention as defined in the following claims.

What is claimed is:

1. A forming-by-drawing machine comprising a pair of opposed work engaging elements constituting the first stage of operation and disposed to determine a general path of movement of a work piece, means to reciprocate one of said elements in a direction to vary the gap between the elements, a drawover forming element constituting the second stage of operation and disposed adjacent said pair of elements, means to reciprocate the said second stage element in a path substantially parallel to that of the said one first stage element, means to draw a work piece through the first stage elements and over the second stage element, and means actuated by said draw means for dynamically controlling one of said reciprocating means throughout the drawing operation of the draw means.

2. A forming-by-drawing machine comprising a pair of opposed work engaging elements constituting the first stage of operation and disposed to determine a general path of movement of a work piece, means to reciprocate one of said elements in a direction to vary the gap between the elements, a drawover forming element constituting the second stage of operation and disposed adjacent said pair of elements, means to reciprocate the said second stage element in a path substantially parallel to that of the said one first stage element, means to draw a work piece through the first stage elements and over the second stage element, and means actuated by said draw means for dynamically controlling both of said reciprocating means throughout the drawing operation of the draw means.

3. A forming-by-drawing machine comprising a pair of opposed work engaging elements constituting the first stage of operation and disposed to determine a general path of movement of a work piece, means to reciprocate one of said elements in a direction to vary the gap between the elements, a drawover forming element constituting the second stage of operation and disposed adjacent said pair of elements, means to reciprocate the said second stage element in a path substantially parallel to that of the said one first stage element, means to draw a work piece through the first stage elements and over the second stage element, and cam means actuated by said draw means for controlling both of said reciprocating means.

4. A forming-by-drawing machine comprising a pair of opposed work engaging elements constituting the first stage of operation and disposed to determine a general path of movement of a work piece, hydraulic means to reciprocate one of said elements in a direction to vary the gap between the elements, a drawover forming element constituting the second stage of operation and disposed adjacent said pair of elements, hydraulic means to reciprocate the said second stage element in a path substantially parallel to that of the said one first stage element, means to draw a work piece through the first stage elements and over the second stage element, a cam track movable with the draw means, a valve in control of each hydraulic means, and a cam follower engageable with the cam track and arranged in control of one of the valves.

5. A forming-by-drawing machine comprising a pair of opposed work engaging elements constituting the first stage of operation and disposed to determine a general path of movement of a work piece, hydraulic means to reciprocate one of said elements in a direction to vary the gap between the elements, a drawover forming element constituting the second stage of operation and disposed adjacent said pair of elements, hydraulic means to reciprocate the said second stage element in a path substantially parallel to that of the said one first stage element, means to draw a work piece through the first stage elements and over the second stage element, two cam tracks movable with the draw means, a valve in control of each hydraulic means, and a cam follower engageable with each cam track, one cam follower being arranged in control of each valve.

6. A forming-by-drawing machine comprising a pair of substantially horizontal opposed work engaging elements constituting the first stage of operation, power means connected to raise and lower the upper element of said pair, a substantially horizontal drawover forming element constituting the second stage of operation and disposed adjacent said pair of elements, power means connected to raise and lower the said second stage element, means to draw a work piece through the first stage elements and over the second stage element, power means connected to move the first stage elements substantially horizontally toward and from the second stage element, three cam tracks movable with the draw means, and a cam follower engaging each cam track, one cam follower being arranged in control of each of said three power means.

7. A forming-by-drawing machine as defined in claim 6 in which the cam tracks are adjustable in contour to vary the control of the respective power means during the drawing operation.

8. A forming-by-drawing machine as defined in claim 6 in which each power means comprises a hydraulic system including a cylinder and piston and a control valve biased in a direction to admit pressure fluid on one side of the piston and the cam follower is adapted to move the valve against its bias.

9. A forming-by-drawing machine as defined in claim 8 together with a solenoid arranged when energized to operate the valve in opposition to the bias, a switch in control of the energization of the solenoid and means actuated by the draw means for operating the switch.

10. A forming-by-drawing machine comprising a pair of substantially horizontal opposed work engaging elements providing a substantially straight slot and constituting the first stage of operation, power means connected to raise and lower the upper element of the pair, a substantially horizontal drawover forming element constituting the second stage of operation and disposed adjacent the pair of elements and having a curvilinear working surface on its bottom face, power means connected to raise and lower said second stage element, a second drawover forming element constituting the third stage of operation disposed adjacent the second stage element and having a working surface on its upper face conforming to and substantially paralleling that of the second stage element, power means connected to move the third stage element horizontally toward and from the second stage element, means to draw a work piece through the first stage elements and over the working surfaces of the second and third stage elements in succession, and means actuated by said draw means for dynamically controlling each of said power means throughout the drawing operation of the draw means.

11. A forming-by-drawing machine as defined in claim 10 in which the dynamic control means for each power means comprises a motor, a cam track movable with the draw means, a control device for the motor and a cam follower engaging the track and arranged to actuate the control device.

12. A forming-by-drawing machine as defined in claim 11 in which the power means comprises a hydraulic system including a cylinder and piston and a control valve and an operating lever for the control valve operatively connected to the cam follower.

13. A forming-by-drawing machine as defined in claim 12 in which the control valve has a mobile case and a valve stem movable in the case and controlled by the operating lever, and in which each of the three stage elements is connected to its respective valve case to impart its movement to the case.

14. A forming-by-drawing machine comprising a holdback structure having a pair of opposed work engaging elements determining the general path of movement of a work piece and constituting the first stage of operation, a drawover forming element constituting the second stage of operation, a main base, a guide member pivotally supported on the main base for freedom of movement about axes transverse and longitudinal of the machine, the first stage structure being supported in the guide member and movable therein toward and from the second stage element, means to draw a work piece through the first stage elements and over the second stage element, power means to move the first stage structure in the guide member, power means to move the guide member selectively about its two axes, and means actuated by said draw means for dynamically controlling both of said power means throughout the operation of the draw means.

15. A forming-by-drawing machine as defined in claim 14 in which the dynamic controlling means comprise a cam track for each of the power means movable with the draw means, a control device for each power means, and a cam follower adapted to engage each cam track and arranged to actuate its respective control device.

16. A forming-by-drawing machine as defined in claim 15 in which the dynamic controlling means in a hydraulic system with each power means comprising a cylinder and piston and each control device comprising a valve including a case and a valve stem, together with a valve operating lever operatively connected with each cam follower.

17. A forming-by-drawing machine as defined in claim 16 together with means operatively connecting the first stage structure and the guide member to the cases of their respective valves to transmit movement to the cases in the direction of and equal to that imparted to the valve stems by the cam and followers.

18. A forming-by-drawing machine as defined in claim 17 in which the power means to move the guide member about its two axes comprises two hydraulic cylinders with pistons attached to opposite sides of the guide member and a control valve and cam track for each cylinder and piston.

19. A forming-by-drawing machine as defined in claim 18 in which the cam tracks are adjustable in contour.

20. A forming-by-drawing machine comprising a sub-base, a pair of uprights secured to and coterminous with the sub-base at the forward end thereof, a main base secured on the sub-base and extending between the uprights, first stage hold-back mechanism for the work supported on the main base between the uprights, a second stage forming element spanning the uprights in front of the first stage mechanism, a draw bench fixedly secured to the sub-base at one side of and parallel to the space between the uprights, the other side being open and unobstructed, a cariage slidable in the draw bench, power means for moving the carriage, a draw arm secured to and extending laterally from the carriage in front of the second stage forming element, and jaws carried by the draw arm in position to grip a work piece emerging from the second stage element.

21. A forming-by-drawing machine as defined in claim 20 together with a third stage forming element supported upon the main base and disposed in front of the holdback mechanism and below the second stage element between the uprights.

22. A forming-by-drawing machine as defined in claim 21 in which the forward ends of the sub-base and main base are interrupted at their middle portions underneath the third stage element and thereby provide a knee opening.

23. A forming-by-drawing machine as defined in claim 22 in which the first stage mechanism and the third stage element are mounted for movement toward and away from the second stage element.

24. A forming-by-drawing machine comprising a main base having trunnion supports with an axis transverse of the machine, a cradle member pivotally supported on the trunnions, two arcuate anti-friction bearing raceways in the bottom of the cradle having a common axis longitudinal of the machine and spaced one in front of the other, a guide structure pivotally supported upon said raceways, a hold-back structure constituting the first stage of operation of the machine and having a pair of opposed work engaging elements determining the general path of movement of a work piece, and a rearwardly extending leg, said leg being slidably supported upon said guide structure for reciprocation longitudinally of the machine, power means carried by the guide structure and operatively connected to the said leg of the hold-back structure, and means to draw a work piece through the work engaging elements of the hold-back structure.

25. A forming-by-drawing machine as defined in claim 24 in which the guide structure has an arcuate groove disposed between and concentric with the raceways, together with at least one roller engaging in said groove and pivotally supported upon the cradle on an axis radial of the groove.

26. A forming-by-drawing machine as defined in claim 24 in which the rear raceway comprises an arcuate member providing an internal and an external raceway.

27. A forming-by-drawing machine comprising a holdback structure having a pair of work engaging elements determining the general path of movement of a work piece and constituting the first stage of operation, a drawover forming element constituting the second stage of operation, a main base having trunnion supports with an axis transverse of the machine, a cradle member mounted on said trunnion supports for pivotal movement about said transverse axis, a guide structure supported in the cradle for pivotal movement about an axis longitudinal of the machine, the hold-back structure being supported in the guide structure and movable therein toward and from the second stage element, means to draw a work piece through the first stage elements and over the second stage element, power means to move the hold-back structure in the guide structure, power means to move the guide structure about said transverse and longitudinal axes, and means actuated by said draw means for dynamically controlling both of said power means throughout the operation of the draw means.

28. A forming-by-drawing machine comprising a holdback structure having a pair of work engaging elements determining the general path of movement of a work piece and constituting the first stage of operation, a draw-over forming element constituting the second stage of operation, a main base, a guide member carried by the main base, the holdback structure being slidably mounted on the guide member for substantialy horizontal movement toward and from the second stage element, power means journaled in the guide member, a lever pivoted in the guide member and having pivotal connection with the hold-back structure, means operatively connecting the power means to the lever, means to draw a work piece through the first stage elements and over the second stage element, and means actuated by said draw means for dynamically controlling the said power means.

29. The mechanism defined in claim 28 in which the operative connecting means of the power means to the lever is adjustable along the lever.

30. The mechanism defined in claim 29 in which the power means is a hydraulic cylinder and piston and the piston rod is connected to the lever and is adjustable in length to accommodate it to the variable connection with the lever.

31. A forming-by-drawing machine comprising a base, a pair of main uprights secured thereon, a first stage hold-back mechanism supported upon the base within the main uprights and comprising a pair of secondary uprights, a lower main cross member secured at its ends to the lower ends of the secondary uprights and having a work engaging upper face, a cross bar spanning the secondary uprights at their upper ends, means fixedly securing the cross bar in position relative to the secondary uprights, a ram extending across the secondary uprights intermediate their ends and having a work engaging lower face, toggles connecting the ram and cross bar, guides on the inner faces of the secondary uprights for the ram, power means for operating the toggles, a second stage forming mechanism comprising a fixed bar spanning the upper ends of the main uprights, a ram having a work engaging lower face and movable up and down within the main uprights, toggles connecting the second stage fixed bar to the second stage ram, power means for operating the second stage toggles, means to draw a work piece between the two work engaging faces of the first stage and over the work engaging face of the ram of the second stage, and means actuated by said draw means for dynamically controlling the power means for operating the first stage toggles.

32. A forming-by-drawing machine comprising a base, a pair of main uprights secured thereon, a first stage holdback mechanism supported upon the base within the main uprights and comprising a pair of secondary uprights, a lower main cross member secured at its ends to the lower ends of the secondary uprights and having a work engaging upper face, a cross bar spanning the secondary uprights at their upper ends, means fixedly securing the cross bar in position relative to the secondary uprights, a ram extending across the secondary uprights intermediate their ends and having a work engaging lower face, toggles connecting the ram and cross bar, guides on the inner faces of the secondary uprights for the ram, power means for operating the toggles, a second stage forming mechanism comprising a fixed bar spanning the upper ends of the main uprights, a ram having a work engaging lower face and movable up and down within the main uprights, toggles connecting the second stage fixed bar to the second stage ram, power means for operating the second stage toggles, means to draw a work piece between the two work engaging faces of the first stage and over the work engaging face of the ram of the second stage, and means actuated by said draw means for dynamically controlling the power means for operating the second stage toggles.

33. A forming-by-drawing machine comprising a base, a pair of main uprights secured thereon, a first stage hold- back mechanism supported upon the base within the main uprights and comprising a pair of secondary uprights, a lower main cross member secured at its ends to the lower ends of the secondary uprights and having a work engaging upper face, a cross bar spanning the secondary uprights at their upper ends, means fixedly securing the cross bar in position relative to the secondary uprights, a ram extending across the secondary uprights intermediate their ends and having a work engaging lower face, toggles connecting the ram and cross bar, guides on the inner faces of the secondary uprights for the ram, power means for operating the toggles, a second stage forming mechanism comprising a fixed bar spanning the upper ends of the main uprights, a ram having a work engaging lower face and movable up and down within the main uprights, toggles connecting the second stage fixed bar to the second stage ram, power means for operating the second stage toggles, means to draw a work piece between the two work engaging faces of the first stage and over the work engaging face of the ram of the second stage, and means actuated by said draw means for dynamically controlling the power means for operating both the first stage and the second stage toggles.

34. The mechanism defined in claim 31 together with a separable work engaging element having dove-tail engagement with the upper face of the lower main cross member of the first stage mechanism, and a separable work engaging element having dove-tail engagement with the lower face of the ram of the first stage mechanism in opposition to that on the said lower main cross member, the main and secondary uprights on one side having openings to allow for the lateral removal of the two work engaging elements.

35. The mechanism defined in claim 31 together with a guide plate on the lower main cross member of the first stage back of the work engaging face thereon and an opposing guide plate on the ram of the first stage back of the work engaging face thereon.

36. The mechanism defined in claim 35 in which the opposing guide plate on the ram is attached to the ram through a lost motion connection in the direction of movement of the ram.

37. The mechanism defined in claim 31 in which the secondary uprights are each provided with a pair of vertical gibs in the upper ends of their inner faces and constituting guides for the cross bar of the first stage mechanism, together with a bridge piece across the upper ends of each pair of gibs and a screw passing through each bridge piece and threaded into the top of the cross bar.

38. The mechanism defined in claim 31 in which the work engaging faces of the ram and lower main cross member of the first stage mechanism are separable elements, together with clamping plates on the front faces of the said ram and lower main cross member engaging and clamping the respective separable elements, and securing screws for the clamping plates entered from the rear of said ram and lower main cross member and having tool engaging heads exposed on their rear ends.

39. The mechanism defined in claim 31 together with a bracket on top of the cross bar of the first stage mechanism, a hydraulic cylinder and piston journaled in the bracket and constituting the power means for operating the first stage toggles, a lever pivoted on the said cross bar of the first stage and having one end operatively connected to the piston and its other end operatively connected to the first stage toggle joint.

40. The mechanism defined in claim 39 together with a translatable cam track connected to be moved with the draw means, a cam follower, a valve arranged in control of hydraulic pressure to the hydraulic cylinder journaled in said bracket and including a mobile case and a valve stem, a valve operating lever operatively connected to the cam follower, and means connecting the toggle joint of the first stage mechanism to the case of the valve to transmit movement of said toggle joint to the case in the direction of and equal to that imparted to the valve stem by the cam and follower.

41. The mechanism defined in claim 31 in which the power means for operating the second stage toggles includes a hydraulic cylinder and piston, together with a translatable cam track connected to be moved with the draw means, a cam follower, a valve arranged in control of hydraulic pressure to said hydraulic cylinder and including a mobile case and a valve stem, a valve operating lever operatively connected to said cam follower, and means connecting the toggle joint of the second stage mechanism to the case of the valve to transmit movement of the toggle joint to the case in the direction of and equal to that imparted to the valve stem by the cam and follower.

42. The mechanism defined in claim 31 in which the ram of the second stage mechanism comprises separate upper and lower sections, together with two turnbuckles between and adjustably connecting the two sections.

43. The mechanism defined in claim 42 together with a counterweight bearing on the fixed bar of the second stage mechanism and connected to said two part ram.

44. The mechanism defined in claim 42 in which the work engaging lower face of the second stage ram is a separable work engaging element having dove-tail engagement with the lower face of the ram, and one of the uprights has an opening to allow for the lateral removal of the work engaging element.

References Cited in the file of this patent

UNITED STATES PATENTS

| | | |
|---|---|---|
| 518,668 | Green | Apr. 24, 1894 |
| 616,341 | Mason | Dec. 20, 1898 |
| 1,236,465 | Mathias | Aug. 14, 1917 |
| 1,437,953 | Baily | Dec. 5, 1922 |
| 1,608,910 | Sjolander | Nov. 30, 1929 |
| 1,772,139 | Hessenbruch | Aug. 5, 1930 |
| 2,009,508 | Maussnest | July 30, 1935 |
| 2,068,890 | Sassen | Jan. 26, 1937 |
| 2,113,115 | Mac Millin | Apr. 5, 1938 |
| 2,285,903 | Clark | June 9, 1942 |
| 2,289,150 | Tangerman | July 7, 1942 |
| 2,301,960 | Lermont et al. | Nov. 17, 1942 |
| 2,326,470 | Lermont et al. | Aug. 10, 1943 |
| 2,337,047 | Hunter | Dec. 21, 1943 |
| 2,367,225 | Leskiewicz | Jan. 16, 1945 |
| 2,374,852 | Czapiewski | May 1, 1945 |
| 2,395,651 | Anderson | Feb. 26, 1946 |
| 2,408,379 | Day | Oct. 1, 1946 |
| 2,457,705 | Moran | Dec. 28, 1948 |
| 2,480,826 | Anderson | Sept. 6, 1949 |
| 2,684,705 | Blumensaadt | July 27, 1954 |

FOREIGN PATENTS

| | | |
|---|---|---|
| 394,908 | Great Britain | July 6, 1933 |